(12) United States Patent
Dobney

(10) Patent No.: US 11,786,807 B2
(45) Date of Patent: Oct. 17, 2023

(54) GAME SYSTEM, DEVICE AND METHOD FOR PLAYING A GAME

(71) Applicant: David Timothy Dobney, Toronto (CA)

(72) Inventor: David Timothy Dobney, Toronto (CA)

( * ) Notice: Subject to any disclaimer, the term of this patent is extended or adjusted under 35 U.S.C. 154(b) by 0 days.

(21) Appl. No.: 17/137,795

(22) Filed: Dec. 30, 2020

(65) Prior Publication Data

US 2022/0203221 A1    Jun. 30, 2022

(51) Int. Cl.
*A63F 13/212*    (2014.01)
*A63F 13/211*    (2014.01)

(52) U.S. Cl.
CPC .......... *A63F 13/212* (2014.09); *A63F 13/211* (2014.09)

(58) Field of Classification Search
None
See application file for complete search history.

(56) References Cited

U.S. PATENT DOCUMENTS

| | | |
|---|---|---|
| 4,695,058 A | 9/1987 | Carter et al. |
| 5,127,657 A | 7/1992 | Ikezawa et al. |
| 5,393,074 A | 2/1995 | Bear et al. |
| 6,981,700 B2 | 1/2006 | Syed et al. |
| 9,396,641 B1 | 7/2016 | Allen et al. |
| 9,604,131 B1 | 3/2017 | Kiyohara |
| 9,724,570 B2 * | 8/2017 | Krysiak ............... A63B 43/002 |
| 2011/0304497 A1 * | 12/2011 | Molyneux ............... H01Q 1/44 |
| | | 342/42 |
| 2011/0316529 A1 * | 12/2011 | Stancil ................... A63B 43/00 |
| | | 324/207.22 |
| 2017/0220104 A1 * | 8/2017 | Goslin ............... A63B 24/0087 |
| 2018/0250575 A1 | 9/2018 | Devaux |
| 2019/0060736 A1 * | 2/2019 | Harris ..................... H04W 4/80 |

FOREIGN PATENT DOCUMENTS

| | | |
|---|---|---|
| GB | 2337385 A | 11/1999 |
| GB | 2556470 B | 3/2021 |
| WO | WO1995010337 A1 | 4/1995 |

OTHER PUBLICATIONS

Cheok et. al, Pers Ubiquit Comput (2004) 8: 71-81 DOI 10.1007/s00779-004-0267-x.

(Continued)

*Primary Examiner* — Peter J Iannuzzi

(57) ABSTRACT

A wearable electronic kit, system and method for playing a game involving a plurality of players is disclosed. The kit includes a transmitter configured to emit a signal identifying the player wearing the electronic kit and a receiver configured to read the signals transmitted by the electronic kits worn by other players and measure the signal strength of each of said signals. The kit includes a processor coupled to the receiver which creates zones of influence around the other players by defining a preselected signal strength threshold for each signal. The processor is configured to recognize a presence event in the zone of influence by comparison of the signal strength read by the receiver to the preselected signal strength threshold of the player. The processor is configured to store a set of rules and to use the recognition of the presence event in the application of the rules.

20 Claims, 52 Drawing Sheets

Wearable Kit

(56) References Cited

OTHER PUBLICATIONS

Cheng, Sylvia Hou-Yan, CHI 2011, May 7-12, 2011, Vancouver, BC, Canada. ACM 978-1-4503-0268—May 11, 2005 TagURIt: A Proximity-based Game of Tag Using Lumalive e-Textile Displays.
Feb. 3, 2019, a "Superbowl" TV commercial.
ROXs real life gaming system offered by Kilian Saekel and company.
"SPOOKY", which is executed with the WOVEN e-wearable platform offered by wearablegames.eu (Kersten and Ribbens).
SuperSuit gaming system offered by SuperSuit Inc./MadRat games.
'Pervasive gaming: Status, trends and design principles, Journal of Network and Computer Applications, Jun. 2015, DOI:10.1016/j.jnca.2015.05.0091'.
Kalle Egers, Pervasive GameFlow—Identifying and Exploring the Mechanisms of Player Enjoyment in Pervasive Games, Kalle Egers, Department of Informatics, Umea University Sweden, 2009.
Tagaboo is an interactive game for two or more children that is based upon wearable radio frequency identification (RFID) technology.
Beam virtual playground.

* cited by examiner

Wearable Kit

Alternative Wearable Kit

Wearable Kit Schematic

Player and Fixtures and Projectile and Robot Drawing

Fixture and Projectiles Schematic

WaveTag Field

Figure 7

WaveTag Fixture Parameters

| Item | Signal Code | Description |
|---|---|---|
| 0701 | SGN | Goal North Signal |
| 0702 | SGNG | Goal North Grant |

| Item | Signal Code | Description |
|---|---|---|
| 0703 | SGS | Goal South Signal |
| 0704 | SGSG | Goal South Grant |

| Item | Local Variable Code | Description | Applicable Fixtures |
|---|---|---|---|
| 0705 | VAS | Team A Score Count | Goal North |
| 0706 | VAD | Team A Done | Goal North |

| Item | Local Variable Code | Description | Applicable Fixtures |
|---|---|---|---|
| 0707 | VBS | Team B Score Count | Goal South |
| 0708 | VBD | Team B Done | Goal South |

| Item | Local Timer Code | Description | Applicable Players |
|---|---|---|---|
| 0709 | TG | Game Timer | Goal |
| 0710 | TE | End Timer | Goal |

| Item | Local Mode Code | Description | Signal Emission |
|---|---|---|---|
| 0711 | MNGP | North Goal Play Mode | SGN |
| 0712 | MNGG | North Goal Grant Mode | SGNG |
| 0713 | MNGE | North Goal End Mode | |
| 0714 | MNGF | North Goal Final Mode | |

| Item | Local Mode Code | Description | Signal Emission |
|---|---|---|---|
| 0715 | MSGP | South Goal Play Mode | SGS |
| 0716 | MSGG | South Goal Grand Mode | SGSG |
| 0717 | MSGE | South Goal End Mode | |
| 0718 | MSGF | South Goal Final Mode | |

Figure 8

WaveTag Player Parameters

| Item | Signal Code | Description |
|---|---|---|
| 0801 | SAP | Pawn A Signal |
| 0802 | SAS | Scorer A Signal |
| 0803 | SAPH | Pawn Handshake A Signal |
| 0804 | SAHH | Hunter Handshake A Signal |
| 0805 | SASH | Scorer Handshake A Signal |
| 0806 | SAX | A Penalty Signal |

| Item | Signal Code | Description |
|---|---|---|
| 0807 | SBP | Pawn B Signal |
| 0808 | SBS | Scorer B Signal |
| 0809 | SBPH | Pawn Handshake B Signal |
| 0810 | SBHH | Hunter Handshake B Signal |
| 0811 | SBSH | Scorer Handshake B Signal |
| 0812 | SBX | B Penalty Signal |

| Item | Local Variable Code | Description |
|---|---|---|
| 0813 | VM | Moving |
| 0814 | VS | Still |
| 0815 | VHU | Still & hand up |
| 0816 | VHH | Still & hand on hips |
| 0817 | VHU1 | Still & hand up for specified duration |
| 0818 | VHH1 | Still & hand on hips for specified duration |
| 0819 | VHU0 | NOT Still & hand up for specified duration |
| 0820 | VHH0 | NOT Still & hand on hips for specified duration |

| Item | Local Timer Code | Description |
|---|---|---|
| 0821 | TG | Game Timer |
| 0822 | TB | Begin Timer |
| 0823 | TS | Score Timer |
| 0824 | TR | Run Timer |
| 0825 | TH | Handshake Timer |
| 0826 | TP | Penalty Timer |

Figure 9

WaveTag Player Modes

| Item | Local Mode Code | Description | Signal Emission |
|---|---|---|---|
| 0901 | MAPM | Pawn A Moving Mode | |
| 0902 | MAPS | Pawn A Still Mode | SAP |
| 0903 | MAPO | Pawn A Out Mode | |
| 0904 | MAPH | Pawn A Handshake Mode | SAPH |
| 0905 | MAHN | Hunter A Normal Mode | SAP |
| 0906 | MAHO | Hunter A Out Mode | |
| 0907 | MAHH | Hunter A Handshake Mode | SAHH |
| 0908 | MASB | Scorer A Begin | |
| 0909 | MAS1V | Scorer A Normal Mode 1 Vulnerable | |
| 0910 | MAS1P | Scorer A Normal Mode 1 Protected | |
| 0911 | MAS2V | Scorer A Normal Mode 2 Vulnerable | SAS |
| 0912 | MAS2P | Scorer A Normal Mode 2 Protected | SAS |
| 0913 | MASO | Scorer A Out Mode | |
| 0914 | MASH | Scorer A Handshake Mode | SASH |
| 0915 | MAX | A Penalty Mode | SAX |

| Item | Local Mode Code | Description | Signal Emission |
|---|---|---|---|
| 0916 | MBPM | Pawn B Moving Mode | |
| 0917 | MBPS | Pawn B Still Mode | SBP |
| 0918 | MBPO | Pawn B Out Mode | |
| 0919 | MBPH | Pawn B Handshake Mode | SBPH |
| 0920 | MBHN | Hunter B Normal Mode | SBP |
| 0921 | MBHO | Hunter B Out Mode | |
| 0922 | MBHH | Hunter B Handshake Mode | SBHH |
| 0923 | MBSB | Scorer B Begin | |
| 0924 | MBS1V | Scorer B Normal Mode 1 Vulnerable | |
| 0925 | MBS1P | Scorer B Normal Mode 1 Protected | |
| 0926 | MBS2V | Scorer B Normal Mode 2 Vulnerable | SBS |
| 0927 | MBS2P | Scorer B Normal Mode 2 Protected | SBS |
| 0928 | MBSO | Scorer B Out Mode | |
| 0929 | MBSH | Scorer B Handshake Mode | SBSH |
| 0930 | MBX | B Penalty Mode | SBX |

Figure 10

WaveTag Team A Processing – Part 1

| Item | Current Mode | Current Transmission | Current Parameter | Received Signal | Update Mode | Update Parameter |
|---|---|---|---|---|---|---|
| 1001 | MAPM | | | SBP | MAPO | |
| 1002 | MAPM | | | SGN | MAPO | |
| 1003 | MAPM | | | SGS | MAPO | |
| 1004 | MAPM | | VS=true | | MAPS | |
| 1005 | MAPS | SAP | VM=true | | MAPM | |
| 1006 | MAPS | SAP | VHU=true | | MAPH | |
| 1007 | MAPO | | VHH1=true | | MAPS | |
| | | | | | | |
| 1008 | MAHN | SAP | | SBP | MAHO | |
| 1009 | MAHN | SAP | | SGN | MAHO | |
| 1010 | MAHN | SAP | | SGS | MAHO | |
| 1011 | MAHN | | VHU=true | | MAHH | |
| 1012 | MAHO | | VHH1=true | | MAHN | |
| | | | | | | |
| 1013 | MASB | | | SGN | MAS1V | |
| 1014 | MASB | | TB elapse | | MASO | |
| 1015 | MAS1V | | | SAP | MA1P | Stop TR |
| 1016 | MAS1V | | TR elapse | | MASO | |
| 1017 | MAS1V | | TS elapse | | MASO | |
| 1018 | MAS1V | | | SGS | MAS2V | |
| 1019 | MAS1P | | | (Lose SA) | MAS1V | Restart TR |
| 1020 | MAS1P | | TR elapse | | MASO | |
| 1021 | MAS1P | | TS elapse | | MASO | |
| 1022 | MAS1P | | | SGS | MAS2P | |
| 1023 | MAS2V | SAS | | SAP | MAS2P | Stop TR |
| 1024 | MAS2V | SAS | TR elapse | | MASO | |
| 1025 | MAS2V | SAS | TS elapse | | MASO | |
| 1026 | MAS2V | SAS | | SGN | MAS1V | Restart TS |
| 1027 | MAS2P | SAS | | (Lose SA) | MAS2V | Restart TR |
| 1028 | MAS2P | SAS | TR elapse | | MASO | |
| 1029 | MAS2P | SAS | TS elapse | | MASO | |
| 1030 | MAS2P | SAS | | SGN | MAS1P | Restart TS Increment VAS |
| 1031 | MASO | | | | MASH | Restart TH |

Figure 11

WaveTag Team A Processing – Part 2

| Item | Current Mode | Current Transmission | Current Parameter | Received Signal | Update Mode | Update Parameter |
|---|---|---|---|---|---|---|
| 1101 | MAPH | SAPH | VHU1=true | SAHH | MAHN | |
| 1102 | MAPH | SAPH | VHU=false | | MAPS | |
| | | | | | | |
| 1103 | MAHH | SAHH | VHU1=true | SAPH | MAPS | |
| 1104 | MAHH | SAHH | VHU1=true | SBSH | MASB | |
| 1105 | MAHH | SAHH | VHU=false | | SAHN | |
| | | | | | | |
| 1106 | MASH | SASH | VHU1=true | SBHH | MAHN | |
| 1107 | MASH | SASH | TH elapse | | MASB | Restart TB |
| 1108 | MASH | SASH | VHU=false | | MAX | |
| 1109 | MASH | SASH | | SGN | MAX | |
| 1110 | MASH | SASH | | SGS | MAX | |
| | | | | | | |
| 1111 | MAX | SAX | | (no SGS) | | TP forward |
| 1112 | MAX | SAX | | SGS | | TP reverse |
| 1113 | MAX | SAX | TP=0 | | MAHN | (allow exit) |
| | | | | | | |
| 1114 | MAHO | | | SGNG | MASB | |

Figure 12

WaveTag Team A Processing – Part 3

| Item | Current Mode | Current Transmission | Current Parameter | Received Signal | Update Mode | Update Parameter |
|---|---|---|---|---|---|---|
| 1201 | MAPM | | VHU=true | | MAPO | |
| 1202 | MAPM | | VHH=true | | MAPO | |
| 1203 | MAPS | | VHH=true | | MAPO | |
| 1204 | MAPO | | VHU=true | | MAPO | *VHH1 penalty |
| | | | | | | |
| 1205 | MAHN | | VHH=true | | MAHO | |
| 1206 | MAHO | | VHU=true | | MAHO | *VHH1 penalty |
| | | | | | | |
| 1207 | MAS1V | | VHU=true | | MAX | |
| 1208 | MAS1V | | VHH=true | | MAX | |
| 1209 | MAS1P | | VHU=true | | MAX | |
| 1210 | MAS1P | | VHH=true | | MAX | |
| 1211 | MAS2V | | VHU=true | | MAX | |
| 1212 | MAS2V | | VHH=true | | MAX | |
| 1213 | MAS2P | | VHU=true | | MAX | |
| 1214 | MAS2P | | VHH=true | | MAX | |

Figure 13

WaveTag Fixture Processing

| Item | Current Mode | Current Transmission | Current Parameter | Received Signal | Update Mode | Update Parameter |
|---|---|---|---|---|---|---|
| 1301 | *game start | | | | | Restart TG |
| | | | | | | |
| 1302 | MNGP | SGN | | SAS | | VAS++ |
| 1303 | MNGP | SGN | | SBX | | *VAS++/time |
| 1304 | MNGP | SGN | | SBHN post SBX | MNGG | |
| 1305 | MNGP | | TG elapse | | MNGE | Restart TE |
| | | | | | | |
| 1306 | MNGG | SGNG | | SAHO | MNGP | |
| | | | | | | |
| 1307 | MNGE | | | SAHO | MNGF | |
| 1308 | MNGE | | | SBX | | *VAS++/time |
| 1309 | MNGE | | | SBHN post SBX | MNGF | |
| 1310 | MNGE | | | SBHO | MNGF | |
| 1311 | MNGE | | TE elapse | | MNGF | |
| | | | | | | |
| 1312 | MNGF | | | | | (game end) |

WaveTag Gestures hand up (for handshake)

hands on hips (end outage)

Figure 15

WaveTag Team A Haptic Feedback

| Item | Start Mode | Current Transmission | Current Parameter | Received External Signal | Vibrator 1<br><br>Various warning levels | Vibrator 2<br><br>Information |
|---|---|---|---|---|---|---|
| 1501 | | | | SAP | Pulse | |
| 1502 | | | | SAS | Pulse | |
| 1503 | | | | SAPH | | Strobe |
| 1504 | | | | SAHH | | Strobe |
| 1505 | | | | SASH | | Strobe |
| 1506 | | | | SAX | Pulse | |
| | | | | | | |
| 1507 | | | | SBP | Pulse | |
| 1508 | | | | SBS | Pulse | |
| 1509 | | | | SBPH | | Strobe |
| 1510 | | | | SBHH | | Strobe |
| 1511 | | | | SBSH | | Strobe |
| 1512 | | | | SBX | Pulse | |
| | | | | | | |
| 1513 | MAPM | | | | | Pulse |
| 1514 | MAPS | | | | | Pulse |
| 1515 | MAPO | | | | | Pulse+Audio1 |
| 1516 | MAPH | | | | | Pulse |
| 1517 | MAHN | | | | | Pulse |
| 1518 | MAHO | | | | | Pulse+Audio1 |
| 1519 | MAHH | | | | | Pulse |
| 1520 | MASB | | | | | Pulse+Audio3 |
| 1521 | MAS1V | | | | | Pulse+Audio3 |
| 1522 | MAS1P | | | | | Pulse+Audio3 |
| 1523 | MAS2V | | | | | Pulse+Audio3 |
| 1524 | MAS2P | | | | | Pulse+Audio3 |
| 1525 | MASO | | | | | Pulse+Audio1 |
| 1526 | MASH | | | | | Pulse |
| 1527 | MAX | | | | | SOS+Audio2 |
| | | | | | | |
| 1528 | | | | *varies | | *varies |
| | | | | | | |
| 1529 | | | *varies | | | *varies |

WaveChess Field

Figure 17

WaveChess Fixture Parameters

| Item | Goal Signal Code | Description |
|---|---|---|
| 1701 | SNW | North West Signal |
| 1702 | SNE | North East Signal |
| 1703 | SSW | South West Signal |
| 1704 | SSE | South East Signal |
| 1705 | SM1 | Measure 1 Signal |
| 1706 | SM2 | Measure 2 Signal |
| 1707 | SM3 | Measure 3 Signal |
| 1708 | SM4 | Measure 4 Signal |
| 1709 | SAOK | Fixture Initiated Team A Move Permissive |
| 1710 | SBOK | Fixture Initiated Team B Move Permissive |
| 1711 | SABAD | Team A Gesture Penalty Signal |
| 1712 | SBBAD | Team B Gesture Penalty Signal |

| Item | Goal Variable Code | Description |
|---|---|---|
| 1713 | VACOUNT | # of A Players with 1 Hand Up = function (image processing) |
| 1714 | VBCOUNT | # of B Players with 1 Hand Up = function (image processing) |

| Item | Goal Timer Code | Description |
|---|---|---|
| 1715 | TM | Measure Timer |

| Item | Local Mode Code | Description | Signal Emission |
|---|---|---|---|
| 1716 | MGM1 | Measure 1 Mode | SM1 |
| 1717 | MGM2 | Measure 2 Mode | SM2 |
| 1718 | MGM3 | Measure 3 Mode | SM3 |
| 1719 | MGM4 | Measure 4 Mode | SM4 |

Figure 18

WaveChess Player Parameters

| Item | A Player Signal Code | Description |
|---|---|---|
| 1801 | SA | Team A Signal |

| Item | B Player Signal Code | Description |
|---|---|---|
| 1802 | SB | Team B Signal |

| Item | Variable Code | Description |
|---|---|---|
| 1803 | VM | Moving |
| 1804 | VS | Still |
| 1805 | VHU | Still & hand up |
| 1806 | VBHU | Both hands up |
| 1807 | VHU1 | Still & hand up for specified duration |
| 1808 | SNWS | Strength of North West Signal |
| 1809 | SNES | Strength of North East Signal |
| 1810 | SSWS | Strength of North West Signal |
| 1811 | SSES | Strength of North East Signal |
| 1812 | VLAT | current latitude = function (SNWS, SNEW, SSWS, SSES) |
| 1813 | VLONG | current longitude = function (SNWS, SNEW, SSWS, SSES) |
| 1814 | VLAT0 | latitude at start of movement |
| 1815 | VLONG0 | longitude at start of movement |
| 1816 | VDIAGX | current NW-SE diagonal = function (SNWS, SNEW, SSWS, SSES) |
| 1817 | VDIAGY | current SW-NE diagonal = function (SNWS, SNEW, SSWS, SSES) |
| 1818 | VDIAGX0 | NW-SE diagonal at start of movement |
| 1819 | VDIAGY0 | SW-NE diagonal at start of movement |
| 1820 | VFIELD | true when in bounds = function (SNWS, SNEW, SSWS, SSES) |
| 1821 | TOL | distance tolerance |

| Item | Timer Code | Description |
|---|---|---|
| 1822 | TR | Run Timer |
| 1823 | TO | Out Timer |

Figure 19

WaveChess Player Modes

| Item | Local Mode Code | Description | Signal Emission |
|---|---|---|---|
| 1901 | MABS | Bishop A Still Mode | |
| 1902 | MABM | Bishop A Moving Mode | SA |
| 1903 | MABO | Bishop A Out Mode | |
| 1904 | MABX | Bishop A Penalty | |
| 1905 | MARS | Rook A Still Mode | |
| 1906 | MARM | Rook A Moving Mode | SA |
| 1907 | MARO | Rook A Out Mode | |
| 1908 | MARX | Rook A Penalty | |
| 1909 | MAKS | King A Still Mode | |
| 1910 | MAKM | King A Moving Mode | SA |
| 1911 | MAKO | King A Out mode | |

| Item | Local Mode Code | Description | Signal Emission |
|---|---|---|---|
| 1912 | MBBS | Bishop A Still Mode | |
| 1913 | MBBM | Bishop A Moving Mode | SB |
| 1914 | MBBO | Bishop A Out Mode | |
| 1915 | MBBX | Bishop A Penalty | |
| 1916 | MBRS | Rook A Still Mode | |
| 1917 | MBRM | Rook A Moving Mode | SB |
| 1918 | MBRO | Rook A Out Mode | |
| 1919 | MBRX | Rook A Penalty | |
| 1920 | MBKS | King A Still Mode | |
| 1921 | MBKM | King A Moving Mode | SB |
| 1922 | MBKO | King A Out mode | |

Figure 20

WaveChess Team A Processing – Part 1

| Item | Current Mode | Current Transmission | Current Parameter | Received Signal | Update Mode | Update Parameter |
|---|---|---|---|---|---|---|
| 2001 | MABS | | VM | | MABO | Restart TO |
| 2002 | MABS | | | SA | MABO | Restart TO |
| 2003 | MABS | | | SB | MABO | Restart TO |
| 2004 | MABS | | VHU1 | recent SAOK & SM2 start | MABM | VDIAGX0 = VDIAGX VDIAGY0 = VDIAGY |
| 2005 | MABS | | VHU=true | SABAD | MABO | |
| 2006 | MABM | SA | | SM3 | MABS | |
| 2007 | MABM | SA | VDIAGX not equal VDIAGX0 --or-- VDIAGY not equal VDIAGY0 | | MABO | Restart TO |
| 2008 | MABM | SA | VFIELD=false | | MABO | Restart TO |
| 2009 | MABM | | VHU=true | SABAD | MABO | |
| 2010 | MABO | | VFIELD = true --and-- VBHU=false | | MABX | |
| 2011 | MABO | | VFIELD=true --and-- TO Elapse | | MABX | |

Figure 21

WaveChess Team A Processing – Part 2

| Item | Current Mode | Current Transmission | Current Parameter | Received Signal | Update Mode | Update Parameter |
|------|--------------|----------------------|-------------------|-----------------|-------------|------------------|
| 2101 | MARS | | VM | | MARO | Restart TO |
| 2102 | MARS | | | SA | MARO | Restart TO |
| 2103 | MARS | | | SB | MARO | Restart TO |
| 2104 | MARS | | VHU1 | recent SAOK & SM2 start | MARM | VLAT0 = VLAT VLONG0 = VLONG |
| 2105 | MARS | | VHU=true | SABAD | MARO | |
| 2106 | MARM | SA | | SM3 | MARS | |
| 2107 | MARM | SA | VLAT not equal VLAT0 --or-- VLONG not equal VLONG0 | | MARO | Restart TO |
| 2108 | MARM | SA | VFIELD=false | | MARO | Restart TO |
| 2109 | MARM | | VHU=true | SABAD | MARO | |
| 2110 | MARO | | VFIELD = true --and-- VBHU=false | | MARX | |
| 2111 | MARO | | VFIELD=true --and— TO Elapse | | MARX | |

Figure 22

WaveChess Team A Processing – Part 3

| Item | Current Mode | Current Transmission | Current Parameter | Received Signal | Update Mode | Update Parameter |
|---|---|---|---|---|---|---|
| 2201 | MAKS | | VM | | MAKO | |
| 2202 | MAKS | | | SA | MAKO | |
| 2203 | MAKS | | | SB | MAKO | |
| 2204 | MAKS | | VHU=true | recent SAOK & SM2 Start | MAKM | Restart TM |
| 2205 | MAKS | | VHU=true | SABAD | MAKO | |
| 2206 | MAKM | SA | TM Elapse | | MAKS | |
| 2207 | MAKM | SA | VFIELD=false | | MAKO | |
| 2208 | MAKM | | VHU=true | SABAD | MAKO | |
| 2209 | MAKO | | VFIELD = true --and-- VBHU=false | | MAKX | |

Figure 23

WaveChess Typical Goal Processing

| Item | Current Mode | Current Transmission | Current Parameter | Received Signal | Update Mode | Update Parameter |
|---|---|---|---|---|---|---|
| 2301 | MGM1 | SM1 | TM elapse | | MGM2 | Restart TM |
| 2302 | MGM2 | SM2 | TM elapse | | MGM3 | Restart TM |
| 2303 | MGM3 | SM3 | TM elapse | | MGM4 | Restart TM |
| 2304 | MGM4 | SM4 | TM elapse | | MGM1 | Restart TM |
| 2305 | MGM1 | | VACOUNT=1 | | | *emit SAOK (end of MGM1) |
| 2306 | MGM1 | | VACOUNT>1 | | | *emit SABAD (end of MGM1) |
| 2307 | MGM1 | | VBCOUNT>0 | | | *emit SBBAD |
| 2308 | MGM2 | | VACOUNT>0 | | | *emit SABAD |
| 2309 | MGM2 | | VBCOUNT>0 | | | *emit SBBAD |
| 2310 | MGM3 | | VBCOUNT=1 | | | *emit SBOK (end of MGM3) |
| 2311 | MGM3 | | VBCOUNT>1 | | | *emit SBBAD (end of MGM3) |
| 2312 | MGM3 | | VACOUNT>1 | | | *emit SABAD |
| 2313 | MGM4 | | VACOUNT>0 | | | *emit SABAD |
| 2314 | MGM4 | | VBCOUNT>0 | | | *emit SBBAD |

Figure 25

WaveGammon Fixture Parameters

| Item | Signal Code | Description |
|---|---|---|
| 2501 | SNW | North West Signal |
| 2502 | SNE | North East Signal |
| 2503 | SSW | South West Signal |
| 2504 | SSE | South East Signal |
| 2505 | SAOK | Goal Initiated Permissive A Bear Off |
| 2506 | SBOK | Goal Initiated Permissive B Bear Off |

| Item | Local Variable Code | Description |
|---|---|---|
| 2507 | VAB | Team A in position to bear off = function (image processing) |
| 2508 | VAS | Team A Score Count |
| 2509 | VAD | Team A Done |

| Item | Local Variable Code | Description |
|---|---|---|
| 2510 | VBB | Team B in position to bear off = function (image processing) |
| 2511 | VBS | Team B Score Count |
| 2512 | VBD | Team B Done |

| Item | Local Timer Code | Description |
|---|---|---|
| 2513 | TG | Game Timer |
| 2514 | TE | End Timer |

Figure 26

WaveGammon Player Parameters

| Item | Signal Code | Description |
|---|---|---|
| 2601 | SA | Team A Signal |
| 2602 | SAA | Team A Attack Signal |

| Item | Signal Code | Description |
|---|---|---|
| 2603 | SB | Team B Signal |
| 2604 | SBB | Team B Attack Signal |

| Item | Variable Code | Description |
|---|---|---|
| 2605 | VM | Moving |
| 2606 | VS | Still |
| 2607 | VHU | Still & hand up |
| 2608 | VBHU | Both hands up |
| 2609 | VHU1 | Still & hand up for specified duration |
| 2610 | SNWS | Strength of North West Signal |
| 2611 | SNES | Strength of North East Signal |
| 2612 | SSWS | Strength of North West Signal |
| 2613 | SSES | Strength of North East Signal |
| 2614 | VLAT | current latitude = function (SNWS, SNEW, SSWS, SSES) |
| 2615 | VLONG | current longitude = function (SNWS, SNEW, SSWS, SSES) |
| 2616 | VLATNEW | target latitude at end of movement |
| 2617 | VLONGNEW | target longitude at end of movement |
| 2618 | VFIELD | true when in bounds = function (SNWS, SNEW, SSWS, SSES) |
| 2619 | VFIELDLAT[] | array of acceptable latitudes for stationary players |
| 2620 | VFIELDLONG[] | array of acceptable longitudes for stationary players |
| 2621 | VTOL | distance tolerance |
| 2622 | VRR | "roll value" |
| 2623 | VGN | true when in north out area = function (SNWS, SNEW, SSWS, SSES) |
| 2624 | VGS | true when in south out area = function (SNWS, SNEW, SSWS, SSES) |

| Item | Player Timer Code | Description |
|---|---|---|
| 2629 | TQ | Query Timer |
| 2630 | TR | Run Timer |
| 2631 | TO | Out Timer |

Figure 27

WaveGammon Player Modes

| Item | Local Mode Code | Description | Signal Emission |
|---|---|---|---|
| 2701 | MAS | Team A Still | SA |
| 2702 | MAM | Team A Moving | |
| 2703 | MAA | Team A Attack | SAA |
| 2704 | MAO | Team A Out | |
| 2705 | MAD | Team A Done | |
| 2706 | MAX | Team A Penalty | |

| Item | Local Mode Code | Description | Signal Emission |
|---|---|---|---|
| 2707 | MBS | Team B Still | SB |
| 2708 | MBM | Team B Moving | |
| 2709 | MBA | Team B Attack | SBA |
| 2710 | MBO | Team B Out | |
| 2711 | MBD | Team B Done | |
| 2712 | MBX | Team B Penalty | |

Figure 28

WaveGammon Team A Processing

| Item | Current Mode | Current Transmission | Current Parameter | Received Signal | Update Mode | Update Parameter |
|---|---|---|---|---|---|---|
| 2801 | MAS | SA | | SBB in absence of external SA | MAO | Restart TO |
| 2802 | MAS | SA | (random) (periodic) | | | RR assigned randomly Restart TQ |
| 2803 | MAS | SA | TQ elapse | | | RR = 0 |
| 2804 | MAS | SA | RR>0 & VM=true | | MAM | VLATNEW = VLAT + RR RR = 0 Restart TR |
| 2805 | MAS | SA | RR=0 & VM=true | | MAX | |
| 2806 | MAS | SA | VLAT Not equal VLATNEW | | MAX | |
| 2807 | MAS | SA | VLAT not in VFIELDLAT[] | | MAX | |
| 2808 | MAS | SA | VLONG not in VFIELDLONG[] | | MAX | |
| 2809 | MAM | | VGS=true | | MAD | |
| 2810 | MAM | | VLAT equals VLATNEW | | MAA | |
| 2811 | MAM | | TR elapse & [VS=not true or VLAT not equal VLATNEW] | | MAX | |
| 2812 | MAA | SAA | VLAT equal VLATNEW | | MAS | (brief) |
| 2813 | MAA | SAA | VLAT equal VLATNEW | | MAX | |
| 2814 | MAO | | VS=true and VGN=true and TO elapsed | | MAS | |
| 2815 | MAO | | VLONG in VFIELDLONG[] | | MAX | |
| 2816 | | | *VHU | | | *initiate double |
| 2817 | | | | | | * penalize illegal move (e.g. – move to SAA/SBB) |

WaveBall Field

Figure 31

WaveBall Projectile Parameters

| Item | Ball Signal Code | Description |
|---|---|---|
| 3101 | SPP | Ball (projectile) in Play |
| 3102 | SPKA | Team A Free Kick |
| 3103 | SPKB | Team B Free Kick |
| 3104 | SPD1 | Ball far from desired location |
| 3105 | SPD2 | Ball near desired location |
| 3106 | SPD3 | Ball at desired location |
| 3107 | SPGA | Team A Goal |
| 3108 | SPGB | Team B Goal |

| Item | Goals Signal Code | Description |
|---|---|---|
| 3109 | VGN | Goal North Signal |
| 3110 | VGS | Goal South Signal |

| Item | Local Variable Code | Description |
|---|---|---|
| 3111 | VAS | Team A Score |
| 3112 | VBS | Team B Score |
| 3113 | VI | Ball Impact Detected |
| 3114 | VILAST | Team that last impacted ball (A or B) |
| 3115 | SNWS | Strength of Fixture North West Signal |
| 3116 | SNES | Strength of Fixture North East Signal |
| 3117 | SSWS | Strength of Fixture South West Signal |
| 3118 | SSES | Strength of Fixture South East Signal |
| 3119 | SSGN | Strength of Goal North Signal |
| 3120 | SSGS | Strength of Goal South Signal |
| 3121 | SOTHER | Other Signal from Fixtures (e.g. – offside) |
| 3122 | VOUT | True if Ball Out of Bounds = function (VCUR) |
| 3123 | VHAND | True if Proximity to Player Hand |
| 3124 | VCUR | Current Location = function (SNWS, SNEW, SSWS, SSES) |
| 3125 | VFREE | Location of Free Kick = function (SNWS, SNEW, SSWS, SSES) |
| 3126 | VD1 | True if ball is far from desired location = function (VCUR, VFREE) |
| 3127 | VD2 | True if ball is near desired location = function (VCUR, VFREE) |
| 3128 | VD3 | True if ball is at desired location = function (VCUR, VFREE) |
| 3129 | VCEN | Location of Centre |

Figure 32

WaveBall Projectile Modes

| Item | Local Mode Code | Description | Signal Emission |
|------|-----------------|-------------|-----------------|
| 3201 | MPP | Play mode | SPP |
| 3202 | MPKA | Team A Free Kick mode | SPKA |
| 3203 | MPKB | Team B Free Kick mode | SPKB |
| 3204 | MPGA | Team A Goal mode | SPGA |
| 3205 | MPGB | Team B Goal mode | SPGB |

Figure 33

WaveBall Player Parameters

| Item | A Player Signal Code | Description |
|---|---|---|
| 3301 | SA | Team A Signal |
| 3302 | SAF | Team A Foul Signal |

| Item | B Player Signal Code | Description |
|---|---|---|
| 3303 | SB | Team B Signal |
| 3304 | SBF | Team B Foul Signal |

| Item | Player Signal Code | Description |
|---|---|---|
| 3305 | SH | Hand Signal |

| Item | Player Variable Code | Description |
|---|---|---|
| 3306 | VM | Moving |
| 3307 | VS | Still |
| 3308 | VHU | Still & hand up |
| 3309 | VHU1 | Still & hand up for specified duration |

Figure 34

WaveBall Player Modes and Parameters

| Item | Local Mode Code | Description | Signal Emission |
|---|---|---|---|
| 3401 | MAS | Team A Still | SA |
| 3402 | MAM | Team A Moving | |
| 3403 | MAPP | Team A Possession Projectile | SA |
| 3404 | MAO | Team A Out | SAO |
| 3405 | MAX | Team A Penalty | |

| Item | Local Mode Code | Description | Signal Emission |
|---|---|---|---|
| 3406 | MBS | Team B Still | SB |
| 3407 | MBM | Team B Moving | |
| 3408 | MBPP | Team B Possession Projectile | SB |
| 3409 | MBO | Team B Out | SBO |
| 3410 | MBX | Team B Penalty | |

| Item | Player Timer Code | Description |
|---|---|---|
| 3411 | TD | Dribble Timer |
| 3412 | TO | Out Timer |

Figure 35

WaveBall Team A Processing

| Item | Current Mode | Current Transmission | Current Parameter | Received Signal | Update Mode | Update Parameter |
|---|---|---|---|---|---|---|
| 3501 | MAS | SA | VM=true | | MAM | |
| 3502 | MAS | SA | | SPP | MAPP | Restart TD |
| 3503 | MAM | | | SPP | MAPP | Restart TD |
| 3504 | MAM | | | SB | MAO | Vibrator: Start Slow Strobe Restart TO |
| 3505 | MAPP | SA | TD expire | SPP | MAO | *emit SAF briefly Restart TO |
| 3506 | MAPP | SA | TD expire | | MAS | |
| 3507 | MAO | | VHU1=true | | MAS | Vibrator: Stop Slow Strobe |
| 3508 | MAO | | VM=true | | MAX | |
| 3509 | MAO | | VHU=false | | MAX | |
| 3510 | MAO | | TO expire | | MAX | |
| 3511 | MAX | | | | | *penalized end of game |

Figure 36

WaveBall Projectile Processing

| Item | Current Mode | Current Transmission | Current Parameter | Received Signal | Update Mode | Update Parameter |
|---|---|---|---|---|---|---|
| 3601 | MPP | SPP | VI=true | SA | | VILAST=A |
| 3602 | MPP | SPP | VI=true | SB | | VILAST=B |
| 3603 | MPP | SPP | VOUT=true VILAST=A | | MPKB | VFREE=VCUR |
| 3604 | MPP | SPP | VHAND=true VILAST=A | SH | MPKB | VFREE=VCUR |
| 3605 | MPP | SPP | VOUT=true VILAST=B | | MPKA | VFREE=VCUR |
| 3606 | MPP | SPP | VHAND=true VILAST=B | SH | MPKA | VFREE=VCUR |
| 3607 | MPP | SPP | | SAF | MPKB | VFREE=VCUR |
| 3608 | MPP | SPP | | SBF | MPKA | VFREE=VCUR |
| 3609 | MPP | SPP | | SGS | MPGB | VAS increment |
| 3610 | MPP | SPP | | SGN | MPGA | VBS increment |
| 3611 | MPKA | SPKA | VCUR=VFREE VI=true | SA | MPP | |
| 3612 | MPKB | SPKB | VCUR=VFREE VI=true | SB | MPP | |
| 3613 | MPGA | SPGA | VCUR=VCEN VI=true | SB | MPP | |
| 3614 | MPGB | SPGB | VCUR=VCEN VI=true | SA | MPP | |

Figure 37

WaveBall Team A Haptic Feedback

| Item | Start Mode | Current Transmission | Current Parameter | Received External Signal | Vibrator 1 (Warning) | Vibrator 2 (Information) |
|---|---|---|---|---|---|---|
| 3701 | | | | SPKA & SPD1 | | Single pulse repeat |
| 3702 | | | | SPKA & SPD2 | | Double pulse repeat |
| 3703 | | | | SPKA & SPD3 | | Triple pulse repeat |
| 3704 | | | | SPGA | | Strobe |
| 3705 | | | | SPGB | | SOS pattern |
| 3706 | | | | SPKB | | Strobe |
| | | | | | | |
| 3707 | | | | SPP | Pulse | |
| 3708 | | | | SPKA | Pulse | |
| 3709 | | | | SPKB | Pulse | |
| 3710 | | | | SPGA | Pulse | |
| 3711 | | | | SPGB | Pulse | |
| 3712 | | | | SA | Pulse | |
| 3713 | | | | SB | Pulse | |
| | | | | | | |
| 3714 | MAS | | | | | Pulse |
| 3715 | MAM | | | | | Pulse |
| 3716 | MAPP | | | | | Pulse+Audio1 |
| 3717 | MAPO | | | | | Pulse+Audio2 |
| 3718 | MAX | | | | | Pulse+Audio3 |
| | | | | | | |
| 3719 | | | *varies | | | *varies |
| | | | | | | |
| 3720 | | | | *varies | | *varies |

Figure 39

WaveMan Fixture Parameters

| Item | Ball Signal Code | Description |
|---|---|---|
| 3901 | SP1 | Power Fixture On |
| 3902 | SP0 | Power Fixture Off |

| Item | Signal Code | Description |
|---|---|---|
| 3903 | SD1 | Dot Fixture On |
| 3904 | SD0 | Dot Fixture Off |

| Item | Signal Code | Description |
|---|---|---|
| 3905 | SHF | Home Fixture |

| Item | Local Variable Code | Description |
|---|---|---|
| 3906 | VON | When true fixture is lit |

| Item | Local Mode Code | Description | Signal Emission |
|---|---|---|---|
| 3907 | MP1 | Power Fixture On | SP1 |
| 3908 | MP0 | Power Fixture Off Mode | SP0 |

| Item | Local Mode Code | Description | Signal Emission |
|---|---|---|---|
| 3909 | MD1 | Dot Fixture On | SD1 |
| 3910 | MD0 | Dot Fixture Off Mode | SD0 |

Figure 40

WaveMan Player Parameters

| Item | Man Signal Code | Description |
|---|---|---|
| 4001 | SMD | Man defend signal |
| 4002 | SMA | Man attack signal |

| Item | Ghost Signal Code | Description |
|---|---|---|
| 4003 | SC | Chaser Signal |

| Item | Player Variable Code | Description |
|---|---|---|
| 4004 | VSM | score |
| 4005 | VHU | hand up |
| 4006 | VPS | power timer setting |

| Item | Player Variable Code | Description |
|---|---|---|
| 4007 | TR | Run Timer |
| 4008 | TP | Power Timer |

| Item | Local Mode Code | Description | Signal Emission |
|---|---|---|---|
| 4009 | MMD | Man Defend mode | SMD |
| 4010 | MMA | Man Attack mode | SMA |
| 4011 | MMO | Man Out mode | |
| 4012 | MMX | Man Penalty mode | |

| Item | Local Mode Code | Description | Signal Emission |
|---|---|---|---|
| 4013 | MCP | Chaser Play mode | SC |
| 4014 | MCO | Chaser Out mode | |
| 4015 | MCX | Chaser Penalty Mode | |

Figure 41

WaveMan Man Logic

| Item | Current Mode | Current Transmission | Current Parameter | Received Signal | Update Mode | Update Parameter |
|---|---|---|---|---|---|---|
| 4101 | MMD | SMD | | SC | MMO | |
| 4102 | MMD | SMD | | SD1 | | VSM increment |
| 4103 | MMD | SMD | | SP1 | MMA | VSM increment<br>Restart TP<br>Begin audio |
| 4104 | MMA | SMA | | SD1 | | VSM increment |
| 4105 | MMA | SMA | | SP1 | | VSM increment<br>Restart TP<br>Begin audio |
| 4106 | MMA | SMA | | SC | | VSM increment |
| 4107 | MMA | SMA | TP elapse | | MMD | End audio |
| 4108 | MMO | | | | | *game over |
| 4109 | | | | lose SP1 | | Restart TR |
| 4110 | | | | lose SP0 | | Restart TR |
| 4111 | | | | lose SD1 | | Restart TR |
| 4112 | | | | lose SD0 | | Restart TR |
| 4113 | | | | gain SP1 | | TR stop |
| 4114 | | | | gain SP0 | | TR stop |
| 4115 | | | | gain SD1 | | TR stop |
| 4116 | | | | gain SD0 | | TR stop |
| 4117 | | | TR elapse | | MAX | *game over, penalize |

Figure 42

WaveMan Fixture Logic

| Item | Current Mode | Current Transmission | Current Parameter | Received Signal | Update Mode | Update Parameter |
|---|---|---|---|---|---|---|
| 4201 | MP1 | SP1 | VON=true | SMD | MP0 | VON=false |
| 4202 | MP1 | SP1 | VON=true | SMA | MP0 | VON=false |
| 4203 | MP0 | SP0 | VON=false | | | |

| Item | Current Mode | Current Transmission | Current Parameter | Received Signal | Update Mode | Update Parameter |
|---|---|---|---|---|---|---|
| 4204 | MD1 | SD1 | VON=true | SMD | MD0 | VON=false |
| 4205 | MD1 | SD1 | VON=true | SMA | MD0 | VON=false |
| 4206 | MD0 | SD0 | VON=false | | | |

WaveBlock Field

Figure 44

WaveBlock Fixture Parameters

| Item | Signal Code | Description |
|---|---|---|
| 4401 | SFO | Fixture Open |
| 4402 | SFAH | Fixture A Hold |
| 4403 | SFBH | Fixture B Hold |
| 4404 | SFAB | Fixture A Block |
| 4405 | SFBB | Fixture B Block |
| 4406 | SFAT | Fixture A Transfer |
| 4407 | SFBT | Fixture B Transfer |

| Item | Fixture Timer Code | Description |
|---|---|---|
| 4408 | VAV | True when Team A Victory (All A Blocks adjacent or arranged in required pattern) |
| 4409 | VBV | True when Team B Victory (All B Blocks adjacent or arranged in required pattern) |

| Item | Fixture Timer Code | Description |
|---|---|---|
| 4410 | TH | Handshake timer |

| Item | Local Mode Code | Description | Signal Emission | Indication |
|---|---|---|---|---|
| 4411 | MFO | Fixture Open Mode | SFO | Unlit |
| 4412 | MFAH | Fixture A Hold Mode | SFAH | Violet |
| 4413 | MFBH | Fixture B Hold Mode | SFBH | Pale Red |
| 4414 | MFAB | Fixture A Block Mode | SFAB | Blue |
| 4415 | MFBB | Fixture B Block Mode | SFBB | Pale Orange |
| 4416 | MFAT | Fixture A Transfer Mode | SFAT | Green |
| 4417 | MFBT | Fixture B Transfer Mode | SFBT | Pale Yellow |

Figure 45

WaveBlock Player Parameters

| Item | Ball Signal Code | Description |
|---|---|---|
| 4501 | SA | Player A |
| 4502 | SAM | Player A Moving |

| Item | Ball Signal Code | Description |
|---|---|---|
| 4503 | SB | Player B |
| 4504 | SBM | Player B Moving |

| Item | Local Mode Code | Description | Signal Emission |
|---|---|---|---|
| 4505 | MAM | Team A Moving | SAM |
| 4506 | MAS | Team A Still | SA |
| 4507 | MAO | Team A Out | |

| Item | Local Mode Code | Description | Signal Emission |
|---|---|---|---|
| 4508 | MBM | Team B Moving | SBM |
| 4509 | MBS | Team B Still | SB |
| 4510 | MBO | Team B Out | |

| Item | Player Timer Code | Description |
|---|---|---|
| 4511 | TR | Run Timer |

Figure 46

WaveBlock Player Processing

| Item | Current Mode | Current Transmission | Current Parameter | Received Signal | Update Mode | Update Parameter |
|---|---|---|---|---|---|---|
| 4601 | MAM | SAM |  | SB | MAO |  |
| 4602 | MAM | SAM |  | SFBH | MAO |  |
| 4603 | MAM | SAM |  | SFBB | MAO |  |
| 4604 | MAM | SAM |  | SFBT | MAO |  |
| 4605 | MAS | SA | VM=true |  | MAM |  |
| 4606 | MAO |  |  |  |  | *lose |
| 4607 |  |  |  | lose SFO |  | Restart TR |
| 4608 |  |  |  | lose SFAB |  | Restart TR |
| 4609 |  |  |  | lose SFAH |  | Restart TR |
| 4610 |  |  |  | lose SFAT |  | Restart TR |
| 4611 |  |  |  | gain SFO |  | TR stop |
| 4612 |  |  |  | gain SFAB |  | TR stop |
| 4613 |  |  |  | gain SFAH |  | TR stop |
| 4614 |  |  |  | gain SFAT |  | TR stop |
| 4615 |  |  | TR elapse |  | MAO | *lose |

Figure 47

WaveBlock Fixture Processing

| Item | Current Mode | Current Transmission | Current Parameter | Received Signal | Update Mode | Update Parameter |
|---|---|---|---|---|---|---|
| 4701 | MFO | | | lose SAM | MFAH | Restart TH |
| 4702 | MFO | | | lose SBM | MFBH | Restart TH |
| 4703 | MFAH | | | SFAT | MFAB | |
| 4704 | MFAH | | TH elapse | | MFO | |
| 4705 | MFBH | | | SFBT | MFBB | |
| 4706 | MFBH | | TH elapse | | MFO | |
| 4707 | MFAB | | | gain SAM | MFAT | Restart TH |
| 4708 | MFBB | | | gain SBM | MFBT | Restart TH |
| 4709 | MFAT | | | SFAH | MFO | |
| 4710 | MFAT | | TH elapse | | MFAB | |
| 4711 | MFBT | | | SFBH | MFO | |
| 4712 | MFBT | | TH elapse | | MFBB | |

WaveLord Field

Figure 50

WaveWar Parameters

| Item | Role | Sea Still Permission | Sea Moving Permission | Land Still Permission | Land Moving Permission |
|---|---|---|---|---|---|
| 5001 | Boat | yes | yes | no | no |
| 5002 | Infantry | with boat | with boat | yes | yes |
| 5003 | Artillery | with boat | with boat | yes | yes |
| 5004 | Plane | no | yes | yes | yes |

| Item | Role | Run Interval (s) | Wait Interval (s) |
|---|---|---|---|
| 5005 | Boat | 2 | 2 |
| 5006 | Infantry | 2 (land) | 2 (land) |
| 5007 | Artillery | 2 (land) | 2 (land) |
| 5008 | Plane | 10 | 10 |

| Item | Variable | Value (s) |
|---|---|---|
| 5009 | Hit Interval | 4 |

| Item | Role | Opponent Boat Signal Vulnerability Probability | Opponent Infantry Signal Vulnerability Probability | Opponent Artillery Signal Vulnerability Probability | Opponent Plane Signal Vulnerability Probability |
|---|---|---|---|---|---|
| 5010 | Boat | 80% (high) | 20% (low) | 80% (high) | 20% (low) |
| 5011 | Infantry | 50% (med) | 50% (med) | 50% (med) | 50% (med) |
| 5012 | Artillery | 50% (med) | 50% (med) | 50% (med) | 50% (med) |
| 5013 | Plane | 20% (low) | 20% (low) | 20% (low) | 20% (low) |

WaveDodge Field

Shin worn apparatus

GAME SYSTEM, DEVICE AND METHOD FOR PLAYING A GAME

CROSS REFERENCE TO RELATED APPLICATION

This application claims priority from U.S. provisional patent application Ser. No. 62/957,526 filed Jan. 6, 2019, the entirety of which is incorporated herein by reference.

BACKGROUND OF THE INVENTION

1. Field of the Invention

The present invention relates generally to systems and methods for strategic games and athletics games. The present invention relates generally to devices and methods pertaining to novel sports, games, and amusements (USPC Index Class A63F9/00 and USPC Index Class 463). The present invention relates generally to amusement devices and games, and more specifically those including means for processing data (USPC Index Class 463 subclass 1). Certain embodiments of the invention relate to a simulated court game or athletic event (USPC Index Class 463 subclass 4). Certain embodiments of the invention relate to games using a tangible projectile (USPC Index Class 467). Certain embodiments of the invention relate generally to training appliances or apparatus for special sports (CPC A63B 69/00). The present invention also relates generally to games or sports accessories (CPC A63B 71/00), and more specifically to those for large room or outdoor sporting games (A63B 71/02) as well as for small-room or indoor sporting games (CPC A63B 71/04).

2. Description of the Related Art

In the prior art can be found attempts to incorporate electronics into physical games.

In U.S. Pat. No. 4,695,058A, Carter and Dooley describe a system that is used in the activity now known as laser tag. The photo-electric hit-detector type systems of Carter and Dooley, and others, employ beams and detection of beams at receivers to register a score. U.S. Pat. No. 4,695,058A does not teach games employing strategic thinking, nor proximity-based games, nor means of mitigating close-proximity related gaming injuries.

In U.S. Pat. No. 5,393,074A, Bear and Jordan describe a modular electronic gaming system that allows players to participate physically in video-game style games. The "smart gaming system" of Bear and Jordan employs interconnected modules that uses sensors to detect and indicate player positions and activities as they walk among them. The Bear and Jordan system employs a processor to translate sensor input into game states and score. U.S. Pat. No. 5,393,074A does not teach a method for players to engage in strategic and athletic games over a wide area with simple and small fixtures.

In U.S. Pat. No. 5,127,657A, Ikezawa and Mochino present an amusement system, similar to Bear and Jordan. The amusement system uses sensors to detect player position and "hits" (by shooting) and changes a game representation accordingly. U.S. Pat. No. 5,127,657A does not teach gaming methods wherein both strategy and fitness affects the gaming outcome. U.S. Pat. No. 5,127,657A does not teach gaming methods that allow play over a wide area with simple and small fixtures.

In U.S. Pat. No. 9,396,641B1, Allen et. al. describe a system for predicting and warning of impacts employing a user-wearable warning device to provide a warning output to the user (i.e.—sports player) in advance of a predicted time of the potential impact. The system of Allen et. al predicts potential impact by computation/processing based on user motion vectors and object motion vectors. U.S. Pat. No. 9,396,641B1 does not teach devices or methods for the prediction of potential impact by signal strength of waves emitted by the approaching player or object. U.S. Pat. No. 9,396,641B1 does not teach methods of gaming that avoid close-proximity play (and thereby avoid collisions).

In Pers Ubiquit Comput (2004) 8: 71-81 DOI 10.1007/ 500779-004-0267-x "Human Pacman: a mobile, wide-area entertainment system based on physical, social, and ubiquitous computing", Cheok et. al describe a gaming system employing a role-playing augmented-reality processor that is physical, fantasy based, and involves real human-social and mobile gaming. The gaming system employs signal communication with LAN and central server and augmented-reality glasses, and game play that involves player contact. Some limitations of the system described by Cheok et. al include: use of a costly and range limited centralized server, use of a costly augmented-reality system, risk of player injury due to close-proximity play.

In CHI 2011, May 7-12, 2011, Vancouver, BC, Canada. ACM 978-1-4503-0268-5/11/05 "TagURIt: A Proximity-based Game of Tag Using Lumalive e-Textile Displays", and in "Social Appropriateness of Touch Sensor Placement on Interactive Lumalive E-Textile Shirts by Sylvia Hou-Yan Cheng" (Queen's University Kingston, Ontario, Canada August 2011 Copyright c Sylvia Hou-Yan Cheng, 2011), Cheng et. al describe TagURIt, a dynamic game of tag wherein players physically represent a Universal Resource Indicator (URI) tagged with real-time location information, wherein each player wears a high resolution Lumalive textile display embedded in a shirt, wherein the display is modified based on player proximity, wherein player proximity is measured by LPS (local positioning system) or GPS (global positioning system) or RSSI (received signal strength using the Xbee Lily node-based bus packet-radio digital-radio communication protocol networking system). Wearable displays are modified based on player position, chasers touch target players and gain points depending on the state of the wearable display, the target is determined by a centralized processor. Some limitations of the TagURIt system include: use of a costly and range limited centralized server and architecture, reliance on expensive and cumbersome wearable lights as the main means of primary communication, risk of injury due to close-proximity play, complicated signal communication.

On Feb. 3 2019, a "Superbowl" TV commercial was broadcasted that depicted a "real-life" game of Pac-Man (an arcade game). In the game, human players interacted in a maze, in a Pac-Man like game. The game employed indicators that were under manual/external control. The "Superbowl" Pac-Man broadcast does not teach a system or method of undertaking "real-life" arcade-like games, without relying on manual/external/remote control and intervention.

The ROXs real life gaming system offered by Kilian Saekel and company employs electronic objects that players touch and/or carry to play "real-world" video games intended for youth. The ROXs electronic objects communicate with each other via a master controller and RF signals. ROXs does not teach systems or methods to allow players to play strategic games without the use of network communication, in a manner that avoids close-proximity play.

In the game "SPOOKY", which is executed with the WOVEN e-wearable platform offered by wearablegames.eu (Kersten and Ribbens), players don wearable electronics, make gestures that are measured by (and affect) an electronic system in order to carry out actions in the game, and influence other players by signal communication. SPOOKY does not teach games employing strategic thinking. SPOOKY relies on wearable lights as the primary means of visual state indication. SPOOKY does not teach alternatives to using wearable lights as the primary means of visual state indication (to obviate or simplify the requirement for the usage of expensive and cumbersome wearable lights). SPOOKY does not teach methods of gaming that avoid close-proximity play. SPOOKY does not games with a strategic challenge.

The SuperSuit gaming system offered by SuperSuit Inc./MadRat games allows enhanced laser tag like games intended for youth (i.e.—similar to U.S. Pat. No. 4,695,058A, Carter and Dooley). The SuperSuit system includes a vest (with sensors and display for laser tag like games), glove (which acts as a laser tag gun or RC controller) and a bot/beacon (acts as lasertag target or shooter or captured object, may sometimes be worn to shoot opponents that are unshielded by the bot carrier/wearer). SuperSuit does not teach games employing strategic thinking. SuperSuit, relies on wearable lights as the primary means of visual state indication. SuperSuit does not teach alternatives to using wearable lights as the primary means of visual state indication (to obviate or simplify the requirement for the usage of expensive and cumbersome wearable lights). SuperSuit does not teach methods of gaming that avoid close-proximity play.

The 'ARENA' system offered by LaserForce (laserforce-etag.com) includes beacons. The beacons are employed in laser tag games and can be used to shoot nearby players. Such beacons enhance the laser tag experience but do not allow for games that employ strategic thinking.

The article 'Pervasive gaming: Status, trends and design principles, Journal of Network and Computer Applications, June 2015, DOI:10.1016/j.jnca.2015.05.009' lists state of the art live action role playing games that employ electronics. A shortcoming of the games described is that they rely on costly and complicated networking methods (GPS, WiFi, IEEE 802.15.4, etc.). The games described in the paper do not teach methods of territorial control, which is an aspect of abstract strategy games.

The PhD thesis 'Pervasive GameFlow—Identifying and Exploring the Mechanisms of Player Enjoyment in Pervasive Games, Kalle Egers, Department of Informatics, Umea University Sweden, 2009' describes the game FIASCO, which employs networking and GPS methods to mark (but not control) territory in a manner that does not enable strategic athletic games.

Tagaboo is an interactive game for two or more children that is based upon wearable radio frequency identification (RFID) technology. One or more children wears a vest containing RFID tagged tokens, while one or more pursuers wear gloves with embedded RFID readers. The system lacks the ability to influence from a distance. The system lacks the ability to control zones through omnidirectional influence.

Beam virtual playground uses a projector and camera-based motion capture to create a virtual gaming space. Lumo play is similar to Beam virtual playground. The present invention does not employ a projector.

Seen in the prior art are inventions that employ complex, expensive, and cumbersome devices and communication methods that permit shoot-hit type games, laser tag type games, and other simple games (mainly for youth) that have changed little in the decades since Carter and Dooley. The physical games enabled by the prior art lack the potential to create a strategic challenge. Prior art inventions employ expensive, cumbersome, unclear wearable lighting. The prior art has not taught devices and methods and devices to provide for activities that challenge players in both strategic thinking and physical ability. Furthermore, inherent in the games taught by the prior art is close-proximity play and the attendant risk of injury due to collision, etc.

In U.S. Pat. No. 6,981,700B2, Syed and Syed describe a turn-based strategic board game called Arimaa. Arimaa was designed to be difficult for computer players. Human vs. computer competition in Arimaa furthered the development of artificial intelligence. As a result, computers are now capable of defeating humans in Arimaa. Human-computer competitive and/or cooperative play in strategic athletic games represents an opportunity to advance the science of artificial intelligence.

BRIEF SUMMARY OF THE INVENTION

The present invention is directed at a system for playing a game involving first and second players, the game having a set of rules by which the game is to be played. The system includes a transmitter worn by the first player, said transmitter emitting a first signal at a signal strength which decreases as the signal propagates away from the transmitter. The system further includes a receiver worn by the second player, said receiver configured to read the first signal, the receiver being further configured to measure the signal strength of said first signal. A processor coupled to the receiver is also included, the processor configured to create a zone of influence around one of the players by defining a preselected signal strength threshold. The processor is further configured to recognize a presence event when the signal strength read by the receiver equals or exceeds the preselected signal strength threshold. The processor is configured to store the set of rules, the processor being further configured to use the recognition of the presence event in the application of the rules. Preferably, the transmitter is an omnidirectional transmitter.

The present invention is also directed at system for playing a game as defined above further including an indicating device worn by one of the players, the indicating device coupled to the processor, the processor configured to activate the indicating device when the strength of the signal received by the receiver passes a predetermined indicating threshold, the indicating device configured such that when triggered, the indicating device emits an indicating signal selected from the group comprising an audible signal, a visual signal and a vibrational signal.

The present invention is also directed at a system for playing a game as defined in the preceding paragraphs wherein the processor is configured to identify a gesture, the processor being further configured to identify the gesture from a catalog of gestures stored on the processor, the processor being further configured to use the identified gesture in the application of the rules.

The present invention is also directed at a system for playing a game as defined in claim 1 wherein one of the players is intended to be an object and the other player is intended to be a natural person.

The present invention is also directed at a system for playing a game as defined above wherein the processor is worn by the second player.

The present invention is also directed at a system for playing a game involving at least two players on a playing field having a width, the game having a set of rules by which the game is to be played. In the system, each player wears a transmitter configured to emit a signal identifying the player wearing the transmitter, the signal having a signal strength which decreases along the width of the playing field. Each player also wears a receiver configured to read the signal transmitted by the other player, the receiver being further configured to measure the signal strength of said signal. A processor is coupled to each receiver, the processor configured to create a zone of influence around each of the players by defining a preselected signal strength threshold for each player. The processor is further configured to recognize a presence event when the signal strength read by the receiver exceeds the preselected signal strength threshold. The processor is also configured to store the set of rules, the processor being further configured to use the recognition of the presence event in the application of the rules.

The invention is also directed at a system of playing a game as defined in the preceding paragraph wherein each receiver and transmitter is wirelessly coupled to the processor, the processor being remote to each player and the transmitter is an omnidirectional transmitter.

The invention is also directed at a system for playing a game as defined in the preceding paragraph further including an indicating device worn by one of the players, the indicating device coupled to the processor, the processor configured to activate the indicating device when the strength of the signal received by the receiver passes a predetermined indicating threshold, the indicating device configured such that when triggered, the indicating device emits an indicating signal selected from the group comprising an audible signal, a visual signal and a vibrational signal.

The invention is also directed at a system for playing a game as defined in the preceding paragraph wherein the processor is configured to identify a gesture, the processor being further configured to identify the gesture from a catalog of gestures stored on the processor, the processor being further configured to use the identified gesture in the application of the rules.

The invention is also directed at a system for playing a game as defined in the preceding paragraph wherein at least one of the players is intended to be an object and at least one player is intended to be a natural person.

The invention is also directed at a system for playing a game as defined in the preceding paragraph wherein the processor comprises a plurality of processors, each player wearing one of said processors.

The invention is also directed at a wearable electronic kit useful in playing a game involving a plurality of players on a playing field having a width, at least some of the players wearing said wearable electronic kit, the game having a set of rules by which the game is to be played. Each wearable electronic kit includes a transmitter configured to emit a signal identifying the player wearing the wearable electronic kit, the signal having a signal strength which decreases along the width of the playing field. The receiver is configured to read the signals transmitted by the electronic kits worn by other players, the receiver being further configured to measure the signal strength of each of said signals. The wearable electronic kit further includes a processor coupled to the receiver, the processor configured to create zones of influence around the other players by defining a preselected signal strength threshold for each signal. The processor is further configured to recognize a presence event in the zone of influence by comparison of the signal strength read by the receiver to the preselected signal strength threshold of the player. The processor is further configured to store the set of rules and to use the recognition of the presence event in the application of the rules.

The invention is also directed at a wearable electronic kit as described in the preceding paragraph wherein the transmitter is an omnidirectional transmitter.

The invention is also directed at a wearable electronic kit as described in the preceding paragraph further including an indicating device coupled to the processor, the processor configured to activate the indicating device when the strength of the signal received by the receiver passes a predetermined indicating threshold, the indicating device configured such that when triggered, the indicating device emits an indicating signal selected from the group comprising an audible signal, a visual signal and a vibrational signal.

The invention is also directed at a wearable electronic kit as described in the preceding paragraph wherein the processor is configured to measure a gesture, the processor being further configured to identify the gesture from a catalog of gestures stored on the processor, the processor being further configured to use the identified gesture in the application of the rules. Preferably at least one antenna is also included that surrounds a body part of the wearer.

The invention is also directed at a wearable electronics kit described in the preceding paragraph wherein the receiver of at least one electronics kit receives signals transmitted in synchrony with music and wherein the processor is further configured to identify when a gesture is synchronous with the musical rhythm in the application of the rules.

The invention is also directed at a method of playing a game among a plurality of players wearing the electronic kit as described in the preceding paragraph including the steps of defining the zone of influence around at least one of the players and applying the set of rules for each presence event.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 7. is a schematic view of the WaveTag game playable using the present invention.

FIG. 8. Is a schematic view of the WaveTag Player Parameters.

FIG. 9. is a schematic view of the WaveTag Player Modes.

FIG. 10. is a schematic view of the WaveTag Team A Processing—Part 1.

FIG. 11. is a schematic view of the WaveTag Team A Processing—Part 2.

FIG. 12. is a schematic view of the WaveTag Team A Processing—Part 3.

FIG. 13. is a schematic view of the WaveTag Fixture Processing.

FIG. 15. is a schematic view of the WaveTag Team A Haptic Feedback.

FIG. 18. is a schematic view of the WaveChess Player Parameters.

FIG. 19. is a schematic view of the WaveChess Player Modes.

FIG. 20. is a schematic view of the WaveChess Team A Processing—Part 1.

FIG. 21. is a schematic view of the WaveChess Team A Processing—Part 2.

FIG. 22. is a schematic view of the WaveChess Team A Processing—Part 3.

FIG. 23. is a schematic view of the WaveChess Typical Goal Processing.

FIG. 25. is a schematic view of the WaveGammon Fixture Parameters.

FIG. 26. is a schematic view of the WaveGammon Player Parameters.

FIG. 27. is a schematic view of the WaveGammon Player Modes.

FIG. 28. is a schematic view of the WaveGammon Player Processing.

FIG. 31. is a schematic view of the WaveBall Projectile Parameters.

FIG. 32. WaveBall Projectile Modes (Embodiment 10)

FIG. 33. WaveBall Player Parameters (Embodiment 10)

FIG. 34. WaveBall Player Modes and Parameters (Embodiment 10)

FIG. 35. WaveBall Team A Processing (Embodiment 10)

FIG. 36. WaveBall Projectile Processing (Embodiment 10)

FIG. 37. WaveBall Team A Haptic Feedback (Embodiment 10)

FIG. 39. WaveMan Fixture Parameters (Embodiment 11)

FIG. 40. WaveMan Player Parameters (Embodiment 11)

FIG. 41. WaveMan Man Logic (Embodiment 11)

FIG. 42. WaveMan Fixture Logic (Embodiment 11)

FIG. 44. WaveBlock Fixture Parameters (Embodiment 12)

FIG. 45. WaveBlock Player Parameters (Embodiment 12)

FIG. 46. WaveBlock Player Processing (Embodiment 12)

FIG. 47. WaveBlock Fixture Processing (Embodiment 12)

FIG. 50. WaveWar Parameters.

In the drawings like characters of reference indicate corresponding parts in the different figures.

DETAILED DESCRIPTION OF EMBODIMENTS OF THE INVENTION

In the embodiment descriptions, playing field is used to denote a location where a game takes place. The playing field will generally have a width which is defined as the greatest linear dimension of the field. The playing field may be square, rectangular, circular or any other shape desired, depending on the needs of the game to be played on the playing field. Playing fields may be indoor or outdoor and may cover a relatively large area. Drawings are not to scale. In some cases, for clarity of presentation, the embodiment presented may be a simplified version of an embodiment more likely to be employed. In certain embodiment descriptions below, certain features will be explained in less detail than others, due to commonality with features described elsewhere. In some embodiment descriptions (e.g.—where poses, gestures, and movements are used to convey information), the terms pose, gesture, and informatory movement may be used interchangeably. Programming logic shown is indicative and arranged for clarity of presentation; actual implementation of programming logic may vary from what is shown herein.

Figure 1:
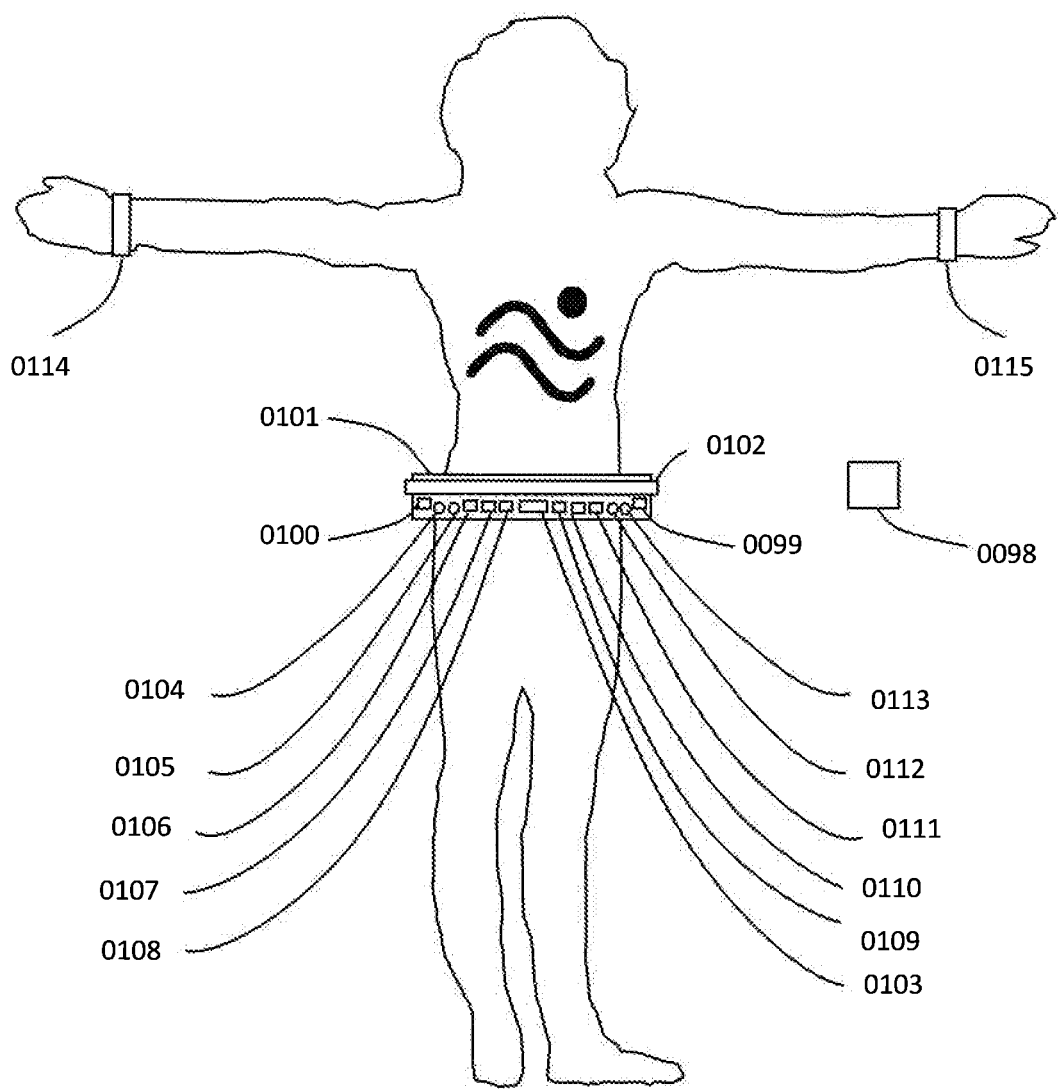
FIG. 1 is a conceptual elevation view of a player wearing an electronic kit made in accordance with the present invention.

Embodiment 1 of the invention is shown in FIG. 1. FIG. 1 describes a wearable electronic kit that would enable a player to participate in most of the games described in this specification (albeit the kit of FIG. 1 is not necessarily the minimum kit required for such). The embodiment 1 kit includes a belt 0101 which is worn and supports the electronic components of the wearable kit. In some embodiments the belt is incorporated into clothing (shirt, pants, etc.). Embodiment 1 includes antenna 0102 which is used to transmit and receive signals. Antenna 0102 is operatively coupled to a transmitter 0100 which generates the signal. Antenna 0102 may, in some embodiments, also be operatively coupled to a receiver 0099 which is configured to read the signal and measure its signal strength. Antenna 0102 surrounds the player's body and is substantially omnidirectional (with respect to the player's body); emitting and receiving signals in all (azimuthal) directions. In embodiment 1 the antenna is worn on the waist; in other embodiments antennae may surround the head or neck or ankle(s) or other body parts, or may be embedded in shoes or shoe soles or other wearable items. In some embodiments an omnidirectional antenna of the halo loop type or other loop type is employed. In some embodiments a patch array antenna is used. In some embodiments elements of an antennae array are individually adjusted to achieve desired omnidirectionality. In some embodiments, elements of an antenna array transmit and/or receive in sequence. In some embodiments, a cylindrical antenna may be employed. In some embodiments a coil or spring antenna may be employed. In some embodiments the wearable antennae may be isolated from the body. In some embodiments, the wearable belt 0101 may be made dual purpose for comfortable everyday use as a belt, with unobtrusive electronic components and antennae. In embodiment 1, antenna 0102 serves as both a transmitting and receiving antenna. In other embodiments one or more transmitting antennae and/or one or more receiving antennae may be employed. Antenna 0102, through design and/or calibration, can be made to emit in such a way that constant (azimuthal) signal strength is measured around the perimeter of the zone influenced by the player, so that signal strength may be used to demarcate a zone of influence (e.g.—a circular zone). Preferably, transmitter 0100 is configured to transmit a signal at a substantially constant signal strength and receiver 0099 is configured to measure the strength of the signal transmitted by another player's transmitter. A zone of influence can be defined around the players by setting a threshold strength defining the perimeter of the zone of influence. A presence event wherein a player is within the zone of influence (such as the entry of another player into the zone of influence) can be measured by receiver 0099 and noted by processor 0103 as equaling or exceeding the threshold signal strength defining the limits of the zone of influence. The noting of a presence event, or lack thereof, can be used to recognize or infer entry, exit, presence within or presence outside of the zone of influence. This feature can be utilized to control or influence territory, a feature of abstract games and strategy games. It will be appreciated that the nature and strength of the signal must be selected to be operatively effective. If the signal strength is too great, there may be too little difference in the strength of the signal immediately adjacent a player and the strength of the signal at the farthest reach of the playing field. Therefore, to maximize the operative effectiveness of the signal, the strength of the signal emitted by the transmitting antenna should measurably decrease as the signal propagates away from the antenna across the width (length) of the playing field.

Signal-strength-based zone influence allows players to reliably influence each other at a distance, and to mitigate close-proximity play. It also allows a player's zone of influence to be readily implied to other players (i.e.—the zone of influence surrounds the player). In some embodiments (played in appropriate lighting conditions), wearable lights controlled by a player processor can create a spotlight at the player's feet to provide additional indication of zone influence. In comparison to network-based gaming communication, signal-strength-based zone influence is immediate and robust. Note however, that network methods, mesh networks, communication protocols, beam communication, time of flight methods, etc. can be used alongside signal-strength-based zone influence in a complementary manner (i.e.—for secondary purposes such as data transfer, handshaking, corroboration, etc.). Signal-strength-based zone influence systems allow players to be reliably warned about the approach of other players (or fixtures or projectiles). Such warnings can mitigate the risk of collision and injury. Such warnings can also be used to inform a player of a nearby zone of influence, which may guide a player's (strategic) decision about whether to enter said zone.

In some embodiments, signal-strength along the perimeter of a zone is constant at a given elevation but varies with elevation. In some cases, such variation is acceptable. In some cases, such variation would undermine reliable zone influence demarcation to an unacceptable degree (e.g.—due to differences in player height, etc.). Cylindrical antennae and/or ankle worn antenna and/or multi-antennae kits can be employed to mitigate such variation. Calibration means and/or processor means and/or other means can be used to mitigate such variation.

Processor 0103 is preloaded with the codified rules of the game and is configured to apply the rules of the game as the game is being played. Preferably, a game program is loaded into processor 0103, the game program being adapted to apply the rules of the game as the game is played, such as noting when a player's zone of influence is breached by another player entering the zone of influence (i.e. a presence event occurs wherein a player is within a zone of influence). The program is preferably configured to use these zone breach events (or zone entry events or presence events) to calculate a score, activate a warning signal, calculate a score or some other function pursuant to the rules of the game codified in the processor. Processor 0103 represents game state according to codified rules as programmed in the processor. Processor 0103 receives electronic inputs from worn components (e.g.—antennae, etc.) and sends signals to worn electronic components (e.g.—vibrators, buzzers). First vibrator 0104 provides warning haptic feedback to the player. First light 0105 provides status information. Movement detector 0106 (e.g.—accelerometer, triangulation unit, proximity sensor on each foot, etc.) provides motion information to the processor 0103. Motion can serve as an instruction to the processor. As will be described below, motion can be compelled by the processor 0103 (and compliance may be confirmed with detector 0106). RFID reader 0107 obtains signals from passive RFID tags on the body. RFID reader 0107 can signal to the processor 0103 to express movement, pose, or gesture (i.e.—a specified communicative motion). Button 0108 allows local user input (e.g.—for game configuration). Button 0109 allows local user input. Speaker 0110 provides status info (e.g.—sounds, bleeps, bloops, voiced messages or instructions or warnings, etc.). Battery module 0111 provides power to the wearable electronic kit. Second light 0112 provides status information. Second vibrator 0113 provides informational haptic feedback to the player.

Right passive RFID bracelet 0114 allows right hand poses and gestures to be measured by the RFID reader 0107. Left passive RFID bracelet 0115 allows left hand poses and gestures to be measured by the RFID reader 0107. RFID reader 0107 can measure poses and gestures by methods known in the prior art (e.g.—methods of 'Gesture recognition using RFID technology, Personal and Ubiquitous Computing, Asadzadeh et. al, 16(3):225-234: March 2012', or, 'Are RFID Sensing Systems Ready for the Real World?, Wang et. al, University of Waterloo, MobiSys 2019 Jun. 17-21 Seoul Korea', or by other means). Poses such as one hand up, both hands up, hands to the side, hands on hips, open hand, closed fist, etc. and other poses and gestures used in strategic athletics games can be effectively communicated to the processor by passive RFID methods (typical RFID response times are under 100 ms). In some embodiments, gesture and pose may be measured without RFID bracelets (e.g.—methods of 'Humantenna: Using the Body as an Antenna for Real-Time Whole Body Interaction, Cohn et. al, CHI 2012, May 5-10 2012 Austin Tex.'). Analogous to semaphore, poses and gestures can serve as an instruction to the processor, as well as an indication to other players. Poses and gestures can be compelled or prohibited by the processor to enforce rules, and to maintain pose and gesture as a reliable means of visual indication. In some embodiments, gesturing methods obviate (or enhance, or render optional) wearable indicator lights. In some embodiments, other actions such as speech (to inform other players of the game status, etc.) can be compelled, or used as an input to the processor to initiate actions. Processor 0103 may, in some embodiments, be configured to use the gestures and poses in the application of the game rules during the running of the game program.

Processor 0103 is preferably directly coupled to the transmitter 0100 and receiver 0099; however, processor

0103 may in fact be a sub-processor which is wirelessly coupled to a remote processor 0098. Remote processor 0098 may be preloaded with the rules of the game to be played and configured to execute the rules of the game taking into consideration the reading of gestures and the reading of zone entry/breach events.

Figure 2:
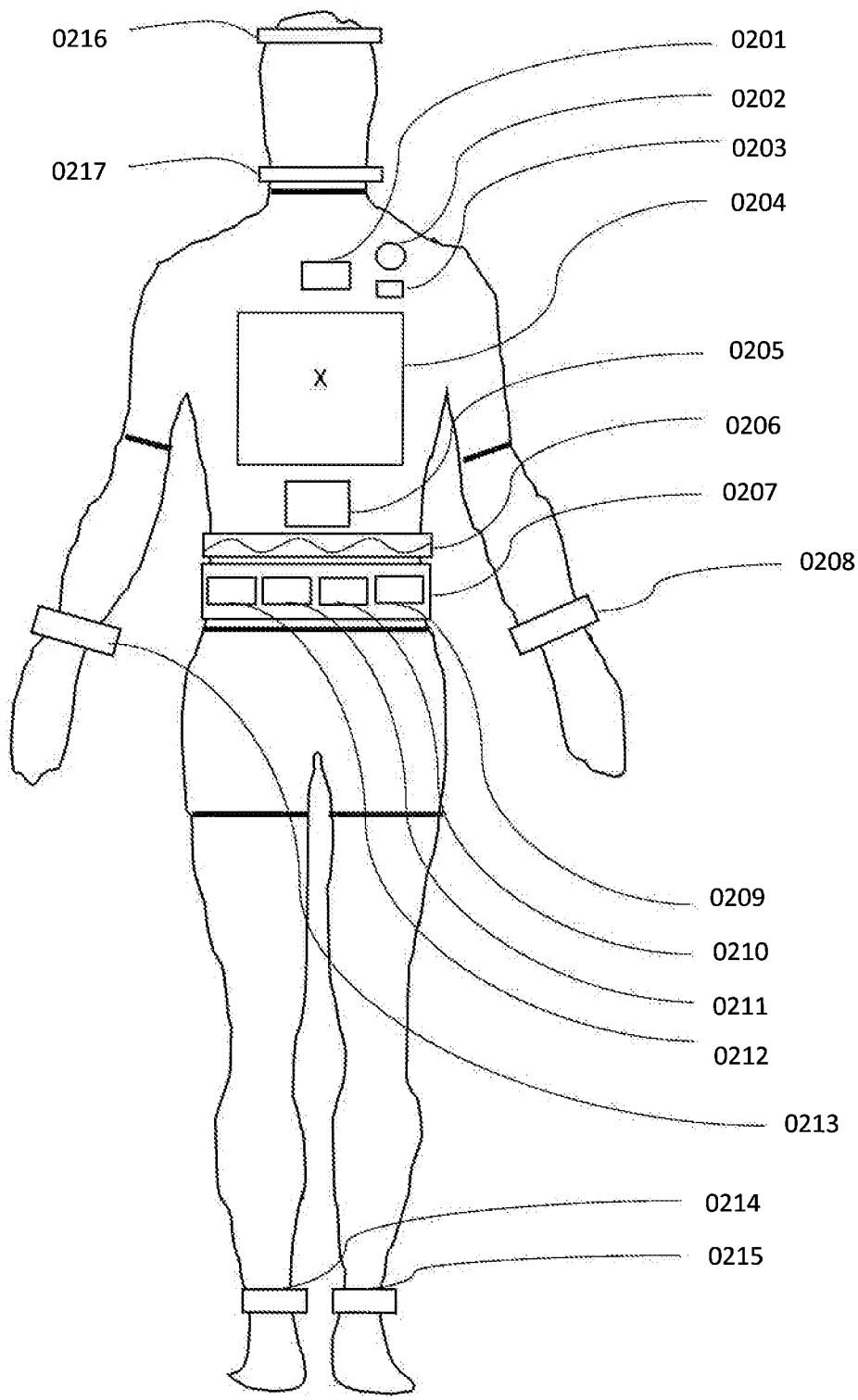
FIG. 2. Is a conceptual elevation view of player wearing alternative electronic kit made in accordance with the present invention.

An alternative wearable kit of embodiment 2 is shown in FIG. 2. First vibrator 0201 provides warnings. Speaker 0202 provides audio information near the players' ears. Player passive RFID tag 0203 provides unique information about the player to game fixtures and players. Display 0204 provides additional supplementary indication. Smartphone 0205 assists with processing and can provide a supplementary network connection. Antenna 0206 transmits and receives signals. Antenna 0206 includes a flexible substrate and a transmitting/receiving element that is wave shaped. The wave shape of antenna 0206 enhances an ability to adapt to a variety of waist sizes (in other embodiments the antenna can assume other shapes). Belt 0207 holds electronic components. Bracelets 0208 and 0213 allow RFID based pose identification. Battery 0209, movement detector 0210, RFID reader 0211, and button 0212 serve similar functions to their counterparts in embodiment 1. RFID tag 0214 and RFID tag 0215 are used in pose and gesture measurement. A variety of wearable kit configurations are possible, as reflected in the generality of the claims.

Figure 3:
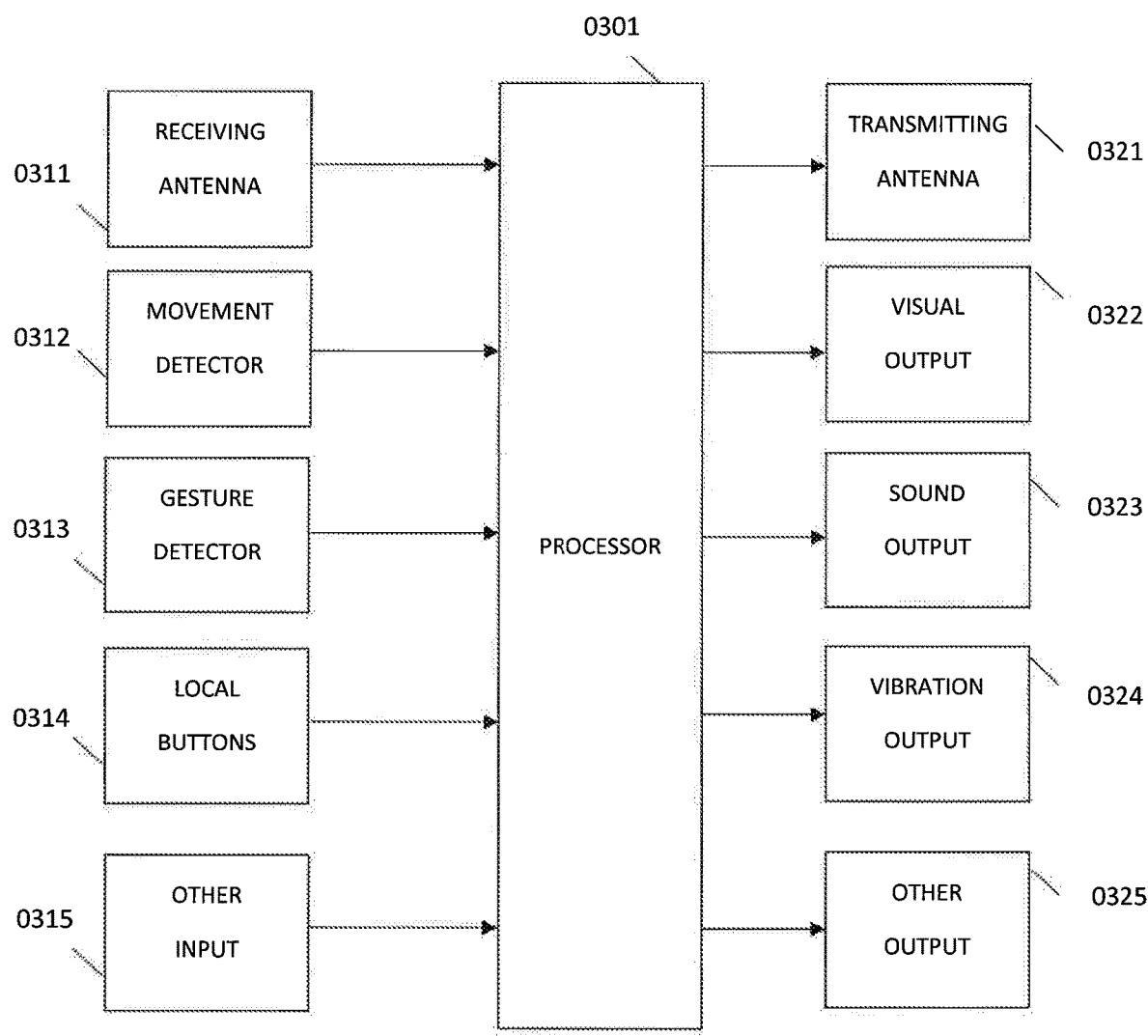
FIG. 3. Is a schematic view of the processing unit of the wearable kit shown in FIGS. 1 and 2.

FIG. 3 depicts a general electrical schematic for the wearable electronic kit of embodiment 3. Using an apparatus similar to that shown in embodiment 1, a processor 0301, obtains signal information from an antenna 0311, movement information from module 0312, gesture information from module 0313 (or directly from passive RFID tags or the like), and button input via module 0314 (or directly from buttons). As a result, the processor 0301 can cause signals transmission via antenna 0321, visual output via module 0322, sound output via module 0323, and haptic feedback via module 0324. Other inputs (0315) and outputs (0325) are possible.

Figure 4:
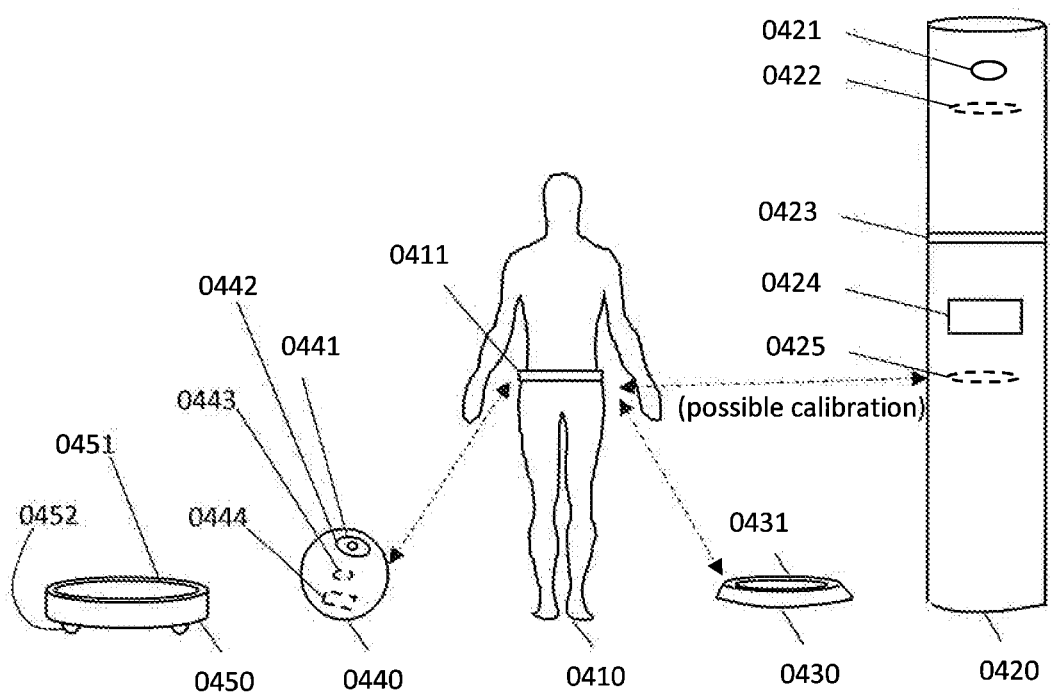
FIG. 4. Is a conceptual elevational view of the player and fixtures and projectile and robot portions of the present invention.

Embodiment 4, shown in FIG. 4, depicts various main elements that may be involved in a strategic athletics system: player 0410, major fixture 0420, minor fixture 0430, projectile 0440, and robot 0450. Player 0410 wears an electronic system that allows signal communication with other players, fixtures, projectiles, and robots. Major fixture 0420 is capable of signal communication and processing and has extensive features, including camera 0421 (e.g.—for group gesture recognition), general area antenna 0422 (e.g.—for triangulation signal broadcast or state information broadcast), indicator 0423, pregame configuration screen 0424, as well as gaming and calibration antenna 0425 (used during game play). In some embodiments, major fixtures are equipped with a foam or padded casing to minimize the risk of injury and/or damage in the event of collision. Minor fixture 0430 is capable of signal communication and processing and has a screen 0431. Minor fixture 0430 is placed on the floor or ground. Minor fixture 0430 has beveled edges to avoid trip hazard. Minor fixtures can be designed to be stackable, with power and network terminals that contact during stacking, for battery charging and bus communication (e.g.—for programming). Robot 0450 is capable of signal communication and processing and can employ a screen 0451 and/or other indicators. Robot 0450 employs systems for motion which may employ wheel 0452 or other means. In addition to the above-mentioned main elements, non-electronic obstacles and terrain may be involved in strategic athletics.

Through a calibration procedure (or by design), it is possible to adjust signal emission strength and sensitivity to received signals, such that all players (and fixtures and projectiles) encounter identical signal strength delineation of zone boundaries. Calibration (or design) can also be used to achieve "handicapping". Through calibration it is possible to adjust signal strength zone delineation on a team or individual basis, to customize influence radius, level of difficulty, or gaming experience. It can also be seen from the embodiments described below that "handicapping" can be achieved by modifying parameters in the processor (e.g.—increase or decrease times allowed for movement, time limit to score, time limit to think, etc.). Player antenna calibration can be performed by standing a known distance from a fixture, causing the player and fixture to emit signals, measuring the strength of signals received by player and fixture, and adjusting the receipt and/or emission of signals until the desired signal strength measurement/demarcation is achieved. During calibration of a radio-based system, ambient radio signal interference (typically from distant emitters) can be nullified. Also, intermittent or intentionally disruptive game-time radio interference can be addressed by various means (e.g.—systematic signal strength fluctuation, scheduled signal strength shift, scheduled frequency shift, encoded waves, etc.).

In some embodiments, major fixtures may be employed in purpose built playing fields in public or private areas and can be made to operate in synchrony with external lights, or external speakers, or other external devices. In some embodiments, wearable kits or fixtures can be fitted with audio sensors to discern musical rhythm and promote player movement in rhythm with music.

Figure 5:
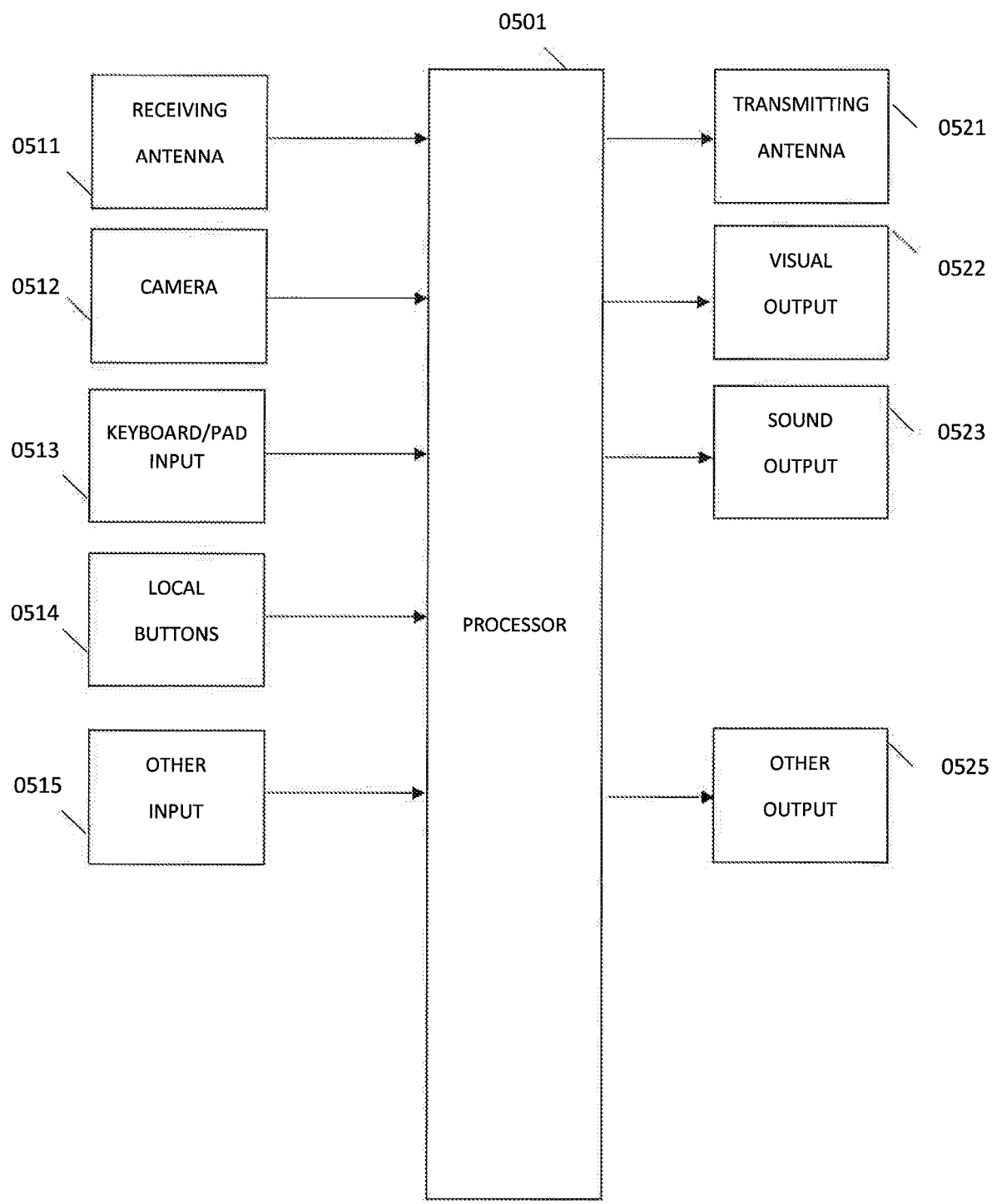
FIG. 5. Is a schematic diagram of fixture and projectile processing portion of the present invention.

FIG. 5 depicts a general electrical schematic for the major fixture of embodiment 5. Using a fixture apparatus similar to that shown in embodiment 4, a processor 0501, obtains signal information from an antenna 0511, group movement information via camera 0512, player input via input module 0513 (typically for pre-game configuration) and input module 0514. As a result, the processor 0301 can cause signal transmission via antenna 0521, visual output via module 0522, and sound output via module 0523. Other inputs (0515) and outputs (0525) are possible. Generally, the electrical system of minor fixtures and projectiles are similar to those of major fixtures. Minor fixtures are capable of some of the functionality of major fixtures. Projectiles are capable some of the functionality of major fixtures. A variety of fixture and projectile configurations are possible as reflected in the generality of the claims.

Embodiment 6, associated with FIG. 6 through 15, relates to a novel game called WaveTag; variants of which are made possible by the invention. In WaveTag, two teams (e.g.—team A vs. team B) compete in a game related to tag, british bulldog, football, cricket. An important aspect of the game is the notion of influence, which is the zone influenced by a player or fixture (sometimes referred to as the player's, or fixture's, influence). The perimeter of the influence zone is delineated by constant strength of a signal emitted by the player or fixture. WaveTag can be played with a minimal wearable kit and minimal fixtures.

In WaveTag, two fixtures are designated as goals, and the goals are placed at opposite ends of a playing field. Initially, Team A includes a player in the scorer role. Team A scores after the scorer has achieved proximity to a first goal, and then a second goal, within a time limit. Team A fails to score when one of the following conditions is met: (a) the scorer enters the influence of any stationary Team B player (i.e.—pawn or hunter), or (b) the scorer enters the influence of a hunter of Team B, or (c) a timer expires. A scorer is immune to the influence of opposing players while in the zone of influence of a stationary teammate (i.e.—pawn). If Team A fails to score, the Team A scorer is reassigned the role of Team A hunter and the Team B hunter is reassigned the role of Team B scorer, with Team B proceeding to attempt a score in the manner described. During the game, a player will temporarily lose their zone of influence under the following condition: said player is in motion while entering the zone of influence of a stationary opponent. In the game, player gestures and motion are variously compelled and prohibited in a manner that enforce rules and provides for a reliable gesture-based system of visual indication. Such compelling and prohibition is achieved by the threat of penalization (e.g.—assignment of demerit points, decreasing score, etc.). Penalization is registered electronically (and automatically) by the wearable kit.

Figure 6:
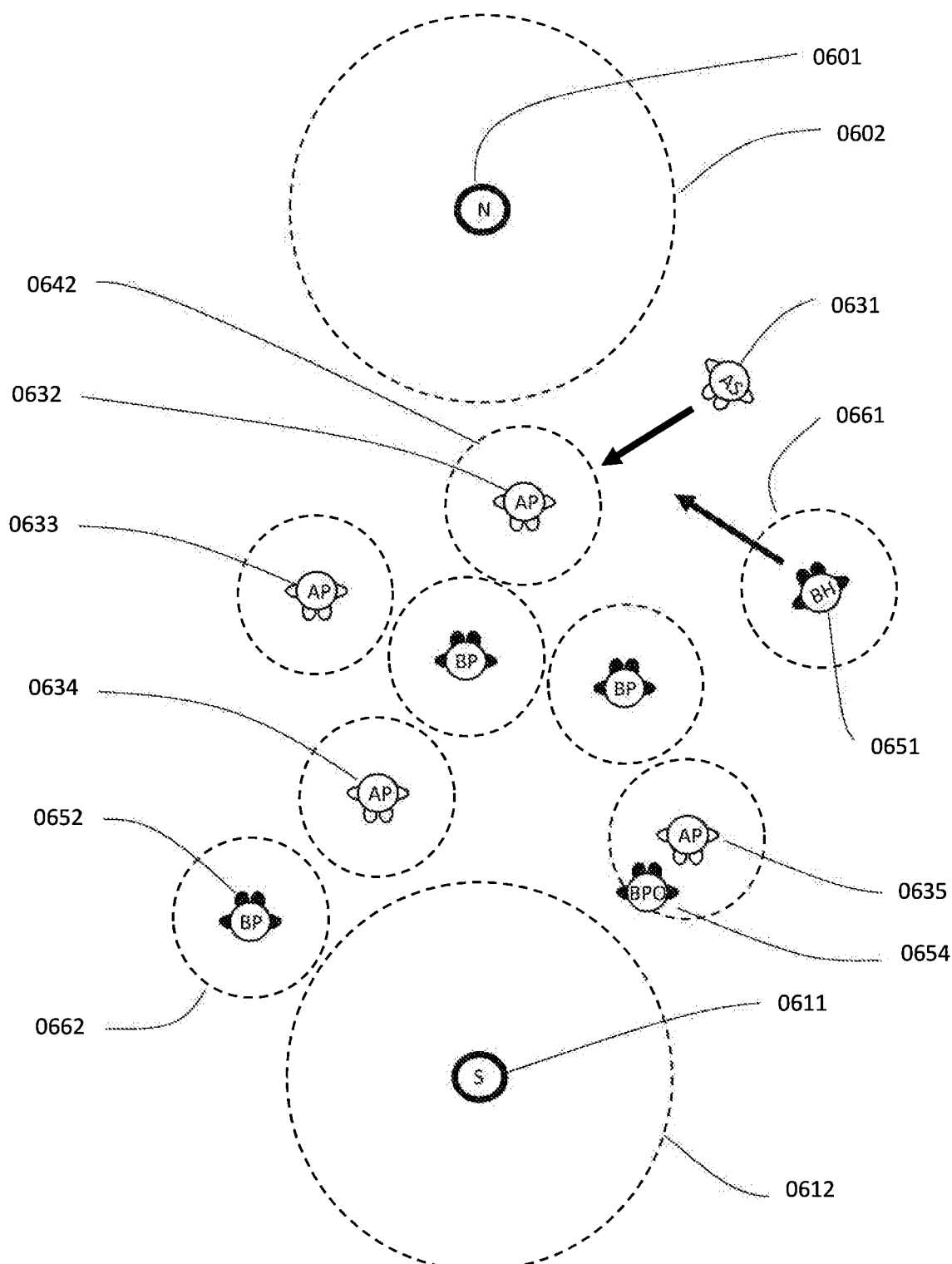
FIG. 6. Is a conceptual plan view of the WaveTag Field game playable using the present invention.

For example, FIG. 6 depicts a moment in a WaveTag game, wherein Team A scorer 0631 is in pursuit of south goal 0612. Team B hunter 0651 is running northwestwards in pursuit of the scorer 0631, in an attempt to place scorer 0631 in zone 0661, to deactivate the scorer, and to gain the ability to score. Scorer 0631 runs southwest seeking the influence (zone 0642) and protection of Team A Pawn 0632. If successful in seeking the protection of pawn 0632, scorer 0631 may consider continuing onwards to south goal 0612 by passing safely through the influence of Team A pawn 0633 and Team A pawn 0634, which are effective in blocking nearby Team B Pawns. The figure also depicts Team B Pawn 0654 which has entered the influence of stationary Team A Pawn 0635; Team B Pawn 0654 is therefore (temporarily) "out".

FIG. 7 describes parameters in the processor of the goal fixtures (0601, 0611). North goal 0601 emits a signal (0701) to define influence zone 0602. South goal 0611 emits a signal (0702) to define influence zone 0612. Scoring and game completion are tracked (0705, 0706, 0707, 0708). Game play and game completion is timed (0709, 0710). Depending, the north goal 0601 may operate in various modes that coordinate signal emission/processing (0711, 0712, 0713, 0714). Similarly, the south goal 0611 may operate in various modes that coordinate signal emission/processing (0715, 0716, 0717, 0718).

FIG. 8 describes parameters in the processor of wearable kits borne by players. Team A players may emit signals related to role, as well as attack, defense, basic handshaking, and penalization (0801, 0802, 0803, 0804, 0805, 0806), and similarly, so may Team B players (0807, 0808, 0809, 0810, 0811, 0812). A player's electronic kit uses variables to register motion and gesture (0813, 0814, 0815, 0816, 0817, 0818, 0819, 0820). For example, if player motion is detected (e.g.—by a module similar to movement detector 0106 of embodiment 1) then the variable VM will be set to true (0813). For example, if a right-hand passive RFID tag (similar to tag 0114 of embodiment 1) goes out the of range of the wearable RFID reader (i.e.—a reader similar to reader 0107 of embodiment 1) then a right hand up can be inferred by the processor, and variable VHU is set to true (0815). Various timers that affect play and compel movement are used (0821, 0822, 0823, 0824, 0825, 0825, 0826). For example, if a scorer does not score before score timer TS (0823) elapses then the scorer is deactivated.

FIG. 9 describes player modes, which dictate signal emission and processor logic. Modes related to roles (i.e.—pawn/hunter/scorer) and player status (i.e.—still/moving/out/penalized/handshaking/vulnerable/protected) are listed for Team A (0901, 0902, 0903, 0904, 0905, 0906, 0907, 0908, 0909, 0910, 0911, 0912, 0913, 0914, 0915) and for Team B (0916, 0917, 0918, 0919, 0920, 0921, 0922, 0923, 0924, 0925, 0926, 0927, 0928, 0929, 0930). For example (0902), when a Team A pawn is still, in MAPS mode, said Team A pawn will emit signal SAP.

FIG. 10 describes the methods of Team A pawn processors. In each row of the tabular diagram is indicated a player mode and the corresponding signal emission, as well as mode and parameter updates that are made in response to parameter conditions and received signals. If a moving pawn (MAPM mode) enters opposing pawn influence (signal SBP), or goal influence (SGN, SGS) then the moving pawn is put in out mode (MAPO mode) according to methods 1001, 1002, 1003. If, after moving (MAPM), the pawn is stationary, still mode (MAPS) is applied (1004). If, while stationary, the pawn moves, moving mode is applied (1005). If a stationary pawn raises a hand, handshaking (to attempt role change) is initiated (1006). If a pawn has been recently deactivated and put in out mode (MAPO), then said deactivated pawn can resume play after being stationary with hands on hips for a specified duration (1007). A pawn can influence a zone (by emitting signal SAP) while stationary (1005, 1006). A moving pawn cannot influence a zone (1001, 1002, 1003).

FIG. 10 describes the methods of Team A hunter processors. If a moving hunter enters opposing pawn influence, or goal influence, then said hunter is put in out mode according to methods 1008, 1009, 1010. If a stationary hunter raises a hand, handshaking (to attempt role change) is initiated (1011). A deactivated hunter (i.e.—in out mode, MAHO) can resume play after being stationary with hands on hips for a specified duration (1012). Hunters can influence a zone (by emitting signal SAP) while still or moving (1008, 1009, 1010).

FIG. 11 describes the methods of Team A scorer processors. To begin a scoring attempt, the scorer enters the north goal influence, and is assigned MAS1V mode, which is to say, "vulnerable" and in pursuit of south goal (1013). If the scoring attempt does not commence in the required time the scorer is out (1014). A scorer is vulnerable until the scorer enters the influence of a teammate (1015) and is thereby "protected". If a (vulnerable) scorer remains outside of teammate influence for a specified duration (timer TR), the scorer is out (1016). If a scorer fails to reach goal proximity within a specified duration (timer TS), the scorer is out (1017). If a scorer leaves the influence of a teammate, the scorer become vulnerable (1019), and a timer is initiated (timer TR). Methods 1020, 1021, 1022 are 'protected scorer analogues' of methods 1016, 1017, 1018. Upon reaching the south goal, the scorer now begins pursuit of the north goal (1018) by entering MAS2V mode. Methods 1023, 1024, 1025, 1026, 1027, 1028, 1029, 1030 relate to scorers in north-goal pursuit, and are analogous to the south-goal pursuit methods 1015, 1016, 1017, 1018, 1019, 1020, 1021, 1022 described above. Upon reaching the north goal, the team A score is incremented by the goal fixture, and the scorer begins pursuit of the south-goal in a new scoring attempt/turn (1030). If the scorer gets "out" (e.g.—by methods 1014, 1016, 1017, 1020, 1021, 1024, 1025, 1028, 1029) then the scorer enters handshake mode (MASH) to initiate a process wherein the Team B hunter becomes a Team B scorer, and the Team A scorer becomes a Team A hunter.

FIG. 11 describes the processor methods related to handshaking and exchanging roles. A pawn that is in handshake mode, stationary, with hand-up for the required duration, and in receipt of the hunter handshake signal, assumes the hunter role (1101). If the pawn's hand is lowered or the pawn moves during handshaking, the pawn resumes normal play (1102). A hunter that is in handshake mode, stationary, with hand-up for the required duration, and in receipt of the pawn handshake signal, assumes the pawn role (1103). A hunter that is in handshake mode, stationary, with hand-up for the required duration, and in receipt of the opponent scorer's handshake signal, assumes the scorer role (1104). If the hunter's hand is lowered or the hunter moves during handshaking, the hunter resumes play in the hunter mode (1105). A scorer that is in handshake mode, stationary, with hand-up for required duration, and in receipt of the opponent hunter handshake signal, assumes the hunter role (1106). If scorer/hunter handshaking does not occur within the required duration, scorer retains the scorer role and begins a new "turn" (1107). A scorer is obliged to attempt role change during handshaking. If, while in handshake mode, the scorer fails to put up a hand, or enters a goal area, the scorer is penalized (1108, 1109, 1110). While in "penalty" mode, the scorer's penalty timer increments until the scorer reaches the opponents goal (1111). While in the influence of the opponent goal, the penalty timer of the penalized scorer is decremented (1112). While the penalty timer is decremented, penalties are registered at the opponent goal as will be described later. After the penalty timer elapses the scorer enters hunter mode (1113). After this occurs, the opposing hunter will have an opportunity to become scorer. In such a penalty scenario, when a hunter receives a "grant" signal from the fixture, the hunter becomes scorer (see 1306 described below).

A delay between scorer outage and scorer handshaking can be implemented, to allow a scorer to take up a preferable location for handshaking. In other embodiments, handshaking can be achieved by more sophisticated methods. In some embodiments, handshaking can include physically shaking hands or other gestures, along with appropriate gesture recognition.

FIG. 12 describes the processor methods of gesture enforcement, which ensure a reliable system of gesture indication. Gesture obviates, or minimizes the need for, wearable light indicators (note that, among other shortcomings, wearable light indicators are expensive and hard to discern). If a pawn puts a hand up while moving, the pawn gets "out" (1201). If a pawn puts hands on hips while not "out", the pawn gets "out" (1202, 1203). If, while out, the pawn raises a hand, the required time to end the "outage" is extended (1204). If a hunter puts hands on hips while not "out", the hunter gets "out" (1205). If, while out, the hunter raises a hand, the required time to end the "outage" is extended (1206). Scorer methods 1207&1208 and 1209&1210 and 1211&1212 and 1213&1214 are analogous to pawn methods 1201&1202.

FIG. 13 describes methods of the north goal fixture. A timer defines game duration (1301). During gameplay (i.e.—play mode MNGP), receipt of a scorer signal increments the team A score (1302). Receipt of a team B penalty signal penalizes Team B in proportion to the duration of signal receipt (1303). If, after the Team B penalty signal ceases, a Team B hunter signal is subsequently received, the goal enters "grant" mode (1304). In grant mode the goal is able to confer the scorer role (to resolve the penalty scenario described above). The grant signal, when received by a Team A hunter causes the Team A hunter to become a scorer (1114). If a Team A hunter signal is received, the goal transitions from grant mode to normal play (1306). When the game timer elapses, game end mode is initiated. Initiation of game end is accompanied by visual and/or audio indication and the initiation of the end game timer. During game end, the status of the hunter and scorer is obtained by the goals, in order to finalize the game. A Team A hunter can trigger north goal finalization, by entering north goal proximity (1307). A penalized opposing scorer, after first registering penalties, can trigger goal finalization (1308, 1309). An opposing hunter can also trigger goal finalization (1310). The game is over when both goals have been finalized, or by the elapsing of the end game timer (1311). Finalizing the game according to the above methods disincentivizes a penalized scorer from leaving the playing field to the detriment of the opponent (i.e.—"running away with the game").

Figure 14:
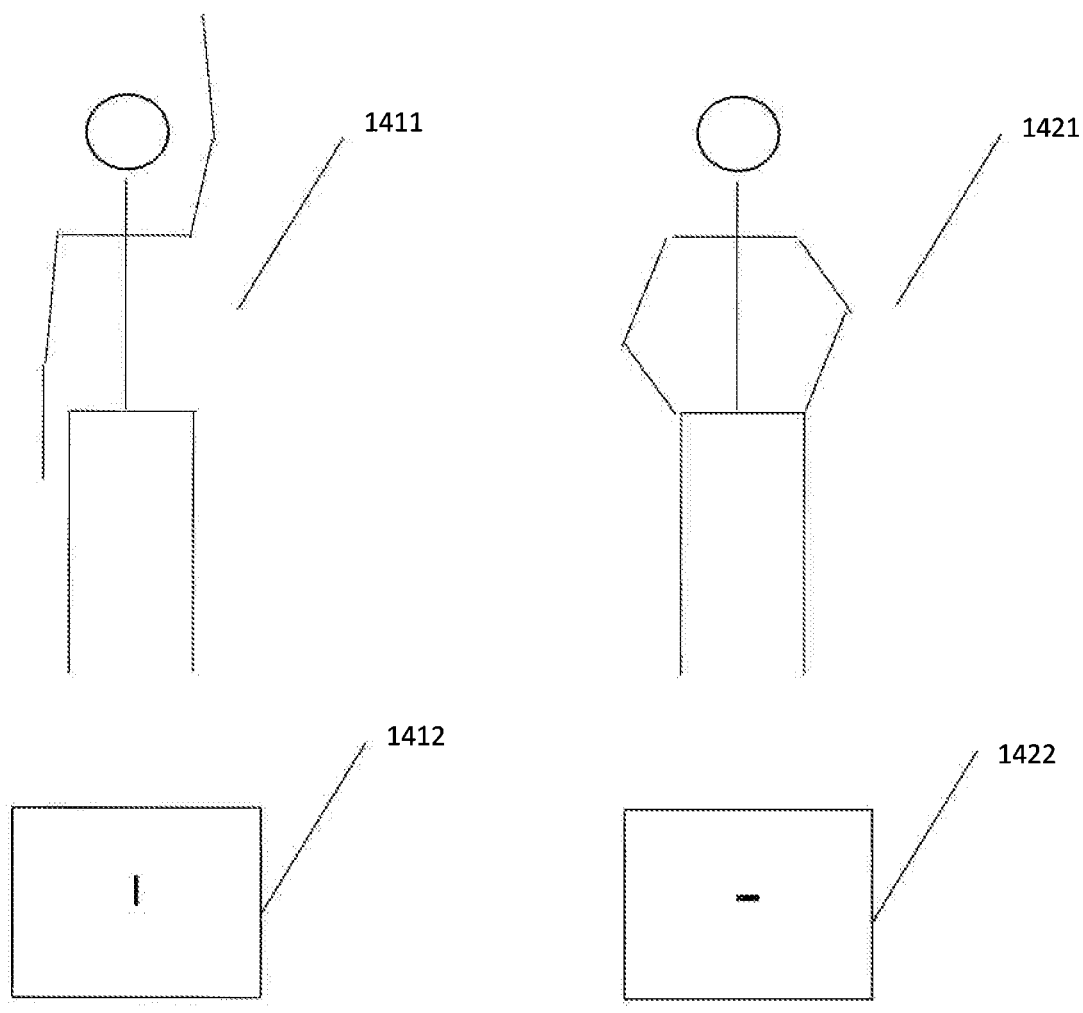
FIG. 14. is a schematic view of the WaveTag Gestures.

FIG. 14 shows typical WaveTag gestures and possible corresponding wearable display indications (which are optional). Hand-up gesture 1411 corresponds to display image 1412. Hands on hip gesture corresponds to display image 1422. A wearable display is not required for WaveTag.

FIG. 15 shows the haptic feedback scheme for Team A processors. A player is warned to varying degrees about the approach of teammates and opponents (1501, 1502, 1506, 1507, 1502, 1512). Haptic feedback (and accompanying sounds) can be used to confirm successful handshake (1503, 1504, 1505, 1509, 1510, 1511). Haptic feedback (and accompanying sounds) can be used to confirm and remind the player (and others) of a new or current role (1513, 1514, 1515, 1516, 1517, 1518, 1519, 1520, 1521, 1522, 1523, 1524, 1525, 1526, 1527). Various other signals can trigger haptic and other feedback (1528). Various other parameter values can trigger haptic and other feedback (1529).

Team A methods have been described above; Team B methods are analogous. North goal methods have been described above; south goal methods are analogous. The processing methods of all roles are loaded onto the player processor at game start, and variously applied as the game dictates. Though the WaveTag processor methods are several, player actions are basic and intuitive, thus the subtly deep game of WaveTag may be readily adopted by learners.

In embodiment 6, a score is registered after achieving proximity of both goals. However, other scoring schemes are possible (e.g.—scoring with each achievement of goal proximity, all Team A players given a scoring tenure in an innings analogous to cricket, etc.). A variation of WaveTag is played without fixtures. In the fixture-less variation, a scorer seeks to enter the influence of one or more designated opponents, rather than a goal. WaveTag play can be coordinated to music (similar to WaveChess described below). WaveTag can incorporate possession/occupancy/territorial-control of island (non-goal) fixtures.

Embodiment 7, associated with FIG. 16 through 23, relates to a novel game called WaveChess; variants of which are made possible by the invention. In WaveChess, electronic systems compel players to move in a manner analogous to chess pieces (Bishop, Rook, King). The game is won when a team captures the opposing king in a manner similar to standard chess. In embodiment 7, movement is coordinated in rhythm with music. Coordination to music promotes game organization and gives players and viewers the enjoyable impression of dancing to audio, video, disco.

Figure 16:
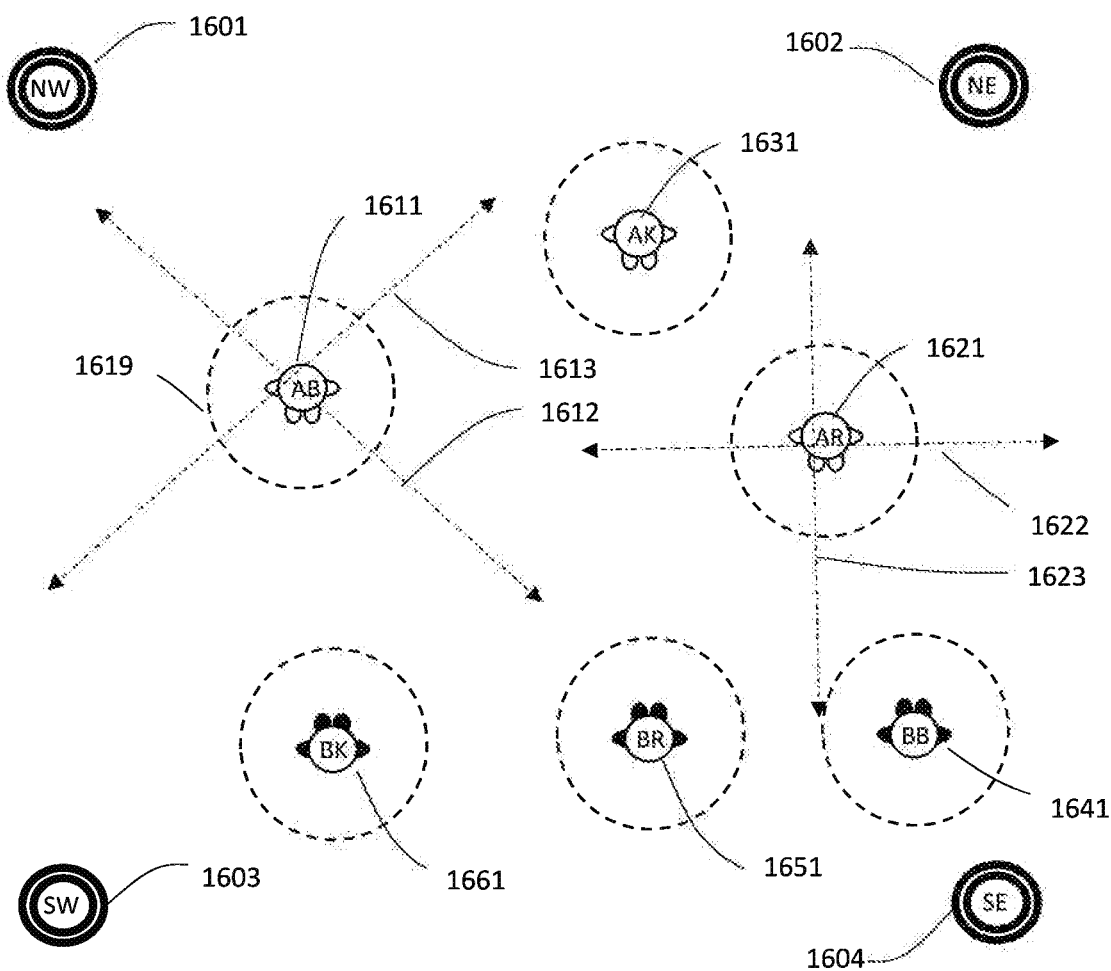
FIG. 16. Conceptual plan view of WaveChess Field game playable using the present invention, FIG. 17. is a schematic view of the WaveChess Fixture Parameters.

For example, FIG. 16 depicts a moment in a WaveChess game, wherein Team A is preparing to move. Prior to the game players don shirts, placards, signs, or the like to indicate their role (i.e.—to indicate membership to team A or B, to indicate the role of bishop or rook or king). If Team A rook 1621 moves, it will be compelled to move in one of two ways, along the east-west line 1622 or the north-south line 1623. If Team A bishop moves, it will be compelled to move in one of two ways, along the northwest-southeast diagonal 1612 or the southwest-northeast diagonal 1613. Bishop 1611 may consider capturing opposing rook 1651 (i.e.—rook 1651 threatens attack on the Team A king 1631).

FIG. 17 describes parameters in the processors of major fixtures (1601, 1602, 1603, 1604) which are located at the perimeter of the playing field. Major fixtures emit signals for the purpose of triangulation. Player measurements of major fixture signal strength are used in triangulation calculations, local position determination, and ultimately control of movement. Each fixture emits a unique location-related signal for triangulation (1701, 1702, 1703, 1704). One or more of the fixtures also emits signals that coordinates gameplay to measures of music (1705, 1706, 1707, 1708). One or more cameras of the major fixtures recognize gestures made by players (1713, 1714) for the purpose of conferring movement privileges. Recognition of such gestures can be enhanced if identifying (and/or colourful) clothing/sleeves are worn by the players. A music (measure) timer (1715) and measure modes (1716, 1717, 1718, 1719) are used to coordinate play in rhythm with music. Embodiment 7 employs 4/4 time; other time signatures are possible.

FIG. 18 describes the parameters in the processor of wearable kits borne by players. Players may emit a signal characteristic of the team (1801, 1802). The status of movement (1803), gestures (1804, 1805, 1806, 1807), fixture signal strength (1808, 1809, 1810, 1811), location (1812, 1813, 1814, 1815, 1816, 1817, 1818, 1819), position status (1820, 1821), and timers for running (1822) and outage (1823) are tracked in the processor.

FIG. 19 describes Team A player modes and corresponding signal emission. Bishops, rooks, and kings can be in stationary, moving, or out mode. The A Team signal is emitted while moving (i.e.—bishop method 1902, rook method 1906, king method 1910). B Team modes and signals are analogous to those of Team A.

FIG. 20 describes methods of Team A bishop processors. If a bishop in stationary mode makes a movement the bishop is "out" (2001) and must leave the playing field. A stationary bishop is made "out" after receiving a teammate's "SA" signal (2002); this is analogous to making an illegal movement in standard chess. A stationary bishop is made "out" after receiving an opponent's "SB" signal (2003); this is analogous to piece capture in standard chess. A stationary bishop gains permission to move when the following conditions are met: hand raised for a sufficient duration, measure 2 signal "SM2" received, permissive signal "SAOK" recently received. When these conditions are met, the diagonals of the current position are noted (VDIAGXO, VDIAGYO) and the bishop enters move mode (2004). If the stationary bishop raises a hand, but the player is not unique among teammates in doing so, fixtures will emit a "SABAD" signal. A player with a raised hand that is in receipt of the "SABAD" signal is out (2005). After a bishop enters move mode, the bishop can continue movement until measure signal "SM3" is received (2006), which signifies the next musical measure. If the bishop position deviates from the diagonals identified at the start of the move, the bishop is out (2007). If the bishop leaves the playing field, the bishop is out (2008). Hand raising is reserved for seeking movement privileges; if the bishop raises a hand while in move mode, the bishop is out (2009). After getting "out", the bishop must leave the field with both hands up. If the bishop is out, on the field, and does not have both hands up, the bishop enters penalty mode (2010). The bishop is afforded some time to leave the field according to the outage timer. If the bishop does not leave the field in the allotted time, the bishop enters penalty mode (2011). At game end, a team is penalized according to the number of its players that entered penalty mode during the game.

FIG. 21 describes methods of Team A rook processors. Rook methods 2101, 2102, 2103, 2104, 2105, 2106, 2107, 2108, 2109, 2110, 2111 are analogous to bishop methods 2001, 2002, 2003, 2004, 2005, 2006, 2007, 2008, 2009, 2010, 2011. Whereas method 2007 constrains bishops to diagonals, method 2107 constrains rooks to east-west paths (ranks) or north-south paths (files).

FIG. 22 describes methods of Team A king processors. King methods 2201, 2202, 2203, 2204, 2205 are analogous to bishop methods 2001, 2002, 2003, 2004, 2005. Bishops and rooks are permitted long movements, whereas kings are limited to short movements by a timer. This feature simulates the limited movement of kings in standard chess. This feature allows physical fitness to significantly affect king movement. When the time allotted for movement is elapsed, the king enters still mode (2206). King methods 2207, 2208, 2209 are analogous to bishop methods 2008, 2009, 2010.

FIG. 23 describes methods of a typical fixture. To conduct play in rhythm with four measure music, the fixture emits signals to signify measures of music (2301, 2302, 2303, 2304). Measure 1 is allotted for Team A's selection of the active player, measure 2 for Team A's move, measure 3 for Team B's selection of the active player, and measure 4 for Team B's move. If, at the conclusion of measure 1, a single team A hand is raised, then a permissive signal (SAOK) is emitted (2305). If, during measure 1, more than one team A hand is raised, then a team A penalty signal (SABAD) is emitted (2306). If during measure 1, a B team member raises a hand, then a B penalty signal (SBBAD) is emitted (2307). If any Team A hands are raised during measure 2, team A is penalized (2308). If any Team B hands are raised during measure 2, team B is penalized (2309). Measure 3 methods 2310&2311&2312 are analogous to measure 1 methods 2305&2306&2307. Measure 4 methods 2313&2314 are analogous to measure 2 methods 2308&2309. By these methods gesture communication is meaningful, and play is coordinated.

Embodiment 7 includes bishops, rooks, and kings only. In similar embodiments other roles may be employed (e.g.— from standard chess or otherwise). For clarity of presentation, in embodiment 7, major fixture cameras are used to confer player movement privileges. In other embodiments move privilege can be conferred by fixture-to-player radio communication, conferred by external motion detectors, monitored by opponent processors, etc. In other embodiments, the procedure for players leaving the field after outage may include additional constraints related to walking speed, route, avoidance of players, etc. In embodiment 7 there are cases when a player emits two signals simultaneously; in other embodiments the same may be achieved by a single signal. Some variations of WaveChess may allow simultaneous movement of two (or more) players. Some variations of WaveChess may allow player movement at any time, may apply limits to movement duration, or may compel delays between player movements.

Embodiment 8, associated with FIG. 24 through 28, relates to a novel game called WaveGammon, variants of which are made possible by the invention. In WaveGammon, two teams (e.g.—team A vs. team B) compete in a game related to standard backgammon. In embodiment 8, an "out-area" is designated at the north end of the playing field, and an out-area is designated at the south end of the playing field. Team A wins if all Team A players reach the south out-area before all Team B players can reach the north out-area, and vice versa. At game start some players are allowed/compelled to occupy initial positions on the field. A player may only move when permitted, and according to a distance determined at random by the player processor. During play, a player may decline the move option presented and wait for another opportunity to move. Once a move is accepted, the move must be carried out. During play, players move to designated areas of the playing field, in a designated direction. While stationary and in the influence of a teammate, a player is safe from attack; otherwise the player is vulnerable. If a vulnerable player encounters the influence of an opponent, the player is out. An "out" player re-enters the game from the "out" area most distant from their objective. WaveGammon features simultaneous player motion, in contrast to standard backgammon which is turn-based.

Figure 24:
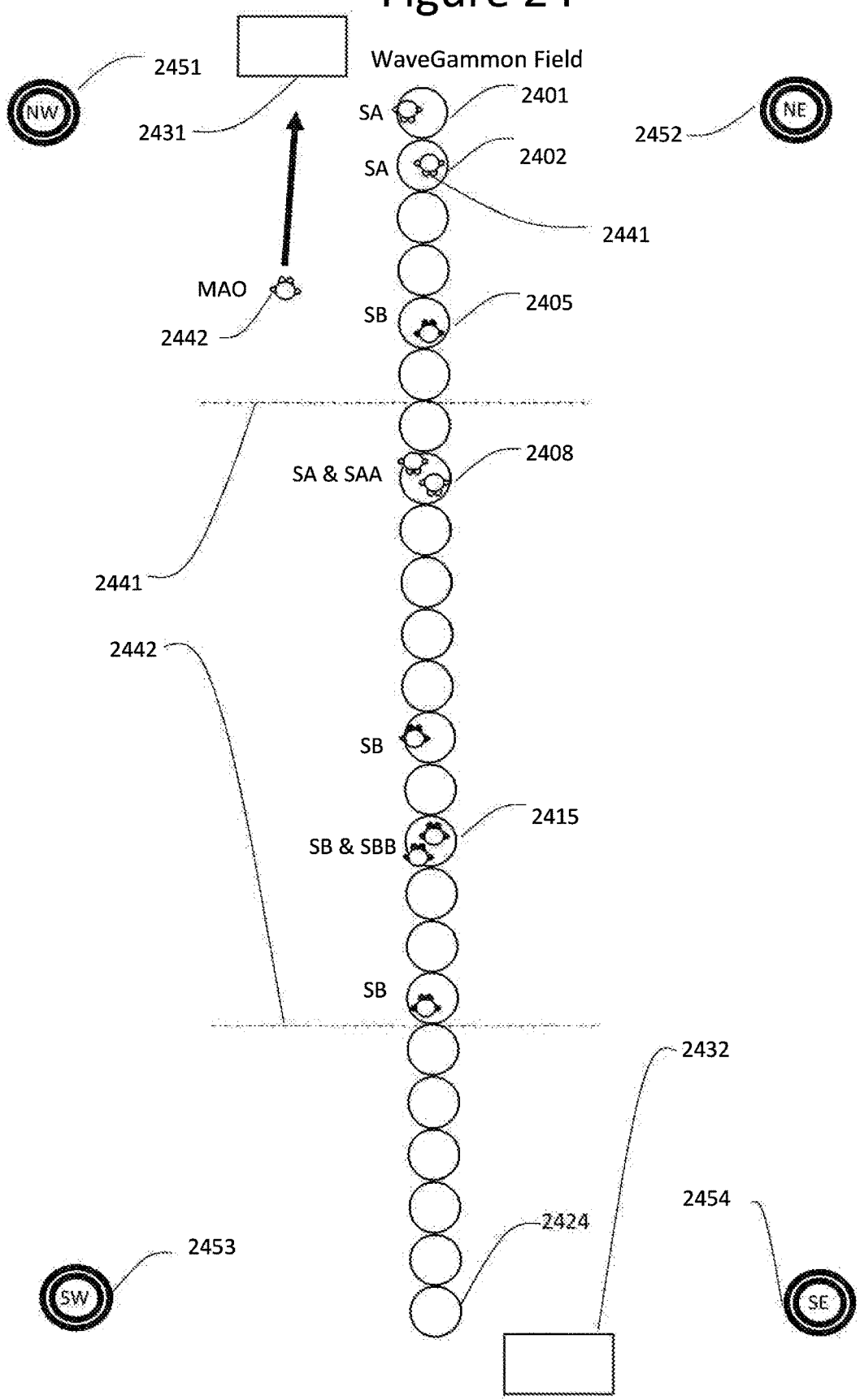
FIG. 24. Is a conceptual plan view of a WaveGammon Field game playable using the present invention.

For example, FIG. 24 depicts a moment in a WaveGammon game. The playing field has been marked with boundaries that correspond to permitted player locations (not to scale), including locations 2401, 2402, 2405, 2408, 2415, 2424, along with north out-area 2431, and south out-area 2432. A Team A player occupies location 2401 and is vulnerable. A Team A player occupies location 2402 and is vulnerable. Location 2408 is occupied by two Team A players, both of whom are safe due to the proximity of their teammate. Location 2405 is occupied by a single vulnerable Team B player, and location 2415 is occupied by two safe Team B players. Once all Team A players are south of line 2442 they may "bear off" to south out-area 2432. Once all Team B players are north of line 2441 they may "bear off" to north out-area 2431.

A vulnerable player may be put "out" by an opponent when the opponent enters the vulnerable player's location. For example, if player 2441 accepts permission to move to location 2405, the Team B player in location 2405 will be put "out". An "out" B player is compelled to step away from the playing area, and to retreat to south out-area 2432, whence the "out" Team B player can begin a new pursuit of the north out-area 2431. In the figure, as an example, Team A player 2442 is shown as "out", and approaching the north out-area 2431, whence it can begin a new pursuit of the south out-area 2432. Team A wins if all Team A players reach south out-area 2432 before all Team B players reach north out-area 2431, and vice versa.

FIG. 25 describes parameters in the processor of the major fixtures (2451, 2452, 2453, 2454). Fixtures emit signals for the purpose of triangulation (2501, 2502, 2503, 2504). Fixtures use cameras to assess whether players are positioned to "bear off"; if so, a permissive signal is emitted (2505, 2506). Variables record whether a team is permitted to bear off (2507, 2510). Score is recorded (2508, 2511). Fixtures use cameras to assess whether a team has completely borne off and won (2509, 2512). Fixtures use timers to manage gameplay (2513, 2514).

FIG. 26 describes parameters in the processor of players. A player can emit a signal for team identification (2601, 2603), and to defend/attack (2602, 2604). Defense/attack can occur when in the presence of a teammate, or when entering a new location. The processor tracks whether the player is in motion (2605), or still (2606), or with hand up (2607), or with both hands up (2608), or whether a hand has been held up for a specified duration (2609). Strength of fixture triangulation signals is tracked (2610, 2611, 2612, 2613), and thereby position is determined (2614, 2615, 2616, 2617). This enables the player processor to determine whether the player is in the playing area (2618) or in the permitted playing locations (2619, 2620). The processor can employ a tolerance value (2621) to expand or limit the size of permitted player locations. The processor randomly generates a "roll" value periodically and randomly (2622) that is representative of a distance that a player may be permitted to travel. A player is allotted a specified duration to accept or reject the "roll" generated (2629). The processor can monitor whether the player has reached the "out-area" (2623, 2624). Furthermore, run times are controlled (2630), and "outage" wait times are controlled (2631).

FIG. 27 describes Team A player modes and corresponding signal emission. Players modes include: still, moving, attack, out, done, penalized (2701, 2702, 2703, 2704, 2705, 2706). B Team modes and signals are analogous to those of Team A.

FIG. 28 describes methods of Team A player processors. A stationary player that is vulnerable (i.e.—no teammate nearby) and in receipt of an opponent's attack signal, is out (2801). Periodically, a random "roll" is assigned to the player (haptic&audio indications prompt the player); the player is given an opportunity to accept the roll within a given time frame (2802). If the time frame for acceptance elapses then the roll (and permission to move) is revoked (2803). Conversely, if the player moves then the roll is accepted, and the player is permitted to move ahead in proportion to the roll: the newly designated location for the player is noted, and a timer to complete the movement is initiated (2804). If a still player moves before a roll (permission to move) is available, that player is penalized (2805). If a still player is not at their designated location, that player is penalized (2806). If the still player's position is not within the playing field, that player is penalized (2807, 2808). If, after accepting a roll, the player reaches the objective goal, the player is done (2809) and may leave the playing field. If, after accepting a roll, a moving player reaches the newly designated location, the player enters "attack" mode (2810). Upon gaining attack mode status, a player briefly emits an attack signal to deactivate any co-located vulnerable opponent before transitioning to still mode (2812). If a moving player has not reached the newly designated location in the allotted time, or is not still after the allotted time, that player is penalized (2811). If an attacking player is not in the designated location, that player is penalized (2813). A player can end "outage" by entering the out-area furthest from their objective (e.g.—Team A returns to the north out-area to end outage) and remaining still for the allotted time (2814). During outage, the player must remain outside of the playing area; if not the player is penalized (2815). Doubling is an aspect of standard backgammon games; fixture recognition of team gestures and other means can be used to initiate, and respond to, doubling in WaveGammon (2816). Additionally, various methods can be implemented that prevent a player from accepting rolls to a location already occupied by invulnerable opponents (2817); which is illegal in standard backgammon. Such illegal moves can be penalized or prevented by limiting the "roll" values generated.

Figure 29:
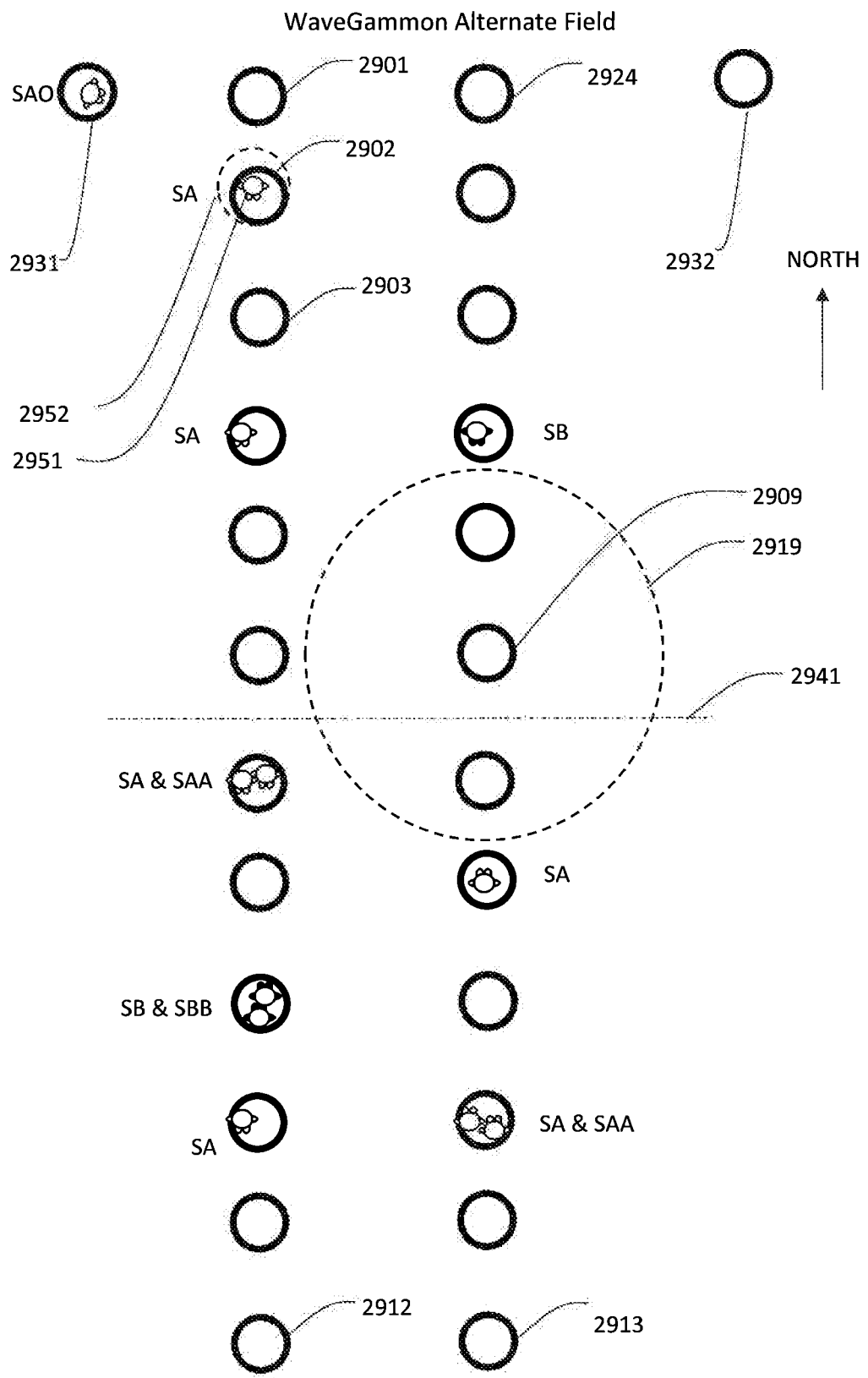
FIG. 29. is a schematic view of the WaveGammon Alternate Field.

FIG. 29 shows the alternate WaveGammon playing field arrangement of Embodiment 9, which is similar in layout to a standard backgammon board. Whereas embodiment 8 employed floor markings to demarcate acceptable player locations, embodiment 9 employs minor fixtures to do so. Embodiment 8 employed major fixtures and cameras to manage player locations, whereas embodiment 9 employs minor fixtures to do so. In embodiment 9, a typical fixture, for example 2909, is capable of simple signal communication to adjacent fixtures; for example, circle 2919 shows the range of influence of fixture 2909. In this way, low power signal communication can be used in a daisy chain manner to control bearing off, game completion, doubling, etc. In some embodiments, the field may be arranged so that Team A is constrained to one side of the acceptable player locations, and Team B to the other side, to further minimize chance of collision. In some embodiments, non-linear or multiple-branch or parallel WaveGammon paths can be implemented. In some (substantially) fixture-less WaveGammon embodiments, players are not constrained to locations, but rather, by run timers. In some embodiments, a player may be compelled to accept a roll after having declined a certain number of rolls. Embodiment 9 shows a minor-fixture based variant of WaveGammon; note also that minor-fixture based variants of WaveChess and WaveBall (described below) are also possible.

Embodiment 10, associated with FIG. 30 through 37, relates to a novel game called WaveBall; variants of which are made possible by the invention. In WaveBall, two teams compete in an athletic game related to soccer (in particular 'tiki-taka' or 'one-touch' football). Players don wearable electronics kits with processors that codify the rules (thus obviating a referee and promoting sportsmanlike play). Close-proximity play is penalized by conditions programmed in the processor thereby reducing the risk of injury. Goals are designated by fixtures that emit radio signals. Scoring is registered when the ball detects a goal fixture signal (via signal strength methods). The ball projectile used in the game transmits and receives radio signals that allow possession to be managed. Possession is registered by the player and/or ball via signal strength detection. Possession time is limited by processor methods. Ball possession for a duration exceeding the possession timer is penalized. Players control space using zone influence, in a manner that prevents close-proximity play and allows players to strategically block others safely. Due in part to the elimination of close-proximity play, the rules of WaveBall are simplified when compared to standard soccer.

Figure 30:
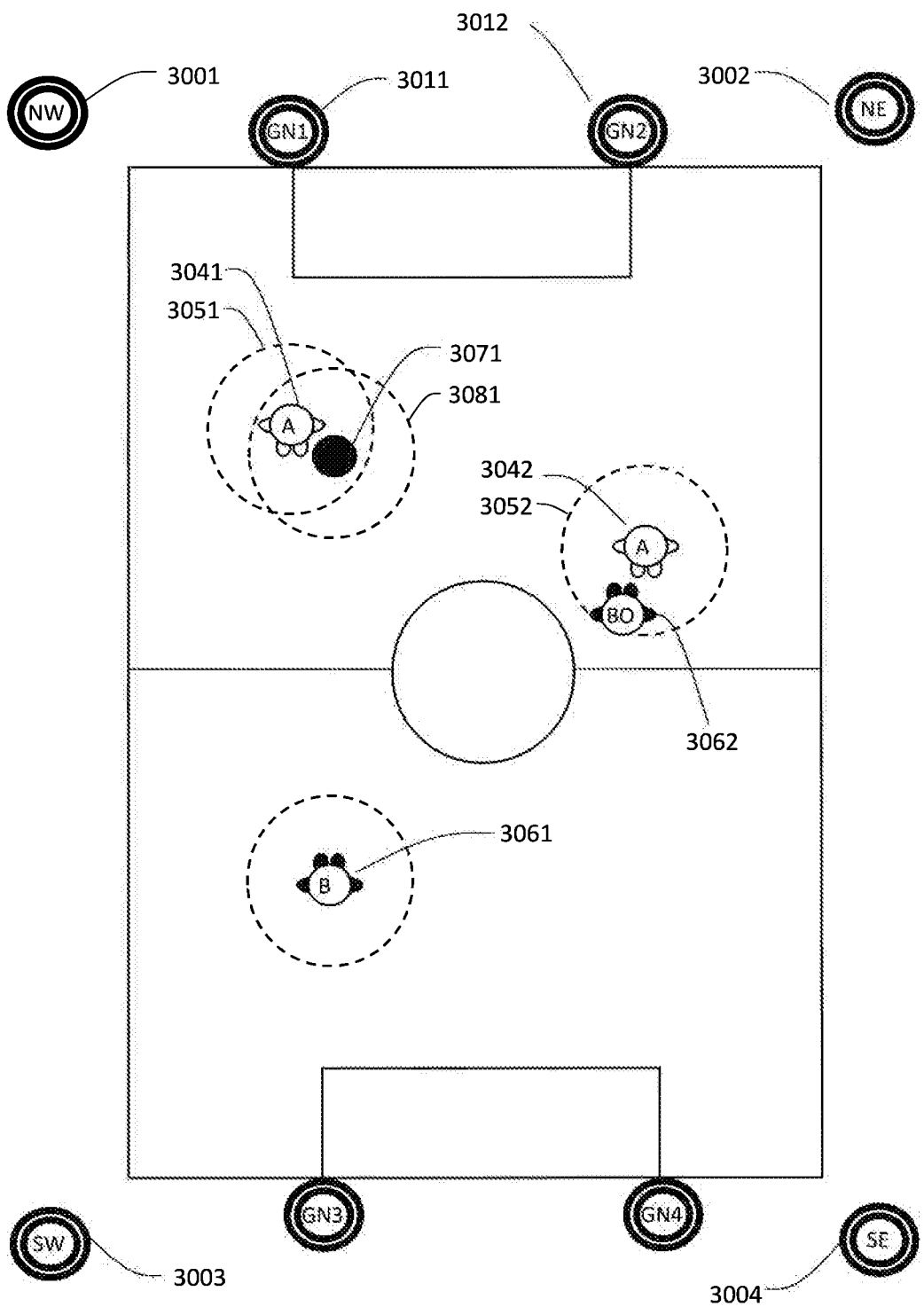
FIG. 30. is a conceptual plan view of a WaveBall Field game playable using the present invention.

For example, FIG. 30 depicts a moment in a WaveBall game. Four major fixtures are placed around the field (3001, 3002, 3003, 3004). Goal fixtures are used to detect goals (i.e.—north end goal fixtures 3011, 3012 and similar south end goal fixtures). Team A player 3041, with influence 3051, is shown in possession of the (projectile) ball 3071, with influence 3081. Team B player 3062 has entered the influence (3052) of Team A player 3042 and is therefore out. Team B player 3061 is active.

FIG. 31 describes parameters in the processor of the projectile (3081). The ball emits signals to indicate: play in progress (3101), Team A permission to free kick (3102), Team B permission to free kick (3103), free kick location (3104, 3105, 3106), and whether or not a goal has been scored (3107, 3108). Goal signals are identified by the ball (3109, 3110). The ball tracks score (3111, 3112), whether the ball was impacted (3113), the last team to impact the ball (3114), the strength of triangulation related signals (3115, 3116, 3117, 3118), strength of goal signals (3119, 3120), the strength of other "event-signifying-signals" (3121), out of bounds status (3122), hand ball status (3123), current location (3124), location for free kick (3125). The projectile performs calculations for use in directing players to the appropriate free kick location (3126, 3127, 3128, 3129).

FIG. 32 describes projectile modes and corresponding signal emission. Signals are emitted to signify regular play (3201), free kick possession (3202, 3203), and recent scorer (3204, 3205).

FIG. 33 describes parameters in the processor of players. A player can emit a team signal (3301, 3303), which is used for zone influence and for free-kick identification. A player can emit a foul signal (3302, 3304), which is used for free-kick identification. Forearm/wrist/hand sleeves worn by the player continuously emits a hand signal (3305), which, when received by the ball, triggers a hand-ball infraction sequence described below. The hand signal is emitted by a battery powered circuit, or by a passive RFID circuit, or by other means. Player movement and gesture is tracked in a manner similar to other embodiments (3306, 3307, 3308, 3309).

FIG. 34 describes player modes and corresponding signal emission. FIG. 34 also describes player timers. Player modes, for each team, include: still, moving, in possession, out, and penalized (3401, 3402, 3403, 3404, 3405 and 3406, 3407, 3408, 3409, 3410). A timer limits the duration of dribbling (3411). A timer controls "outage" time (3412).

FIG. 35 describes methods of Team A non-goalie player processors (the goalie processor allows hand contact with the ball in certain cases). A stationary player enters moving mode by making a movement (3501). When a stationary player obtains a play signal from the ball, possession mode and the dribble timer are initiated (3502). When a moving player obtains a play signal from the ball, possession mode and the dribble timer are initiated (3503). A moving player that obtains an opponent's team signal gets "out"; haptic feedback provides indication (3504). If the dribble timer expires while a player is in possession of the ball, the player emits a foul signal and gets "out" (3505). If a player loses the ball signal before the possession timer expires then the player resumes normal play (3506). A stationary "out" player, with hand up for a specified duration, resumes normal play (3507). An "out" player that moves is penalized (3508). An "out" player without their hand up is penalized (3509). An "out" player that fails to resume normal play within the allotted time is penalized (3509). At game end, penalized players negatively affect a team's score or outcome (3511). Additional processor methods can be employed to ensure that opponents remain an appropriate distance from the ball during free kicks, throw-ins, etc. Additional processor methods can enforce appropriate throw-in technique (e.g.—hand signal received by ball, appropriate hands gesture, use of motion detector to confirm feet planted and no upward body acceleration, shoe-mounted passive RFID, etc.)

FIG. 36 describes methods of the ball (projectile). If the ball is impacted while in receipt of the Team A signal, the last possessor is noted as Team A (3601), similar for Team B (3602). If the ball goes out of bounds and Team A was the last possessor, the free kick location is noted and the ball enters free kick team B mode (3603); a similar method is defined for free kick team A mode (3605). If the ball enters close-proximity to a Team A player's hand, then the ball receives a "hand" signal from the player's wearable item, and as a result the free kick location is noted and the ball enters free kick team B mode (3604); a similar method is defined for a Team B hand-ball (3606). If a player possesses the ball longer than the accepted duration, the player emits a foul signal, the ball receives the foul signal, and the ball enters free kick mode (3607, 3608). If the ball receives the goal signal then a goal is registered (3609, 3610). If the ball is in free kick mode, and in the designated location, and in receipt of the appropriate Team signal (i.e.—from the free-kick taker), then the ball enters normal play (3611, 3612). If a goal has just been scored, and the ball has been returned to centre, and the ball is in receipt of the appropriate Team signal (i.e.—the kick taker), then the ball enters normal play (3613, 3614). Additional features to enforce player setup after goal scoring, setup of corner kick, avoidance of free-kick delays, etc. can be implemented with methods that are similar to those described above.

In some embodiments, battery powered electronic systems within the projectile may be recharged through a septum on the ball exterior surface. In some embodiments, processing and signal communication of the projectile can be achieved by read/write passive RFID tags. WaveBall may be used in coordination with other complementary existing soccer ball technologies such as Ctrus and Micoach.

FIG. 37 describes Team A player haptic feedback. If a ball is in free kick mode, and if the ball is currently far from the required free kick location, the ball will emit signal SPD1. A free kick taker in receipt of SPD1 will feel (repetitive) single pulse haptic feedback (3701). As the ball is moved closer to the desired location, the ball will emit SPD2. A free kick taker in receipt of SPD2 will feel double pulse feedback (3702). A ball at the desired location will emit SPD3. A free kick taker in receipt of SPD3 will feel triple pulse feedback (3703). In this way, the player is guided to the correct location. A player in proximity to a ball that has been scored by one's own team will feel strobe feedback, signifying that possession is designated for the opponent (3704). A player in proximity to a ball that has been scored by one's opponent will feel an SOS pulse (i.e.—dot dot dot dash dash dash dot dot), signifying the ball should be returned to centre to resume play (3705). A player in proximity to a ball that is reserved for free kick by the opponent will feel strobe feedback (3706). Receipt of signals from the ball or other players initiates haptic feedback from the safety indicator vibrator (3707, 3708, 3709, 3710, 3711, 3712, 3713), which warns a player of possible collision with the ball or other players that are entering proximity. Pulse feedback (and audio feedback) provides confirmation of a new mode assignment (3714, 3715, 3716, 3717, 3718). Additional parameters (3719) and signals (3720) can be used to trigger indications and events.

During game play, a fixture embedded at the centre of the field (or elsewhere) can interrogate the ball (projectile) wirelessly for scoring updates after each goal. At game end, the ball (projectile) can be interrogated wirelessly to confirm the final game score.

Embodiment 11, associated with FIG. 38 through 42, relates to a novel game called WaveMan; variants of which are made possible by the invention. In WaveMan, one or more protagonists and one or more antagonists compete physically in a game like PacMan (an arcade game). Players don wearable electronics kits, fixtures emit and receive radio signals to represent a maze-like playing field, emission/detection of fixture radio signals constrains players to the maze, emission/detection of fixture radio signals simulates the collection of tokens of the maze-like playing field, proximity based signal communication between players is used as a means of attack.

Figure 38:
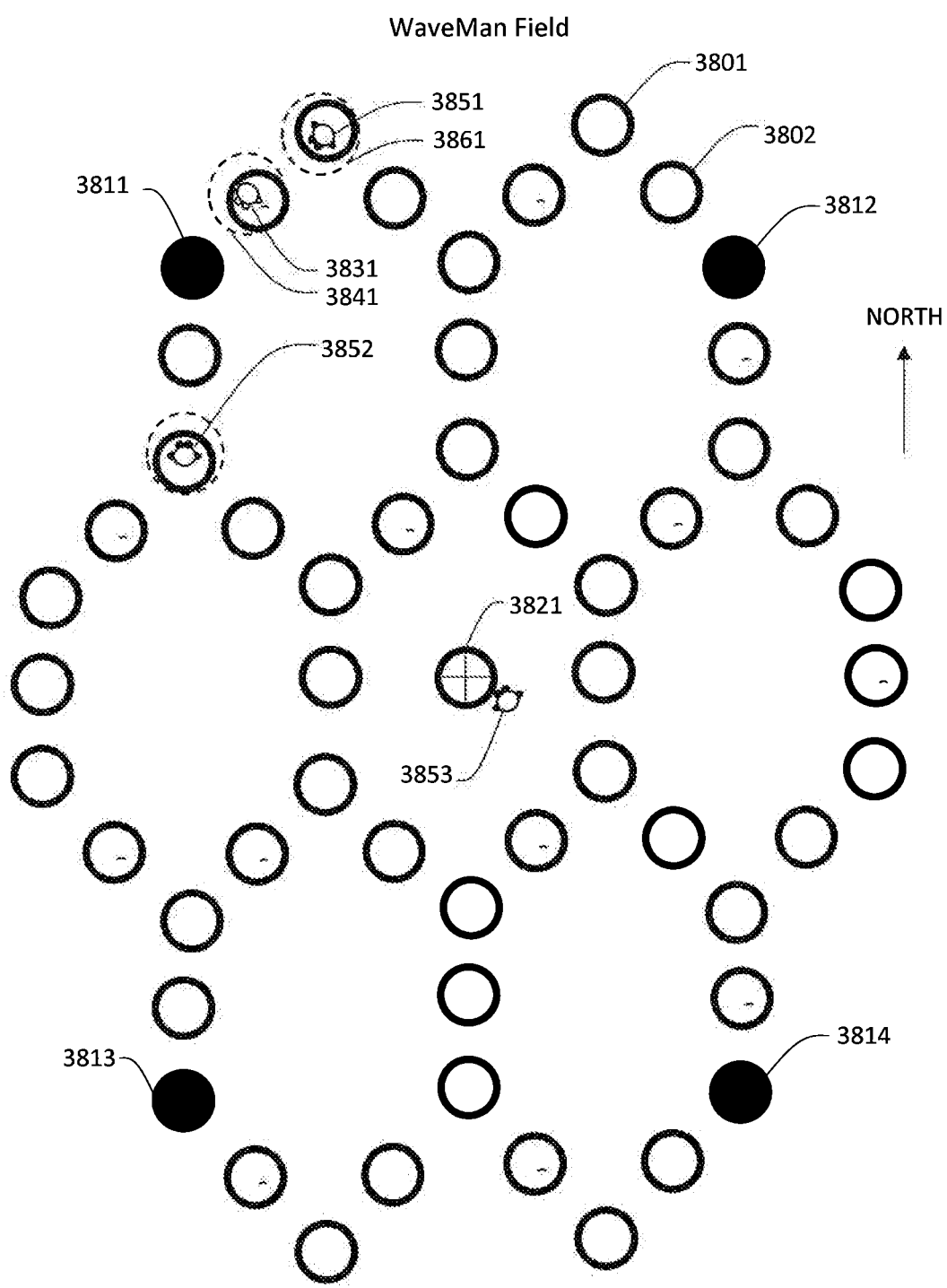
FIG. 38. Is a conceptual plan view of a WaveMan Field game playable using the present invention.

For example, FIG. 38 depicts a moment in a WaveMan game. Dot fixture 3801, 3802 and others like it represent dot tokens that are collected for points. Power fixtures 3811, 3812, 3813, 3814 are special. A player that achieves proximity to a power fixture (temporarily) gains the power to attack. The figure depicts one protagonist 3831 and antagonists 3851, 3852, 3853. Antagonist 3851 pursues the protagonist by heading south-west; antagonist 3852 pursues by heading north. If protagonist 3831 reaches power fixture 3811 before encountering the influence of an antagonist, it will gain the ability to attack the antagonists temporarily. Antagonist 3853, having recently been attacked, is shown deactivated, without influence, and nearby the home fixture 3821. At the home fixture, antagonist 3853 can attempt to reactivate. The protagonist 3831 wins by collecting the tokens of all dot and power fixtures. Protagonist 3831 loses if attacked by an antagonist. The protagonist may be referred to as 'man', the antagonist as 'chaser'. The hexagonal fixture arrangement of the WaveMan field of embodiment 11 mitigates tee-intersection-related collisions as well as sharp-turn-related knee injuries; however other fixture arrangements are possible.

FIG. 39 describes parameters in the processor of fixtures. Power fixtures emit a signal to indicate that the related token is not yet collected (3901) or collected (3902). Dot fixtures emit a signal to indicate that the related token is not yet collected (3903) or collected (3904). The home fixture emits a signal (3905). A variable tracks whether the fixture is on (3906). Fixture modes, namely 'on' and 'off' coordinate signal emission for power fixtures (3907, 3908) and dot fixtures (3909, 3910).

FIG. 40 describes parameters in the processor of players. A defensive and vulnerable protagonist emits an identifying signal 4001, and an attacking protagonist emits an attack signal 4002. Chasers emit an identifying signal 4003. Score (4004), gesture (4005), and attack time duration (4006) are tracked. A run timer (4007) constrains players to the maze-like playing field. A power timer (4008) tracks the duration of attack. Antagonist and protagonist modes coordinate signaling (4009, 4010, 4011, 4012, 4013, 4014, 4015).

FIG. 41 describes the methods of the protagonist (man) processor. A vulnerable man that receives the chaser signal is out (4101). The score of a vulnerable man gaining proximity to an active dot signal is incremented (4102); similar for an attacking man (4104). The score of a vulnerable man gaining proximity to an active power signal is incremented, the vulnerable man is put in attack mode, the power mode timer is started, and audio indication begins (4103); similar for an attacking man (4105). The score of an attacking man gaining proximity to a chaser is incremented (4106). When the attack (power) timer elapses, the attacking man enters vulnerable (defensive) mode and related audio indication ends (4107). Players are constrained to the maze by a run timer (i.e.—if a player strays from the fixtures for a specified duration, the player is out). When a fixture signal is lost, the run timer starts (4109, 4110, 4111, 4112). When a fixture signal is gained, the timer stops (4113, 4114, 4115, 4116). If the run timer elapses the player is penalized (4117). Chasers do not gain points or affect fixture states. Chasers are constrained to the maze-like playing field in a similar manner to the protagonist (i.e.—run timer). Chasers lose influence by being attacked (by the protagonist). Chasers regain influence by remaining at the home fixture for the required duration and gesturing as required.

FIG. 42 describes the methods of fixture processors. A fixture that has not yet entered protagonist proximity is considered 'on'. A fixture that has entered protagonist proximity is considered 'off'. An "on" dot fixture that enters defensive protagonist (4201) or attacking protagonist (4202) proximity transitions to "off" mode, and as a result the fixture display is modified. An "off" fixture that enters protagonist proximity remains "off" but continues to emit an identifying signal (4203). Similar methods apply to power fixtures (4204, 4205, 4206). 'On' and 'off' fixtures can be differentiated by visual indication. Dot and power fixtures can be differentiated by visual indication.

Embodiment 12, associated with FIG. 43 through 47, relates to a novel game made called WaveBlock; variants of which are made possible by the invention. In WaveBlock two teams (each consisting of one or more players) compete in a sliding puzzle game. An array of fixtures is arranged in a grid-like pattern. Initially, two or more fixtures are randomly selected for Team A marker indication, and two or more fixtures are randomly selected for Team B marker indication. The objective of Team A is to move Team A markers into a position that meets the "success criterion" (e.g.—adjacent to each other). A similar objective is assigned to Team B. A player may enter the influence of a fixture that is not occupied by another player, and not possessed by an opponent's marker. If a player enters the influence of a fixture displaying the marker of the player's own team, the marker is moved to the fixture last occupied by the player. If a player enters the influence of a fixture displaying an opponent's marker, the player is made inactive. If a player remains outside of the influence of fixtures for a defined duration, the player is made inactive (i.e.—the player is constrained to the grid by a run timer). If a player enters the influence of a fixture recently vacated by an opponent, and subsequently said opponent causes an opponent's marker to be transferred to said fixture, said player is made inactive.

Embodiment 12 employs the following "success" criteria: all markers adjacent to each other or "touching". In other embodiments, "success criteria" may include: all markers in a row, markers relocated to a pre-selected area, markers form a pre-defined shape, etc. Embodiment 12 relates to a game between two players. In other similar embodiments, two or more players per team may participate.

Figure 43:
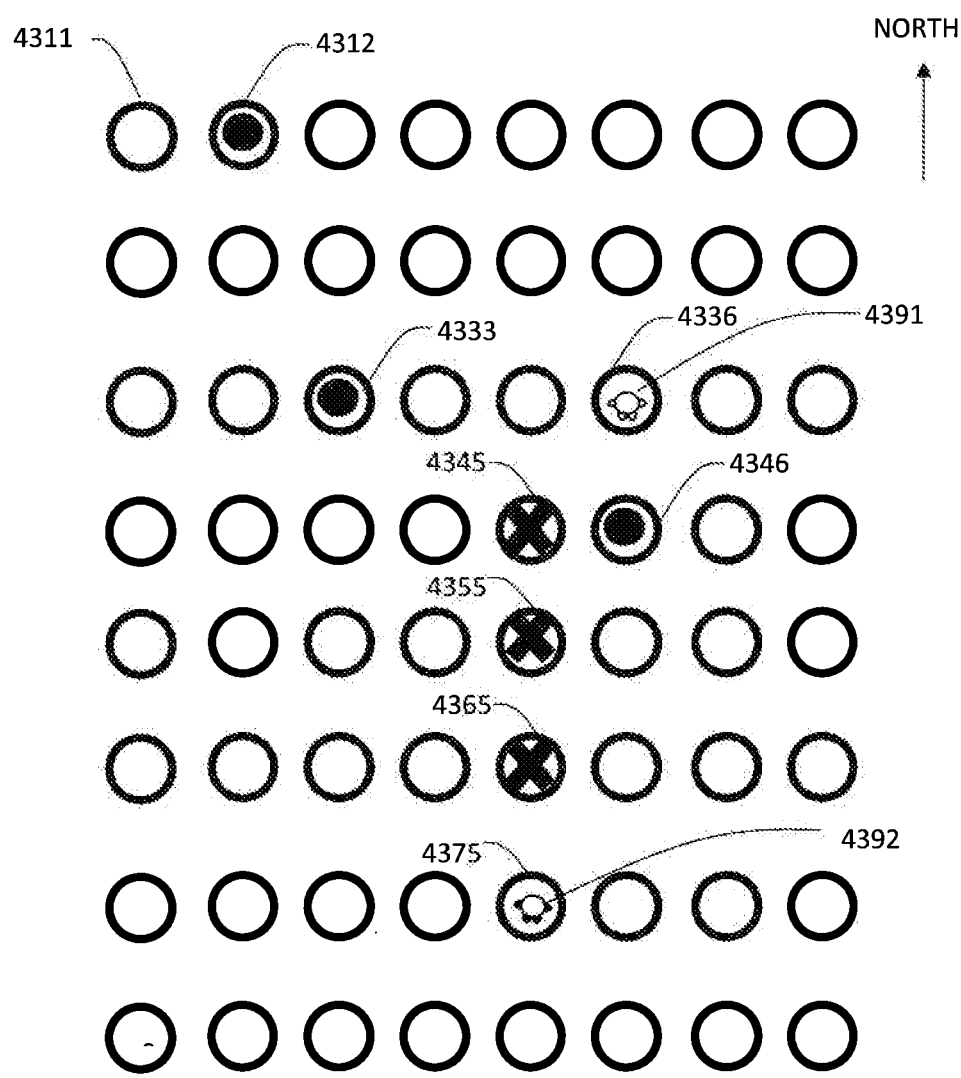
FIG. 43. Is a conceptual plan view of a WaveBlock Field game playable using the present invention.

For example, FIG. 43 depicts a moment in a WaveBlock game, wherein player 4391 is attempting to connect all 'o' tokens, and player 4392 is attempting to connects all 'x' tokens. Having just moved from fixture 4365 to fixture 4375, player 4392 has won the game by causing an 'x' token to move in the opposite direction, namely from fixture 4375 to 4365; this achieves the success criterion. The tokens of player 4391 are shown on fixtures 4312, 4333, 4336. Player 4391 was unsuccessful in arranging the 'o' tokens according to the success criterion.

FIG. 44 describes the parameters of fixture processors. A fixture may emit a signal to indicate it is in an "open" state, which is to say, neither displaying a token nor in the proximity of a player (4401). A fixture may emit a signal to indicate that the fixture is on hold, which occurs temporarily, after a player has just left proximity (4402, 4403). Hold status is an intermediate step in token transfer (should it occur). A fixture may emit a signal to indicate that it is blocked, which signifies that the fixture is currently displaying a token (4404, 4405). A fixture may emit a signal to initiate token transfer; by entering transfer mode after a player has just entered proximity (4406, 4407). A fixture can detect when the success criterion has been reached (4408, 4409). A fixture employs a handshake timer to coordinate the token transfer sequence (4410). A fixture employs various modes that coordinate signal emission and game play (4411, 4412, 4413, 4414, 4415, 4416, 4417).

FIG. 45 describes parameters in the processor of players. A player emits a signal to represent still mode (4501, 4503). A player emits a signal to represent moving mode (4502, 4504). Modes are employed to manage signal emission (4505, 4506, 4507, 4508, 4509, 4510). A run timer is used to constrain the player to the playing field and fixtures (4511).

FIG. 46 describes methods of player processors. If, while in motion, a player receives the opponents "still signal", the player is out. If a player enters the influence of a fixture that is held (4602), blocked (4603), or reserved for transfer (4604) by the opponent, then the player is out. If a player in still mode subsequently makes a movement, that player transitions to moving mode (4605). A player that is "out", loses the game. In some other embodiments, point deduction or the like is applied to "out" players. If a player loses fixture influence, a run timer is initiated (4607, 4608, 4609, 4610). If the player gains fixture influence before the timer is elapsed, the player continues play as normal (4611, 4612, 4613, 4614), otherwise the player is "out" (4615).

FIG. 47 describes methods of fixtures. If the fixture is open, and a player signal is lost (signifying a player leaving proximity), the fixture enters hold mode for a limited duration (i.e.—the handshake timer is initiated) to facilitate a possible token transfer (4701, 4702). While in hold mode, if a transfer signal is received, the fixture enters block mode and display of the appropriate token begins (4703, 4705). If, while in hold mode, the handshake timer elapses before token transfer takes place then the fixture is returned to open mode (4704, 4706). If a fixture is in block mode, and a signal is obtained from a player, the fixture enters transfer mode for a limited duration (i.e.—handshake timer initiated) to facilitate a possible token transfer (4707, 4708). While in transfer mode, if a hold signal is received, the fixture enters open mode and ends display of the token (4709, 4711). If the handshake timer elapses before token transfer takes place then the fixture is returned to block mode (4710, 4712). In other embodiments of the invention, the WaveBlock token movement scheme described above may be combined with other game aspects.

Figure 48:
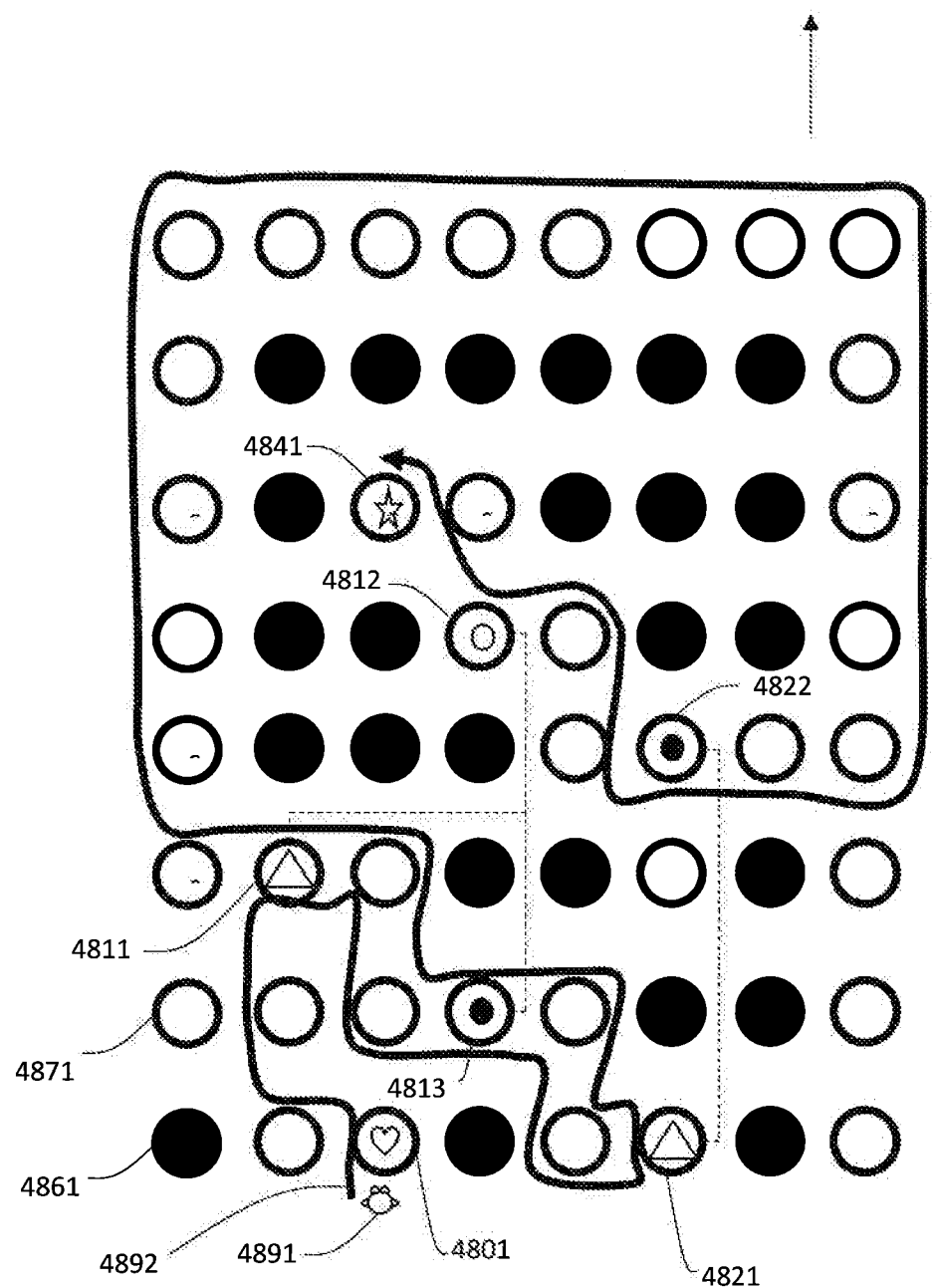
FIG. 48. is a conceptual plan view of a WaveLord Field game playable using the present invention.

Embodiment 13, associated with FIG. 48, relates to a novel game called WaveLord; variants of which are made possible by the invention. In WaveLord, one or more players engage in a game related to physics puzzle games. The objective of the player is to travel from a starting point to an objective by navigating a course that is represented by fixtures.

For example, FIG. 48 depicts a moment in a WaveLord game, wherein player 4891 is constrained to the playing field and fixtures (by methods similar to those previously described). The objective of player 4891 is to find a path from the starting point fixture 4801 to the objective fixture 4841. Entering the proximity of toggler 4811 toggles the states of door fixtures 4812 and 4813 (via signal communication). The possible states of door fixture 4812 are: passable or not passable. The possible states of door fixture 4813 are: passable and not passable. When door fixture 4812 is passable, 4813 is not, and vice versa. Toggler 4821 toggles fixture 4822 between passable and not passable states. Closed fixture 4861 and other opaque fixtures like it are not passable, whereas open fixture 4871 and others like it are passable. If a player enters proximity of a fixture that is not passable that player is out. Path 4892 shows a possible route for player 4891 to achieve the objective. Toggler 4811 is activated, which makes 4813 passable, which allows access to toggler 4821 to cause fixture 4822 to be passable. Then toggler 4811 is activated a second time to make fixture 4812 passable. Then the player 4891 is able to travel west-north-east-south-west-north-west-north-west to the objective, winning the game/scenario. The player is constrained to the fixture by a run timer and penalized for entering the influence of non-passable fixtures. Other embodiments may incorporate moving blocks, jumping over non-passable fixtures, obtaining keys to unblock passages, obstacles, etc.

Figure 49:
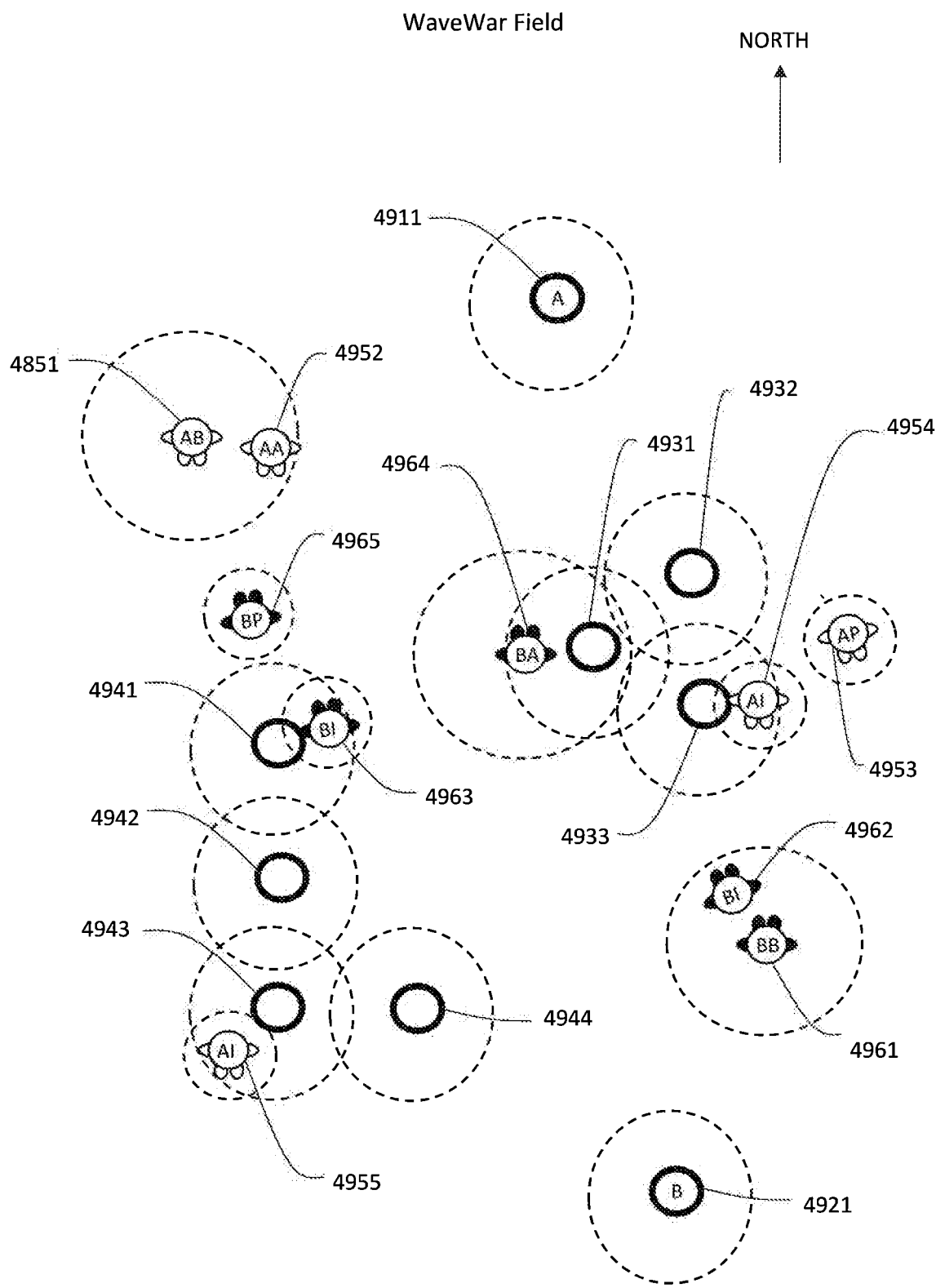
FIG. 49. is a conceptual plan view of a WaveWar Field game playable using the present invention.

Embodiment 13, associated with FIG. 49 through 50, relates to a novel game called WaveWar; variants of which are made possible by the invention. The embodiment employs similar methods to those described above. In WaveWar, two teams (Team A vs. Team B) compete in a game related to war games. In embodiment 13, each team consists of five players (and in other embodiments more or fewer players may participate). To start the game, each team assigns roles. Embodiment 13 employs the following roles: one boat (B), two artillery (A), one infantry (I), one plane (P) are the roles defined in embodiment 13. In other embodiments, other roles may be defined. The zones outside the influence of fixtures represent the sea. The zones within the influence of fixtures represent land. One fixture is designated as the Team A base. One fixture is designated as the Team B base. Team A wins when a Team A player enters proximity of the enemy base. Team B can win in a similar manner. A player may not enter the influence of its own base.

For example, FIG. 49 depicts a moment in a WaveWar game.

FIG. 50 describes player movement permission. Boat players may travel over the sea with or without accompaniment of teammates (5001). Boat players may not travel on land (5001). Artillery and infantry players may not travel over the sea, unless in proximity to a boat teammate (5002, 5003). Artillery and infantry players may travel over land (5002, 5003). Plane players may travel over sea or land without accompaniment (5004). Plane players are, at times, compelled to remain still, to simulate landing/refuel/etc. (5004). Plane players may not remain still over the sea (5004).

FIG. 50 describes player movement details. Boat players are permitted to move for a "run interval" not exceeding 2 seconds, and thereafter are compelled to remain still for a "wait interval" 2 seconds (5005). Infantry players and artillery players, when on land, are permitted to move for a duration not exceeding 2 seconds, and thereafter are compelled to remain still for 2 seconds (5006, 5007). Infantry players and artillery player, when in proximity to a boat, are permitted to move freely. Plane players are permitted to move for a duration not exceeding 10 seconds, and thereafter are compelled to remain still for 10 seconds (5008).

FIG. 50 describes player attacks. The diameter of the influence zone of boat players and artillery players are relatively large. The diameter of the influence zone of infantry players and planes are relatively small. A boat player, whether still or moving, emits an attack signal. Infantry players and artillery players that are on land, whether still or moving, emit an attack signal. Infantry players and artillery players that are in the proximity of a boat (at sea) do not emit an attack signal. A plane emits an attack signal only when moving.

FIG. 50 describes player attack details. During every 4 second "hit interval" (5009), a player's processor performs a calculation to assess whether the player is vulnerable to opponent attack signals, based on the assigned vulnerability probability pertaining to each opponent attack signal. If, during the hit interval, the player is vulnerable to a certain attack signal, and receives said attack signal, the player is out. In embodiment 13, a boat is vulnerable to an opponent boat signal in 80% of hit intervals, to infantry 20%, to artillery 80%, to planes 20% (5010). Signal vulnerability probabilities are also defined for infantry (5011), artillery (5012), and planes (5013).

FIG. 49 shows the Team A base (4911) to the north, and the Team B base (4921) to the south. 'East Island' is composed of fixtures 4931, 4932, 4933. 'West Island' is composed of fixtures 4941, 4942, 4943. Team A boat 4851 and Team A artillery 4952 travel southward; Team B plane 4965 approaches them from the south in preparation for attack. Team B artillery 4964, on the "east island" dissuades Team A boats from passing through the channel between "east island" and "west island".

In other similar embodiments, the effect of run interval, wait interval, and hit interval may be varied or removed. In other embodiments, signal vulnerability may be varied or removed or obviated by another means of attack signal processing. In other embodiments, resource gathering may be simulated. In other embodiments points may be gained for controlling territory.

Figure 51:
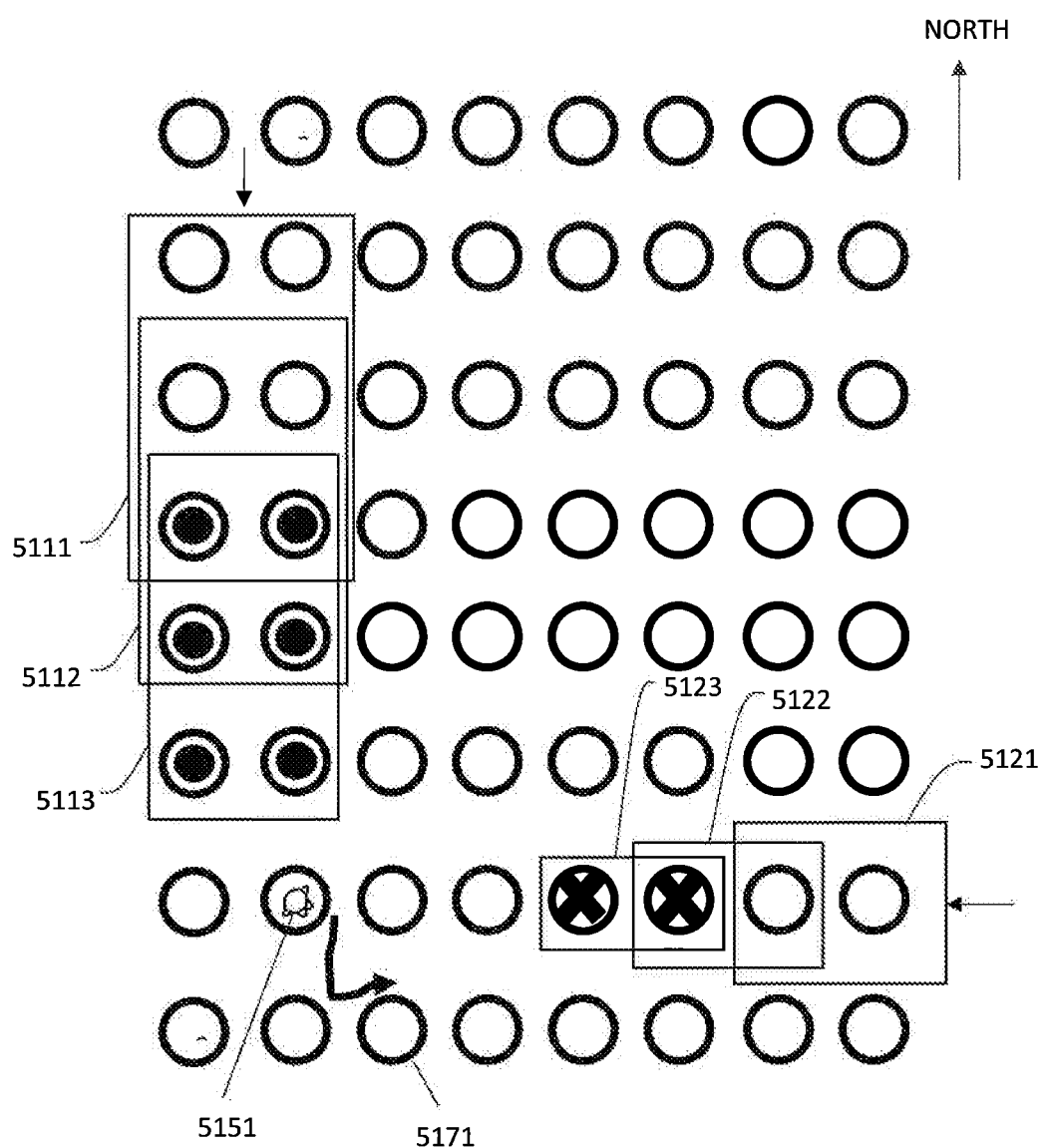
FIG. 51. is a conceptual plan view of a WaveDodge Field game playable using the present invention.

Embodiment 14, associated with FIG. 51, relates to a novel game made called WaveDodge; variants of which are made possible by the invention, by employing similar methods to those described above. In WaveDodge, one or more players engage in a game related to Frogger (an arcade game). Two-dimensional objects in motion are represented on fixtures. A player attempts to dodge objects by moving to vacant fixtures (i.e.—those fixtures that do not currently represent a moving two-dimensional object).

For example, FIG. 51 depicts a moment in a WaveDodge game. Currently, fixtures within the area denoted by space 5113 are illuminated. Prior to that, the fixtures within the area denoted by space 5112 were illuminated. Prior to that, the fixtures within the area denoted by space 5111 were illuminated. In this way, movement of an object was simulated. Similarly, a second moving object was simulated by progressive illumination of fixtures in the space 5121, then 5122, then 5123, etc. To "dodge" the objects, player 5151 moves to the fixture 5171 as indicated by the related arrow.

Figure 52:
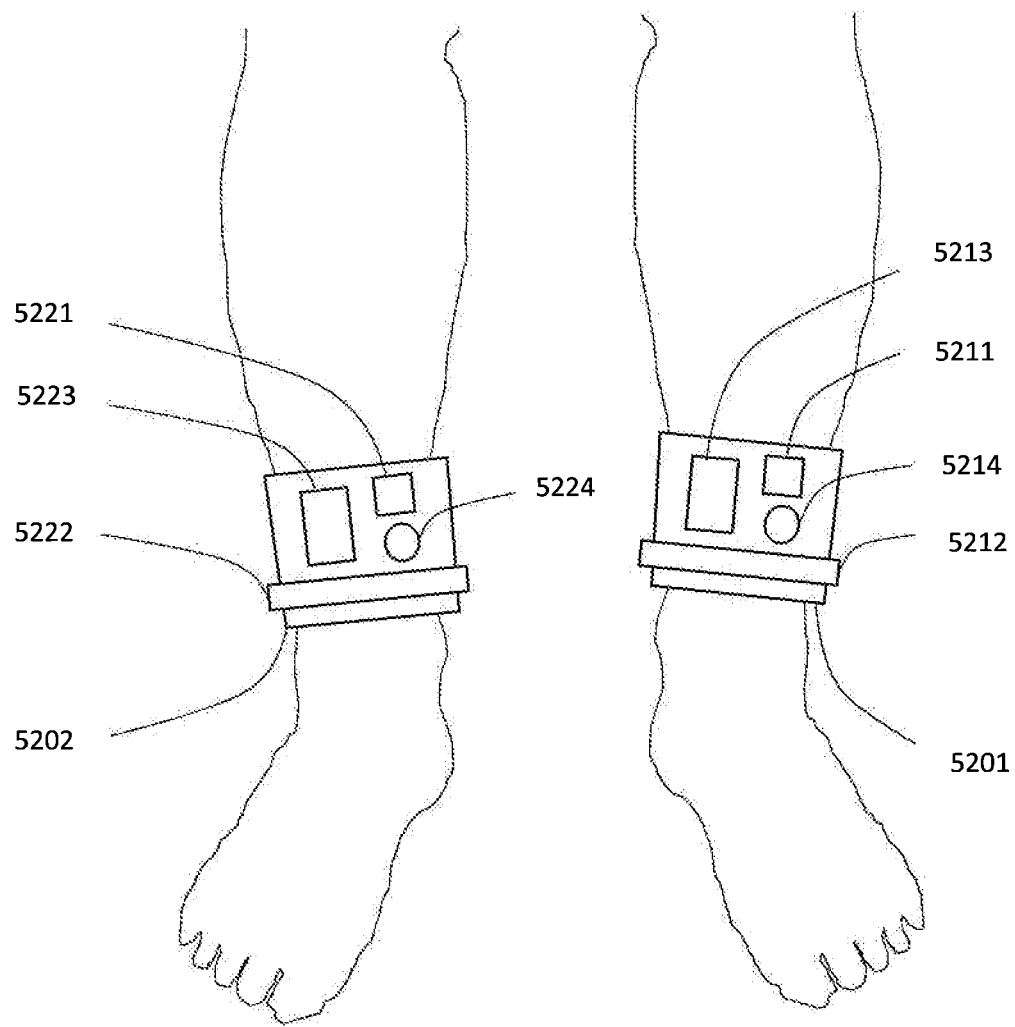
FIG. 52. Conceptual view of shin worn apparatus (Embodiment 16)

Embodiment 16 of the invention is shown in FIG. 52. FIG. 52 describes a wearable electronic kit that would enable a player to participate in various games described in this specification and others. The embodiment 16 kit includes a left shin assembly 5201 and a right shin assembly 5202. Included in left shin assembly 5201 are processor 5211, antenna 5212, battery 5213, and buzzer 5214. Similarly, included in right shin assembly 5202 are processor 5221, antenna 5222, battery 5223, buzzer 5224.

Antenna 5212 and 5222 (linked to processors 5211 and 5221 respectively) are each used to emit and scan BLE (Bluetooth low energy) advertisements. Processors 5211 and 5221 perform various functions including: calculate RSSI (received signal strength indication) values for received signals, employ logic to determine player status as a function of RSSI and other values, and employ logic to cause signals to be emitted as a function of player status. In a game setting, the left and right shin assembly of each player emits characteristic (unique) advertisements.

Antenna 5212 surrounds the left calf of the wearer, so as to emit and receive signals omnidirectionally (about the left leg of the wearer). Antenna 5222 surrounds the left calf of the wearer, so as to emit and receive signals omnidirectionally (about the right leg of the wearer). The benefit of antenna omnidirectionality is described throughout this specification (e.g.—for zone influence).

Buzzer 5214 and buzzer 5224 are used to provide auditory, and to a degree haptic, information to players (e.g.—confirm player status, warn of approach of players, etc.). In other embodiments, other (or no) indicators may be used.

A player's left shin assembly 5201 is capable of measuring RSSI of the characteristic signal emitted from their right shin assembly 5202 (i.e.—the opposing shin signal). A player's right shin assembly 5202 is capable of measuring RSSI of the characteristic signal emitted from their left shin assembly 5201 (i.e.—the opposing shin signal). By virtue of opposing shin signal RSSI, processors can determine when a player is in motion, namely when the RSSI of the opposing shin signal varies. By virtue of opposing shin signal RSSI, processors can determine when a player is making a certain pose (with the leg). When the player is stationary, standing, and with legs spread apart, RSSI of the opposing shin signal is substantially constant, and lower than a predetermined value. When the player is stationary, standing, and with legs close together, RSSI of the opposing shin signal is substantially constant, and higher than a predetermined value. Similarly, intermediate leg positions can be recognized in this manner. Similarly, leg gestures can be recognized in this manner. The benefit of processor recognition of motion, pose, and gesture is described throughout this specification.

A shin (or leg or ankle or foot or other part sufficiently close to the ground) worn apparatus facilitates proximity detection of other players (and thereby zone influence games are made possible). If the left shin signal or right shin signal of another player is received with RSSI above a predetermined value, the processor recognizes that the other player has reached a corresponding proximity. A dual (left/right) shin type apparatus ensures that a line of sight signal path is always available from at least one of the shins of an approaching player, which facilitates proximity detection accuracy of the RSSI scheme (i.e.—so that body blocking of signals does not confound the method).

By virtue of being worn on the shin, the shin worn apparatus provides certain advantages (depending on the application). A shin worn apparatus is not cumbersome to wear (similar to soccer shin pads, which are familiar to many players). A shin worn apparatus emits signals from substantially the same elevation for all players, regardless of player height, which facilitates proximity detection accuracy of the RSSI scheme.

In a game setting, intentional shielding of the shin apparatus (with the torso, arms, upper body, etc.) is typically an undesired behavior that interferes with the RSSI proximity detection scheme. However, the undesired behavior provides limited benefit to the player, as it impedes the player's ability to move and to emit "attacking" signals. Nonetheless, it can be beneficial to monitor and penalize such undesired behavior to promote a fair game. The undesired behavior is easily recognized (visually) by observers and may be penalized "manually". The undesired behavior may also be recognized by the processor and penalized "automatically". One method by which a processor may recognize the undesired behavior is by measuring RSSI of signals emitted from relatively distant reference beacons (e.g.—goals, field boundary beacons, etc.). An abrupt decline in reference signal RSSI can indicate the undesired behavior, when such a decline is so rapid that it can't be attributed to body blocking by other players nor by movement of the kit wearer. Simultaneous and abrupt decline of RSSI from beacons that lie in opposite directions of the kit wearer can indicate the undesired behaviour. Other methods, and a combination of methods, may be used to indicate the undesired behavior.

Another benefit of a shin worn apparatus is that leg gestures can be used to initiate commands (e.g.—some typical gestures include: the player can jiggle the foot to confirm readiness to start the game, the player can click heels together three times to confirm game end, etc.).

A possible embodiment of the shin worn type could comprise components as follows: shin worn processor with Bluetooth low energy (BLE) enabled processor (e.g.—ESP32 or alternate), fixtures including the long distance BLE enabled processor (e.g.—NRF52840 or alternate).

Below are general comments regarding the invention.

Regarding other games that are made possible with the invention: Various game related embodiments have been described. By using the system and methods of the invention many other games are possible (e.g.—games related to: some sports, some yard games, board games, some euro games, some video games, some arcade games, role playing games, resource placement games, cooperative games, area control games, party games, puzzle games, combat games, novel games, etc.). Endless customization and games can be updated to the game system by an authorized administration group and/or others. Combinations of elements of the game embodiments described above (and other game embodiments) are possible. A dedicated and customized programming language, suited to games playable with the invention (e.g.—'wave game' programming), can be distributed to programmers and users to allow them to readily program wave game processors. The invention may be used to provide challenges similar to existing sports, with a lesser risk of injury. For example, games variants of WaveBall, WaveTag, and other wave games can allow challenges similar to football, rugby, hockey, ultimate frisbee, baseball, basketball, contact-games, etc. Video game (non-physical) analogues of the games of WaveTag, WaveChess, WaveGammon, WaveBall, WaveMan, WaveBlock, WaveLord, WaveWar, and WaveDodge are possible; albeit without the physical/athletic-related benefits of the embodiments described herein. Furthermore, the invention may be used for training (safely), or to improve group coordination, group team-building, etc. A limited number of game variations have been described in detail in this specification; many variations not described herein are possible, as can be seen from the generality of the claims.

Regarding fixture types: Minor fixtures have been shown as circular. In other embodiments the minor fixtures can be formed in other shapes (e.g.—square, rectangular, triangular, hexagonal, polygonal, etc.). Minor fixtures may be made contiguous. Minor fixtures may be used in a contiguous array in a manner that forms a continuous video screen. Line or rod shaped fixtures may be used. For example, rod shaped fixtures could be used to delineate the edge of a playing field, both physically and by virtue of signal communication. A wavefront from a rod shaped fixture can be used to create an influenced zone along the border of an area. A wavefront from a rod shaped fixture can be used to constrain movements to paths parallel to said rod shaped fixture. For example, a rod shaped fixture extending the length of a playing field in a north-south direction can be used in WaveChess to constrain rook motion to north-south paths. East-west and diagonal rod fixtures can be used in a similar manner.

Regarding playing fields: In some embodiments, fixtures are battery powered, portable, and relocatable. In some embodiments, dedicated spaces (analogous to commercial laser tag facilities) can be created for wave games. In such spaces, fixtures can be permanently installed and calibrated to the location. In such spaces, external speakers, lights, music, effects, etc. can be coordinated with the fixtures and games to provide an immersive experience. Public spaces can be arranged for wave games. One method of doing so is to embed minor fixtures in the ground (underneath a protective surface if necessary) and/or in walls, with major fixtures mounted in a protective manner that mitigates theft, vandalism, damage, tampering, etc., and with minor fixtures mounted flush to the ground. In such an installation, permanent power (rather than battery power) and network wiring can be provided to fixtures. Players (i.e.—the public) can interact with such an installation merely with a relatively inexpensive wearable electronic kit. Personal wearable RFID tags can be used to communicate with the public space system to obtain permission for use (and to coordinate payment for use if applicable). Access to playing fields, or to distributed wave games (e.g.—available through a network or the internet, for download to the apparatus) may be monetized. Wave games may be provided as a service (e.g.—arenas, rented equipment) or product (purchased wearable kit) or both. In some embodiments, several wave game fields/sessions/instances can be made to interface, interact, or combine by internet or networking methods (e.g.—allowing players at one facility to alter the state of fixtures at another facility, thereby allowing players at separate facilities to participate in a common game).

Regarding player protection (from collision): In several embodiments, a still player emits a signal that, when received by a moving player in proximity, deactivates said moving player. In several embodiments, a player emits a signal that, when received by another player, elicits a warning indication from the wearable kit of said other player (e.g.—haptic feedback). The radius of the warning/protective zone surrounding a player can be chosen to suit circumstances, the playing field, the game, etc. A protective radius in the range of 2 ft to 8 feet could be useful in many embodiments, however other radii could be employed. Zone influence protective methods are, in and of themselves, useful, and can be employed (for protection alone) in traditional sports.

Regarding signal emission: In some embodiments described herein there are cases when a player emits two signals simultaneously; in other embodiments the same may be achieved by a single signal that is a proxy for multi-signal emission. In the embodiments described, signal strength measurements of carrier waves delineated zone influence. In some embodiments, signal strength can be used together with signal modulation and/or encoded signals. In some of the embodiments described, teammates emit a characteristic signal at the same frequency. In other embodiments, players can emit the characteristic signal at unique frequencies. In some embodiments, gesture recognition can be used to adjust signal emission/receipt (e.g.—to compensate for any undesired human antenna effect, and to maintain signal strength delineation of zones).

Regarding control of territory and influence. Influence is an aspect of strategic athletics. In the game embodiments presented, influence is achieved by the local emission and signal strength method (which is low cost, robust, less susceptible to obstruction than other methods, etc.). However, it is possible for fixtures to track player location, and for fixtures to send position and (calculated) influence information by signal communication, albeit such a method requires a complex fixture design (in particular for games involving many players that play over a wide area). For example, if all players on the same team wear the same team colour, a major fixture can employ visual detection of team colours to assign influence to a zone.

An additional benefit of the gaming method and system of the invention is that it enables players to engage from a distance; in this manner players can engage in physical activity while maintaining social distancing which is a mitigation for covid-19 and other diseases.

Other embodiments of the invention could incorporate signal emitting circuitry embedded in shoes, belts, or other clothing or accessories.

Other embodiments of the invention could incorporate microphones for obtaining the an audio signal representative of music played in the vicinity, such that the audio signal could be employed by a processor of the wearable kit to alter game conditions (e.g.—receipt of a characteristic sound, music note, or beat could be used to signal permission to move, etc.)

Other embodiments of the invention could permit wireless communication with other electronic devices (e.g.—transmission of data to pocket worn smartphone, sound cues to ear buds, etc.).

In some embodiments of the present invention, electronics, basic signal communication, proximity detection, and processor programs (and/or electrical circuit logic) are employed to enable games wherein a player must employ situational awareness and decision tree style thinking in order to respond to challenges in an athletic manner.

In some embodiments of the present invention, players don wearable electronics kits that include a processor and antennae (for transmission and receipt of signals). Receipt of signals modifies the game state, as represented in processor programs, according to codified rules programmed in the processor. In some embodiments of the present invention, processor programs cause indications to be made, in a way that provides information to players to inform their strategic thinking.

In some embodiments of the present invention, physical movements and gestures are compelled or prohibited, in a way that enables strategic athletic games, and furthermore, allows physical movement and gesture to convey information.

In some embodiments of the present invention, game conditions can be communicated to players via lights, speakers, buzzers, vibrators, movements, gestures, and other indicators. Such indicators can be used to rapidly present players with information about the game, and thus enable interesting game play. Such indicators can be used to inform players about impending collisions.

In some embodiments of the present invention, players influence each other at a distance by virtue of signal communication, and thereby close-proximity play can be managed, limited, or avoided. Embodiments of the present invention may be considered as a medium (or beneficial lack thereof) through which players may engage in strategic games directly (i.e.—without the burdensome use of symbolic instruments such as board game pieces, video game controllers, video screens, etc.). Also, the present invention allows multiple players to participate in a strategic game simultaneously in an organized manner.

In some embodiments of the present invention, signal communication allows discrete zones of a playing field to be continuously controlled or influenced by virtue of signal communication. The invention provides a novel means of territorial control and game element modification that enables strategy games and abstract games of a physical nature. If a player (or fixture or projectile) enters or exits the zone of influence of another player (or fixture or projectile), the state of game variables may be changed in one or more processors. In this manner, territorial influence or control, which is an important aspect of various strategic games, can be achieved.

In some embodiments of the present invention, an influence on a zone of the playing field may be delineated by constant signal strength around the perimeter of said zone. Signals type employed may include radio, pressure waves (e.g.—ultrasonic waves), light waves, or other waves. VHF and other bands of radio signals may be employed. In various game embodiments presented in this specification, carrier wave radio signals are used (for example). Signal strength measurements can change the state of game variables stored in the processors of players (or fixtures, or projectiles) which can affect game variables and ultimately the game outcome.

In some embodiments of the present invention, the antennae of the wearable electronics kit of a player is substantially omnidirectional. Territorial influence is achieved by emitting signals via the omnidirectional antenna. The perimeter of a zone of influence surrounding the player is delineated by a defined signal strength value. Furthermore, the omnidirectional antenna causes a player to be sensitive to territorial signals emitted by others. A defined signal strength value is measured by the omnidirectional antennae of other players or fixtures at a distance corresponding to the zone diameter. The wave-field-based influence means described above differs from the beam-based shooting methods of lasertag and other such prior art games.

In some embodiments of the present invention, one or more programs may be loaded onto the processors of the gaming system; each program being a codification of a set of game rules. Through local or remote or internet connection, the programs can be modified or added to by local users, a community of users, or an administrative group. In this way an endless variety of programs can be created and improved to meet the evolving needs of players. Game data may be collected to support the creation and improvement of programs or for other uses.

Some games made possible by the present invention may be referred to generally as "strategic athletics" or "wave-gaming" or "wave-games" or "wave" or "waveletics" (alluding to: the use of signal waves, the use of waving gestures, the anticipated rapid adoption of the invention, the anticipated attendant surge in health & GDP, the electronic music integrated with some embodiments of the invention, the shape of wearable antennae employed in certain embodiments, wave-particle duality as a metaphor for player interaction, the acronym Wireless Athletic Virtual Exercise, etc.). Players of wave games may be referred to as 'wavers'. On the chest of the player of FIG. 1 is shown a novel icon and mark that may be associated with wave gaming.

Specific embodiments of the present invention have been disclosed; however, several variations of the disclosed embodiments could be envisioned as within the scope of this invention. It is to be understood that the present invention is not limited to the embodiments described above, but encompasses any and all embodiments within the scope of the following claims.

Therefore, what is claimed is:

1. A system for playing a game involving first and second players, the game having a set of rules by which the game is to be played, the system comprising:
   a. a transmitter worn by the first player, said transmitter emitting a first signal at a signal strength which decreases as the signal propagates away from the transmitter;
   b. a receiver worn by the second player, said receiver configured to read the first signal, the receiver being further configured to measure the signal strength of said first signal;
   c. a processor coupled to the receiver, the processor configured to create a zone of influence around one of the players by defining a preselected signal strength threshold;
   d. the processor being further configured to recognize a presence event when the signal strength read by the receiver equals or exceeds the preselected signal strength threshold;
   e. the processor configured to store the set of rules, the processor being further configured to use the recognition of the presence event in the application of the rules without a referee.

2. A system for playing a game as defined in claim 1 wherein the transmitter is an omnidirectional transmitter.

3. A system for playing a game as defined in claim 1 further comprising an indicating device worn by one of the players, the indicating device coupled to the processor, the processor configured to activate the indicating device when the strength of the signal received by the receiver passes a predetermined indicating threshold, the indicating device configured such that when triggered, the indicating device emits an indicating signal selected from the group comprising an audible signal, a visual signal and a vibrational signal.

4. A system for playing a game as defined in claim 1 wherein one of the players is an object and the other player is a natural person.

5. A system for playing a game as defined in claim 1 wherein the processor is worn by the second player.

6. A system for playing a game involving at least two players on a playing field having a width, the game having a set of rules by which the game is to be played, the system comprising:
   a. each player wearing a transmitter configured to emit a signal identifying the player wearing the transmitter, the signal having a signal strength which decreases along the width of the playing field;
   b. each player wearing a receiver configured to read the signal transmitted by the other player, the receiver being further configured to measure the signal strength of said signal;
   c. a processor coupled to each receiver, the processor configured to create a zone of influence around each of the players by defining a preselected signal strength threshold for each player;
   d. the processor being further configured to recognize a presence event when the signal strength read by the receiver exceeds the preselected signal strength threshold;
   e. the processor configured to store the set of rules, the processor being further configured to use the recognition of the presence event in the application of the rules without a referee.

7. A system of playing a game as defined in claim 6 wherein each receiver and transmitter is wirelessly coupled to the processor, the processor being remote to each player.

8. A system for playing a game as defined in claim 6 wherein the transmitter is an omnidirectional transmitter.

9. A system for playing a game as defined in claim 6 further comprising an indicating device worn by one of the players, the indicating device coupled to the processor, the processor configured to activate the indicating device when the strength of the signal received by the receiver passes a predetermined indicating threshold, the indicating device configured such that when triggered, the indicating device emits an indicating signal selected from the group comprising an audible signal, a visual signal and a vibrational signal.

10. A system for playing a game as defined in claim 6 wherein at least two of the players are natural persons.

11. A system for playing a game as defined in claim 6 wherein the processor comprises a plurality of processors, each player wearing one of said processors.

12. A wearable electronic kit useful in playing a game involving a plurality of players on a playing field having a width, at least some of the players wearing said wearable electronic kit, the game having a set of rules by which the game is to be played, each wearable electronic kit comprising:

a. a transmitter configured to emit a signal identifying the player wearing the wearable electronic kit, the signal having a signal strength which decreases along the width of the playing field;
b. a receiver configured to read the signals transmitted by the electronic kits worn by other players, the receiver being further configured to measure the signal strength of each of said signals;
c. a processor coupled to the receiver, the processor configured to create zones of influence around the other players by defining a preselected signal strength threshold for each signal;
d. the processor being further configured to recognize a presence event in the zone of influence by comparison of the signal strength read by the receiver to the preselected signal strength threshold of the player, and
e. the processor configured to store the set of rules, the processor being further configured to use the recognition of the presence event in the application of the rules without a referee.

13. A wearable electronic kit as defined in claim 12 wherein the transmitter is an omnidirectional transmitter.

14. A wearable electronic kit as defined in claim 12 further comprising an indicating device coupled to the processor, the processor configured to activate the indicating device when the strength of the signal received by the receiver passes a predetermined indicating threshold, the indicating device configured such that when triggered, the indicating device emits an indicating signal selected from the group comprising an audible signal, a visual signal and a vibrational signal.

15. A method of playing a game among a plurality of players wearing the electronic kit defined in claim 12, the method comprising the steps of defining the zone of influence around at least one of the players and applying the set of rules for each presence event.

16. A system for playing a game involving first and second players, the game having a set of rules by which the game is to be played, the system comprising:
a. a transmitter worn by the first player, said transmitter emitting a first signal at a signal strength which decreases as the signal propagates away from the transmitter;
b. a receiver worn by the second player, said receiver configured to read the first signal, the receiver being further configured to measure the signal strength of said first signal;
c. a processor coupled to the receiver, the processor configured to create a zone of influence around one of the players by defining a preselected signal strength threshold;
d. the processor being further configured to recognize a presence event when the signal strength read by the receiver equals or exceeds the preselected signal strength threshold;
e. the processor configured to store the set of rules, the processor being further configured to use the recognition of the presence event in the application of the rules;
f. wherein the processor is configured to identify a gesture, the processor being further configured to identify the gesture from a catalog of gestures stored by the processor, the processor being further configured to use the identified gesture in the application of the rules.

17. A system for playing a game involving at least two players on a playing field having a width, the game having a set of rules by which the game is to be played, the system comprising:
a. each player wearing a transmitter configured to emit a signal identifying the player wearing the transmitter, the signal having a signal strength which decreases along the width of the playing field;
b. each player wearing a receiver configured to read the signal transmitted by the other player, the receiver being further configured to measure the signal strength of said signal;
c. a processor coupled to each receiver, the processor configured to create a zone of influence around each of the players by defining a preselected signal strength threshold for each player;
d. the processor being further configured to recognize a presence event when the signal strength read by the receiver exceeds the preselected signal strength threshold;
e. the processor configured to store the set of rules, the processor being further configured to use the recognition of the presence event in the application of the rules;
f. wherein the processor is configured to identify a gesture, the processor being further configured to identify the gesture from a catalog of gestures stored by the processor, the processor being further configured to use the identified gesture in the application of the rules.

18. A wearable electronic kit useful in playing a game involving a plurality of players on a playing field having a width, at least some of the players wearing said wearable electronic kit, the game having a set of rules by which the game is to be played, each wearable electronic kit comprising:
a. a transmitter configured to emit a signal identifying the player wearing the wearable electronic kit, the signal having a signal strength which decreases along the width of the playing field;
b. a receiver configured to read the signals transmitted by the electronic kits worn by other players, the receiver being further configured to measure the signal strength of each of said signals;
c. a processor coupled to the receiver, the processor configured to create zones of influence around the other players by defining a preselected signal strength threshold for each signal;
d. the processor being further configured to recognize a presence event in the zone of influence by comparison of the signal strength read by the receiver to the preselected signal strength threshold of the player, and
e. the processor configured to store the set of rules, the processor being further configured to use the recognition of the presence event in the application of the rules;
f. wherein the processor is configured to measure a gesture, the processor being further configured to identify the gesture from a catalog of gestures stored by the processor, the processor being further configured to use the identified gesture in the application of the rules.

19. A wearable electronic kit useful in playing a game involving a plurality of players on a playing field having a width, at least some of the players wearing said wearable electronic kit, the game having a set of rules by which the game is to be played, each wearable electronic kit comprising:
a. a transmitter configured to emit a signal identifying the player wearing the wearable electronic kit, the signal having a signal strength which decreases along the width of the playing field;

b. a receiver configured to read the signals transmitted by the electronic kits worn by other players, the receiver being further configured to measure the signal strength of each of said signals;

c. a processor coupled to the receiver, the processor configured to create zones of influence around the other players by defining a preselected signal strength threshold for each signal;

d. the processor being further configured to recognize a presence event in the zone of influence by comparison of the signal strength read by the receiver to the preselected signal strength threshold of the player, and e. the processor configured to store the set of rules, the processor being further configured to use the recognition of the presence event in the application of the rules;

f. wherein the receiver of at least one electronics kit receives signals transmitted in synchrony with music and wherein the processor is further configured to identify when a movement is synchronous with a rhythm of the music in the application of the rules.

20. A wearable electronic kit useful in playing a game involving a plurality of players on a playing field having a width, at least some of the players wearing said wearable electronic kit, the game having a set of rules by which the game is to be played, each wearable electronic kit comprising:

a. a transmitter configured to emit a signal identifying the player wearing the wearable electronic kit, the signal having a signal strength which decreases along the width of the playing field;

b. a receiver configured to read the signals transmitted by the electronic kits worn by other players, the receiver being further configured to measure the signal strength of each of said signals;

c. a processor coupled to the receiver, the processor configured to create zones of influence around the other players by defining a preselected signal strength threshold for each signal;

d. the processor being further configured to recognize a presence event in the zone of influence by comparison of the signal strength read by the receiver to the preselected signal strength threshold of the player, and e. the processor configured to store the set of rules, the processor being further configured to use the recognition of the presence event in the application of the rules;

f. the wearable electronic kit further comprising at least one antenna configured to surround a body part of the wearer, the wearer being a natural person.

* * * * *